United States Patent [19]
Toyoda et al.

[11] Patent Number: 5,825,505
[45] Date of Patent: Oct. 20, 1998

[54] IMAGE COMMUNICATION APPARATUS

[75] Inventors: Hisashi Toyoda; Minoru Yokoyama; Toshio Kenmochi; Yosuke Ezumi, all of Yokohama; Masakatsu Yamada, Kawasaki, all of Japan

[73] Assignee: Canon Kabushiki Kaisha, Tokyo, Japan

[21] Appl. No.: 952,946

[22] Filed: Sep. 28, 1992

[30]    Foreign Application Priority Data

| Sep. 30, 1991 | [JP] | Japan | 3-278657 |
| Oct. 31, 1991 | [JP] | Japan | 3-286435 |
| Oct. 31, 1991 | [JP] | Japan | 3-314122 |
| Jan. 9, 1992 | [JP] | Japan | 4-002362 |

[51] Int. Cl.⁶ .............. H04N 1/00; H04N 1/32; H04N 1/024
[52] U.S. Cl. ............ 358/400; 358/473; 358/468; 358/442
[58] Field of Search ................ 358/400, 468, 358/434, 442, 473, 500; 379/100, 59, 61, 93, 102.02; 455/78, 74; 395/500, 800; H04N 001/320

[56]    References Cited

U.S. PATENT DOCUMENTS

| 4,297,727 | 10/1981 | Ogawa et al. | 358/261 |
| 4,899,182 | 2/1990 | Inoue | 346/153.1 |
| 4,977,609 | 12/1990 | McClure | 355/78 |
| 4,989,230 | 1/1991 | Gillig et al. | 379/61 |
| 5,027,385 | 6/1991 | Nakagawa et al. | 379/100 |
| 5,172,243 | 12/1992 | Hayashi et al. | 358/473 |
| 5,182,655 | 1/1993 | Motoyanagi | 358/400 |
| 5,200,991 | 4/1993 | Motoyanagi | 379/100 |
| 5,265,238 | 11/1993 | Canova, Jr. et al. | 395/800 |
| 5,684,607 | 11/1997 | Matsumoto | 358/422 |

FOREIGN PATENT DOCUMENTS

| 0262603 | 4/1988 | European Pat. Off. . |
| 0455157 | 11/1991 | European Pat. Off. ......... H04N 1/32 |
| 2592253 | 6/1987 | France . |
| 63-046530 | 2/1988 | Japan . |
| 2036971 | 2/1990 | Japan . |
| 3218163 | 9/1991 | Japan . |
| 2069982 | 9/1981 | United Kingdom . |
| 2238758 | 6/1991 | United Kingdom . |

*Primary Examiner*—Kim Yen Vu
*Assistant Examiner*—Cheukfan Lee
*Attorney, Agent, or Firm*—Fitzpatrick Cella Harper & Scinto

[57]    ABSTRACT

An image communication apparatus includes a reader for reading an original image, a communication unit including an NCU for transmitting and receiving image data through a subscriber line, a recorder for recording the image read by the reader and the image data received by the communication unit on recording paper, a CPU for controlling an overall operation of the image communication apparatus, and contacts for connecting a detachable auxiliary or external device so that the CPU has an auxiliary function of the image communication apparatus.

166 Claims, 41 Drawing Sheets

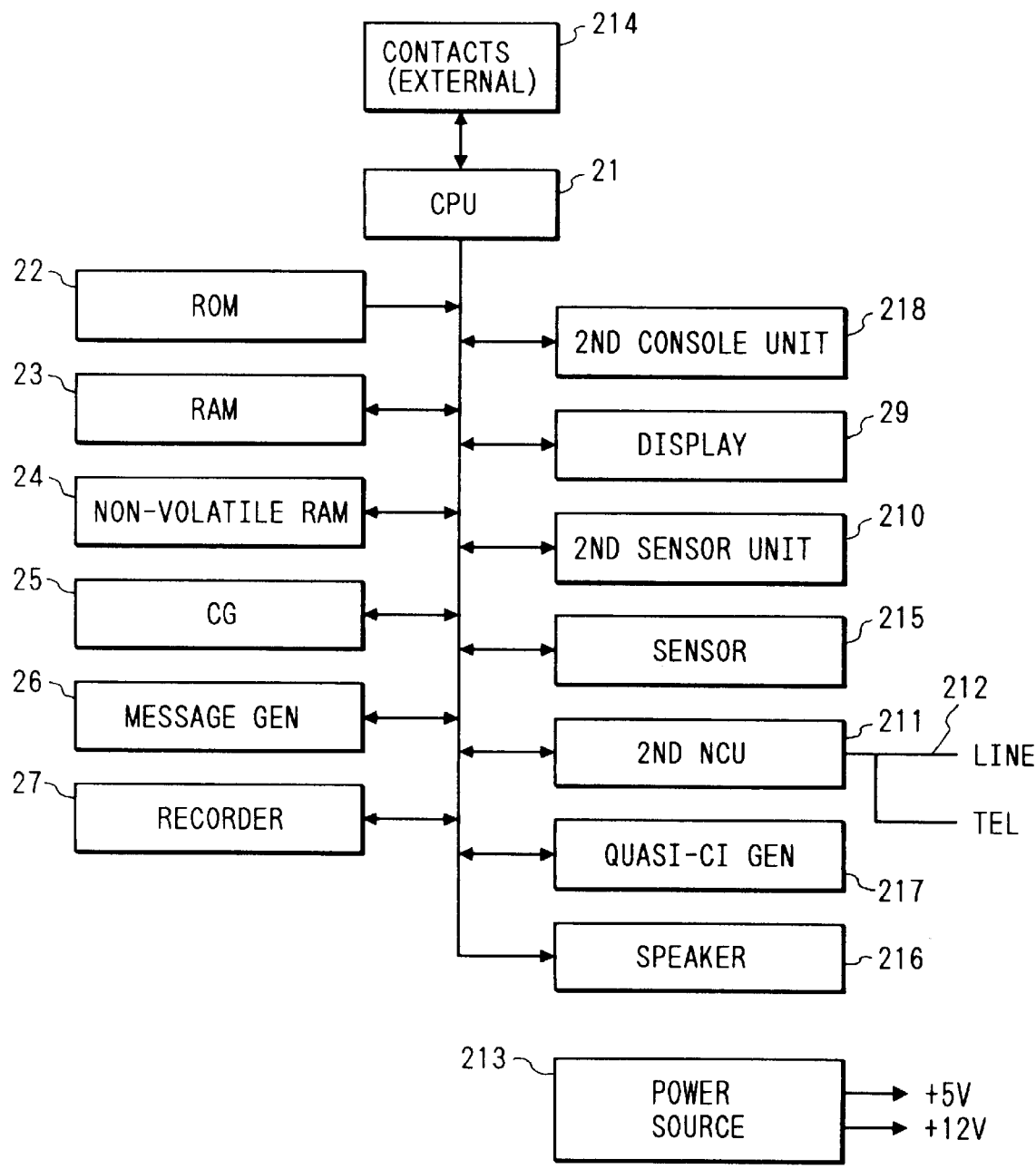

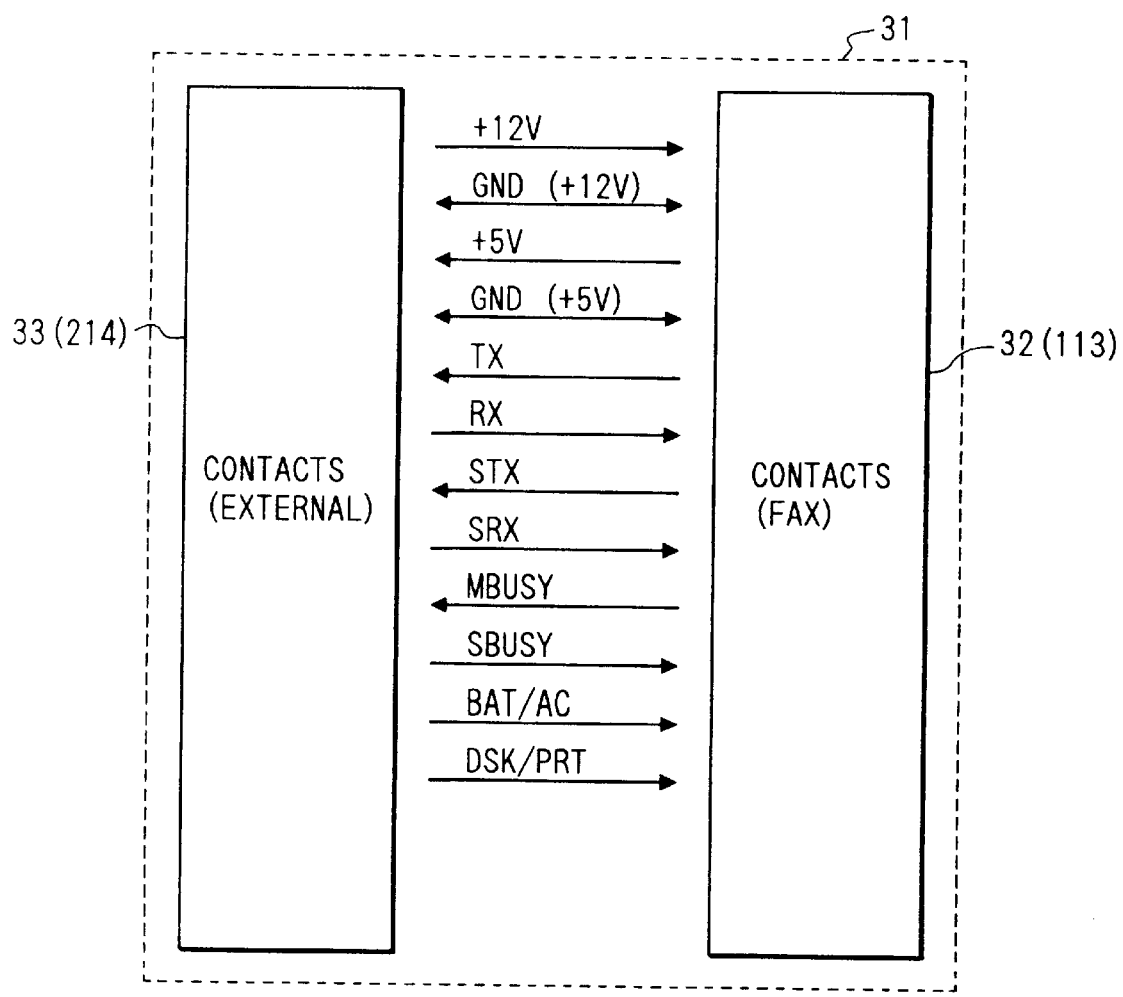

| FIG. 35A | FIG. 35B |

THIS ARE
THIN-PRINTED

THIN PRINT MODE
(BLACK RATE ≧ 50%)

THIN PRINT MODE
(FULL LINE)

IMAGE COMMUNICATION APPARATUS

BACKGROUND OF THE INVENTION

1. Field of the Invention

The present invention relates to a facsimile apparatus, wherein functions required as a portable facsimile apparatus can be separated from those required as a stationary facsimile apparatus used on a desk, the main body (FAX) of the facsimile apparatus has minimum functions as the portable facsimile apparatus, an external device having functions of realizing the stationary facsimile apparatus is connected to the main body in use on the desk, thereby using the facsimile apparatus for both stationary and portable applications.

2. Related Background Art

Conventional portable facsimile apparatuses have one of the following two arrangements. One arrangement has all functions of realizing a facsimile apparatus used on a desk, and the other arrangement has only minimum functions such as transmission and reception functions.

Along with the development of the information-oriented society, facsimile apparatuses are often used in places except for their original installation places. Demand has arisen for developing portable facsimile apparatuses which do not specify the installation places. A portable facsimile apparatus having minimum functions such as transmission and reception functions is proposed. Since this portable facsimile apparatus, however, has the minimum functions, it cannot provide necessary functions enough to serve as a desktop facsimile apparatus. When a portable facsimile apparatus is added to a desktop facsimile apparatus, the storage space of the portable facsimile apparatus not in use is wasted, resulting in high cost.

A portable facsimile apparatus having all the functions to serve as a desktop apparatus may be considered as a portable facsimile apparatus which can be used on a desk. Since unnecessary functions are included in the apparatus, the overall weight and size are undesirably increased during carrying.

SUMMARY OF THE INVENTION

The present invention has been made in consideration of the above situation, and has as its object to provide an image communication apparatus which can be used for both portable and stationary applications.

It is another object of the present invention to provide an image communication apparatus in which the overall weight and size of the portable main body can be reduced.

It is still another object of the present invention to provide a recording apparatus for performing printing by an optimal printing scheme in accordance with the type of power source and operating states, and an image communication apparatus incorporating the recording apparatus.

It is still another object of the present invention to provide a portable battery-driven image communication apparatus which is free from system resetting caused by variations in voltage and can effectively minimize power consumption of the battery.

BRIEF DESCRIPTION OF THE DRAWINGS

FIG. 2 is a block diagram showing the arrangement of an external device according to the first embodiment;

FIG. 3 is a block diagram showing the arrangement of contacts of the first embodiment;

DETAILED DESCRIPTION OF THE PREFERRED EMBODIMENTS

[First Embodiment]

The first embodiment of the present invention will be described in detail with reference to the accompanying drawings.

Figure 1:
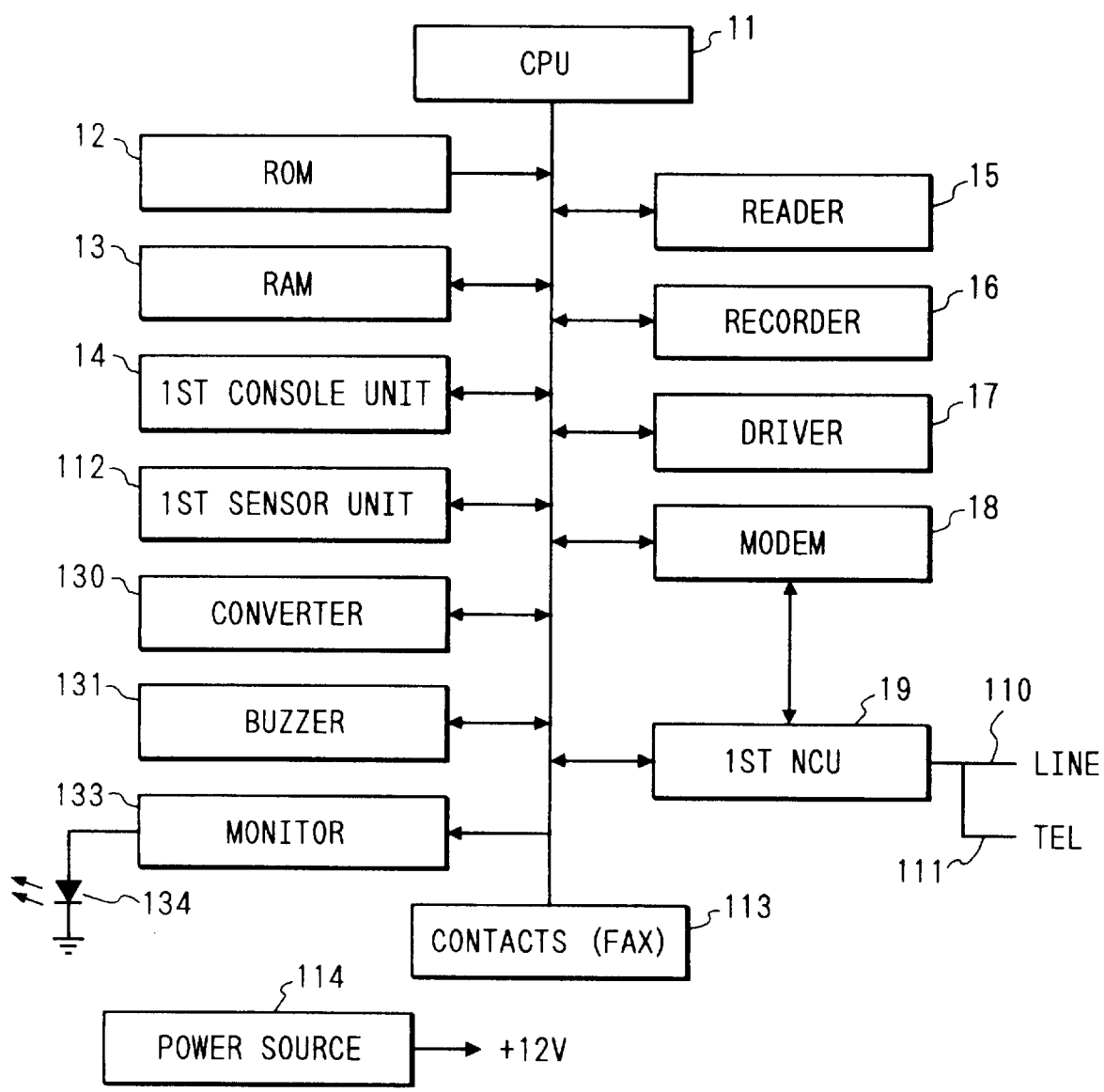
FIG. 1 is a block diagram showing the arrangement of a main body according to the first embodiment of the present invention.

The present invention comprises a main body and an external device, and FIG. 1 is a block diagram of the main body.

Referring to FIG. 1, a CPU 11 has a function of controlling the overall operation of the facsimile apparatus according to programs stored in a ROM 12, i.e., a function of controlling a RAM 13, a first console unit 14, a reader 15, a recorder 16, a driver 17, a modem 18, a first NCU 19, a first sensor unit 112, contacts (FAX) 113, and a buzzer 131. At the same time, the CPU 11 has a serial data communication interface and performs various data communications with other apparatuses through the contacts (FAX) 113.

The RAM 13 stores binary image data read by the reader 15 and stores binary data recorded by the recorder 16. The binary image data stored in the RAM 13 is modulated by the modem 18 and transmitted from a subscriber line 110 through the first NCU 19. A signal received through the subscriber line 110 is demodulated by the modem 18 through the first NCU 19, and the demodulated binary data is stored in the RAM 13.

The first console unit 14 includes a transmission/reception start key, a mode key for designating an image quality mode such as fine and standard modes of the image to be transmitted, a copy key for performing a copy operation, an economy key for designating an energy-saving mode in recording/printing in use of a battery, and a stop key for stopping the operation of the main body. The CPU 11 always detects the states of these keys and controls the respective components in accordance with the states of the keys.

The reader 15 includes a CCD or contact image sensor (CS), an IC, and a binarizing circuit. The reader 15 causes the CCD or CS to convert the read data into binary data under the control of the CPU 11 and sequentially sends the binary data to the RAM 13.

The recorder 16 includes a DMA controller, a B4/A4 size thermal head, and an IC. The recorder 16 reads out the recorded data from the RAM 13 under the control of the CPU 11 and prints out the recorded data as a hard copy.

The driver 17 includes a stepping motor for driving feed/discharge rollers in the reader 15 and the recorder 16, gears for transmitting the driving force of the motor, and a driver circuit for controlling the motor.

The modem 18 includes G3, G2, G1, and old FM modems, and a clock generator connected to these modems. The modem 18 modulates the transmission data stored in the RAM 13 under the control of the CPU 11 and outputs the modulated data to the subscriber line 110 or a mobile communication unit 111 through the first NCU 19. In addition, the modem 18 receives an analog signal from the subscriber line 110 or the mobile communication unit 111 through the first NCU 19, demodulates it, and stores it in the RAM 13. The mobile communication unit is defined as a radio communication unit such as a portable telephone or a mobile telephone, and the mobile communication line is defined as a line used for the portable telephone and the mobile telephone.

The first NCU 19 comprises a DC loop circuit and a 2-to-4 wire converter and connects the subscriber line 110 or the mobile communication unit 111 to the modem 18. The subscriber line 110 is connected to the first NCU 19.

The mobile communication unit 111 is a line for mobile communicating means connected to the first NCU 19.

The first sensor unit 112 includes a recording paper width sensor, a recording paper presence sensor, an original sheet width sensor, and an original sheet presence sensor. The first sensor unit 112 detects the states of the original sheet and the recording paper under the control of the CPU 11.

The contacts (FAX) 113 serve as an interface for exchanging signals with the main body and the external device and supplying power, and a detailed description of the contacts (FAX) 113 will be made later.

A power source 114 supplies the power to the respective components. More specifically, the power source 114 supplies a DC voltage of +12 V by means of a battery, an AC power source, or a car battery. The power source 114 will be described in detail later with reference to FIGS. 5A to 5C.

A voltage converter 130 includes a series regulator, a switching regulator, a DC/DC converter, converts the DC voltage of +12 V from the power source 114 into a DC voltage of +5 V, and outputs the DC voltage of +5 V.

The buzzer 131 comprises a buzzer and a buffer driver and generates a warning tone under the control of the CPU 11.

A voltage monitor 133 includes a voltage setting circuit, a comparator, and an LED flash ON and OFF driver. The voltage monitor 133 monitors the DC voltage of +12 V input from the power source 114 and flashes an LED 134 ON and OFF when the input voltage becomes lower than the set voltage.

The LED 134 is driven by the voltage monitor 133. When the voltage from the power source 114 becomes lower than the set voltage, the LED 134 informs it to the user.

The external device will be described with reference to the block diagram of FIG. 2.

A CPU 21 has a function of controlling the overall operation of the main body in accordance with programs stored in a ROM 22, i.e., a function of controlling a RAM 23, a non-volatile RAM 24, a character generator (CG) 25, a message generator 26, a message recorder 27, a second console unit 28, a display 29, a second sensor unit 210, a second NCU 211, a select signal sender 215, and a speaker 216. The CPU 21 has a serial data communication interface and exchanges various data with other apparatuses through contacts (external) 214.

The RAM 23 is used as a serial data communication data buffer, a work area of the CPU 21, and the like.

The non-volatile RAM 24 comprises, e.g., an EEPROM or an SRAM backed up by a battery. The non-volatile RAM 24 can store data even if the voltage supplied to the external device is withdrawn. More specifically, the non-volatile RAM 24 stores, e.g., data sent from other apparatuses in the form of serial data, data corresponding to the name of destination and the telephone number of the destination input through the second console unit 28, and other registered data.

The CG 25 comprises a ROM for storing characters such as JIS and ASCII codes. The CG 25 reads out character data corresponding to a predetermined code in response to 2-byte data, as needed, under the control of the CPU 21.

The message generator 26 stores prestored message data and sends the message data to a line 212 through the second sensor unit 210 under the control of the CPU 21.

The message recorder 27 records or reproduces the analog signal (on the line) input through the second NCU 211 under the control of the CPU 21. The message recorder 27 comprises, e.g., a magnetic tape or a memory.

The second console unit 28 includes a 3-mode (i.e., manual, FAX/TEL (facsimile/telephone or F/T) auto change, and automatic answer/record phone modes) selection switch, a ten-key pad, a one-touch key, and a function key.

The display 29 includes a liquid crystal display (LCD) and displays various pieces of information under the control of the CPU 21 on the LCD. The CPU 21 has a real-time clock for reading the current time and displaying it on the LCD.

The second sensor unit 210 includes a sensor (e.g., a reflection sensor) for detecting the remaining amount of recording paper. The second sensor unit 210 has a function of informing detection data to the CPU 21.

The second NCU 211 has a function of causing a CML relay to switch a transmission signal TX and a reception signal RX at the contacts (external) 214 through a jack for connecting an external telephone set to the line 212, an OFF-hook detector of this telephone set, a CI signal detector connected to the OFF-hook detector, an FC signal (a ringing signal from a 1,300-Hz facsimile network) detector, a CNG signal detector 25, the message recorder 27 and a 2-to-4 wire converter.

Figure 6:
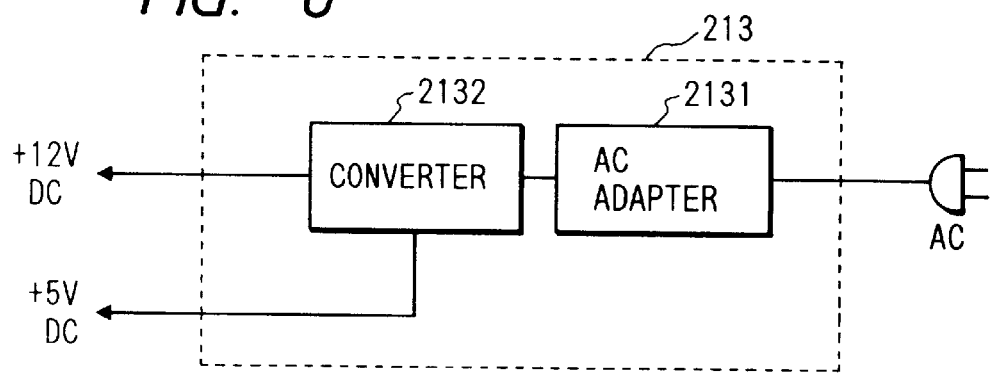
FIG. 6 is a block diagram showing the arrangement of a power source of an external device of the first embodiment.

A power source 213 receives an AC voltage and generates DC voltages of +12 V and +5 V. The DC voltage of +12 V is supplied to the contacts (external) 214. Note that the details of the power source 213 are shown in FIG. 6.

The contacts (external) 214 comprise 12 contacts, i.e., contacts of +12 V, GND (+12 V), +5 V, GND (+5 V), TX, RX, serial TX (STX), serial RX (SRX), MBUSY, SBUSY, BAT/AC, DSK/PRT signals or voltages.

The select signal sender 215 sends out select signals such as pulse dialer and a tone dialer through the second sensor unit 210 under the control of the CPU 21.

The speaker 216 outputs various message signals under the control of the CPU 21.

A quasi-CI generator 217 outputs a quasi-CI signal to the external telephone set under the control of the CPU 21.

The external device is connected to the line 212, the external telephone set, and the AC power source.

The details of the external device have been described above.

FIG. 3 shows the contacts between the FAX main body and the external device according to the present invention.

Contacts 31 connect the contacts (FAX) 113 of FIG. 1 to the contacts (external) 214 of FIG. 2 so as to connect the FAX main body to the external device and exchange signals therebetween and supply voltages thereto.

The contacts 31 comprise the contacts (FAX) 113 and the contacts (external) 214 and perform the following interface operations. A voltage of +12 V is applied from the external device to the main body. GND (+12 V) is common to the main body and the external device. A voltage of +5 V is regulated by the voltage of +12 V in the main body and is input to the external device. The transmission signal TX is modulated by the modem in the main body and is sent onto the line through the second NCU 211. The reception signal RX is received by the modem 18 through the second NCU 211 in the external device. A signal line STX is used for serial data transmitted from the main body to the external device. A signal line SRX is used for serial data transmitted from the external device to the main body. The MBUSY signal is a signal for informing a serial data receive enable mode in the main body. The SBUSY signal is a signal for informing a serial data receive enable mode in the external device. The signal BAT/AC causes to send a signal representing the type of power source as the battery, AC power source or car battery to the CPU 11 in the main body. The signal DSK/PRT causes to send, from the external device or the battery to the CPU 11 in the main body, a signal for determining whether the main body is independently used or is used upon connection of the external device thereto.

Figure 4A:
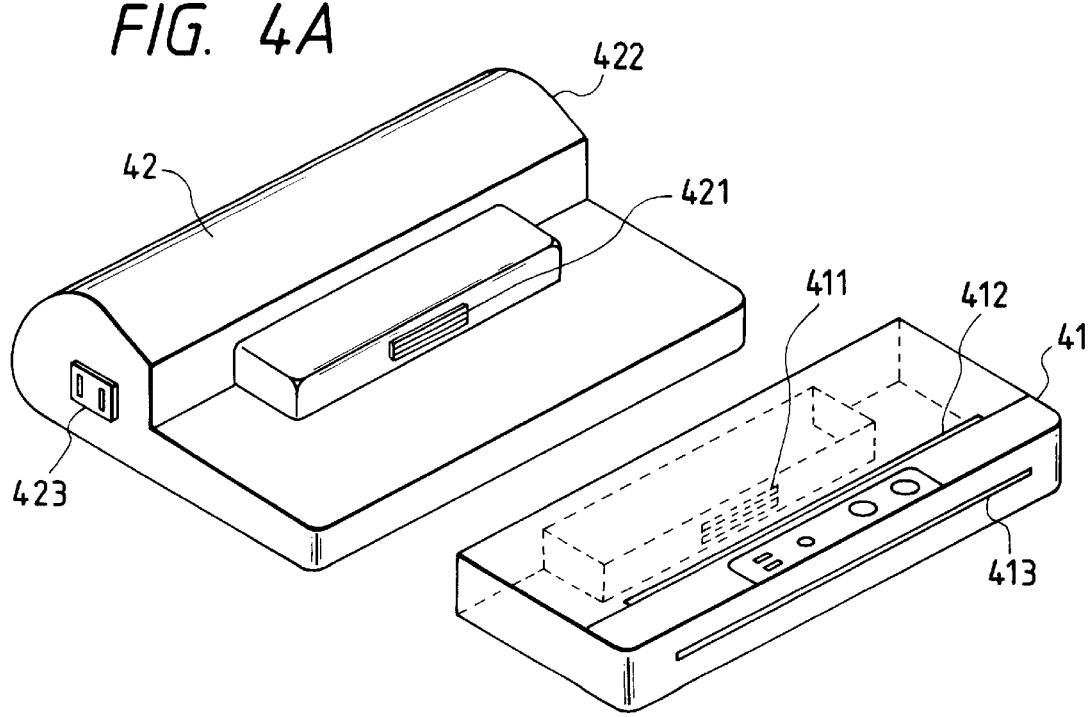
FIGS. 4A and 4B are perspective views of the first embodiment.

FIG. 4 is a view showing the outer appearance of the first embodiment.

A facsimile main body 41 is a facsimile main body in a portable state and is constituted by the block diagram shown in FIG. 1. A contact interface 411 is operated when the facsimile main body is set in the portable state. A facsimile external device 42 is used when the facsimile main body is set in the stationary state and is constituted by the block diagram shown in FIG. 2. A contact interface 421 is operated when the facsimile main body is used in the stationary state. A storage portion 422 stores a roll of paper. An AC outlet 423 is connected to a battery charger for charging a battery when the apparatus is used in the portable state, thereby charging the battery. A stationary state 43 shows that the portable facsimile main body is combined with the stationary external device and is used on the desk.

Handling of the recording paper will be described below. In the portable state wherein only the main body is used, the recording paper is manually fed. When the recording paper is inserted, the main body feeds the recording paper by 2 to 3 mm. At the start of the reception or copy operation, the recording paper is fed. In the portable state, a cut sheet is used as the recording paper. The size of the cut sheet to be used can be designated by the operator in advance. In the stationary state wherein the main body is combined with the external device, the leading end of the roll of paper stored in the external device is inserted in the facsimile main body upon a power-ON operation. The main body feeds the leading end of the inserted recording paper by 2 to 3 mm.

The recording paper is then fed at the start of a reception or copy operation.

Figure 5A:
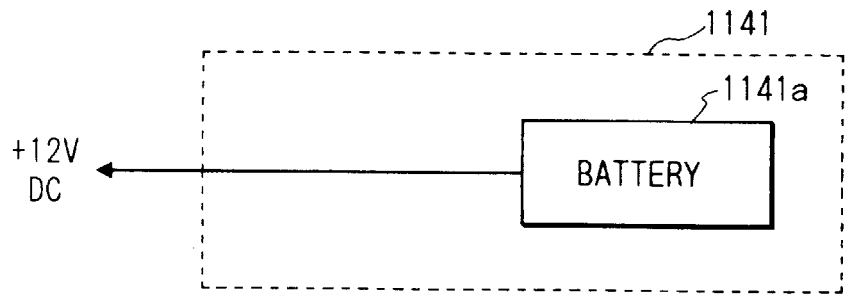
FIGS. 5A to 5C are block diagrams showing the arrangements of a power source of the main body of the first embodiment.
Figure 5B:
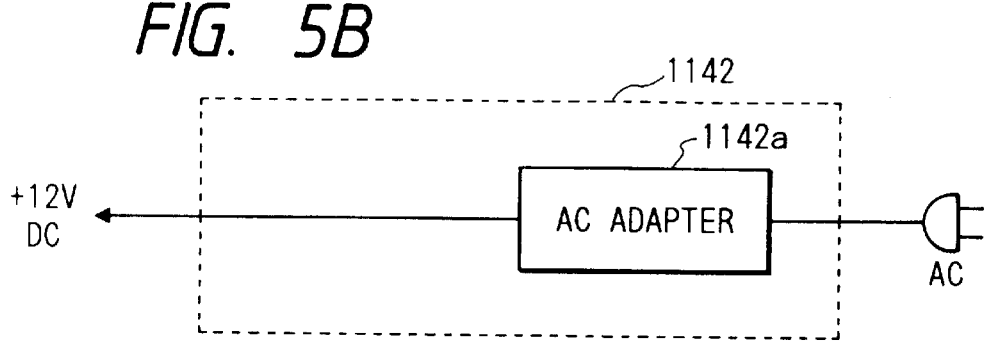
Figure 5C:
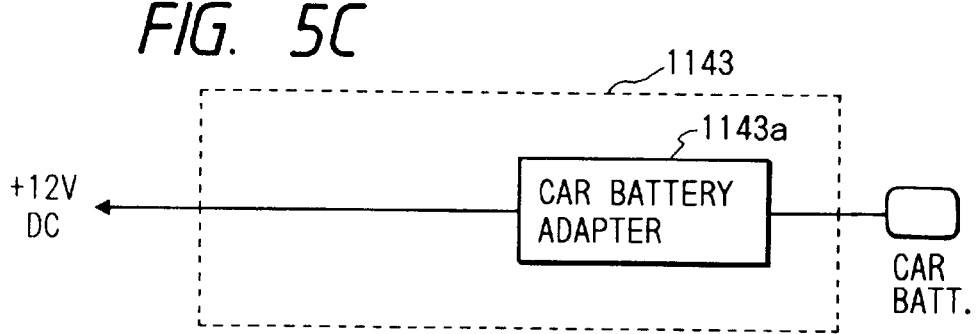

FIGS. 5A to 5C are views showing the arrangements of the power source 114 of the main body in detail. The power source is used in the three arrangements shown in FIGS. 5A to 5C and supplies a voltage of +12 V.

A power source 1141 is constituted by a DC battery 1141a of +12 V. A power source 1142 is constituted by an AC adapter 1142a for converting an AC voltage into a DC voltage of +12 V. A power source 1143 is constituted by a car battery adapter 1143a for converting a DC voltage from the car battery into a stable DC voltage of +12 V.

FIG. 6 shows the power source 213 in detail. The power source 213 generates a DC voltage of +12 V and a DC voltage of +5 V from the AC voltage. The DC voltage of +12 V is applied to the contacts (external) 214.

In the above arrangement, the operation of the apparatus of the first embodiment will be described with reference to a flow chart in FIG. 7. This sequence is stored as a program of the CPU 11 in the ROM 12.

A normal operation will be described first, and then an operation upon the power-ON operation will be described next. The stand-by mode is set upon the power-ON operation. It is determined in step S1 whether the original sheet is present. If YES in step S1, the flow advances to step S2 to feed and set the original sheet.

However, if the original sheet is absent, an original sheet is set, and it is determined in step S3 according to the signal DSK/PRT from the contacts whether the apparatus is set portable or stationary. The signal DSK/PRT is a signal for determining whether the apparatus is set stationary or portable, and the signal DSK/PRT is shown in FIG. 19 in detail.

Figure 19:
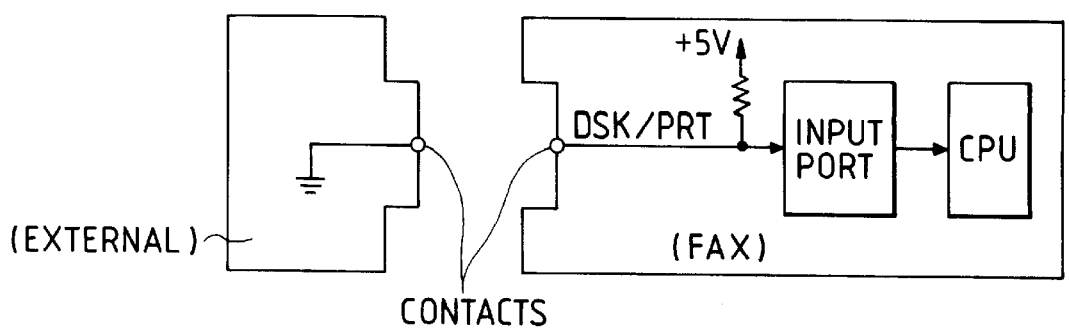
FIG. 19 is a block diagram showing a scheme for determining whether the facsimile apparatus is a stationary or portable one.

Referring to FIG. 19, the signal DSK/PRT in the main body is pulled up to the voltage of +5 V and is input to an input port in the CPU. In the stationary state wherein the main body is connected to the external device, the signal DSK/PRT is grounded through the contacts, and the signal DSK/PRT=0 (Low level) is set. In the portable state wherein the main body is disconnected from the external device, the contacts are open, so that the signal DSK/PRT=1 (High level) is set.

Figure 11:
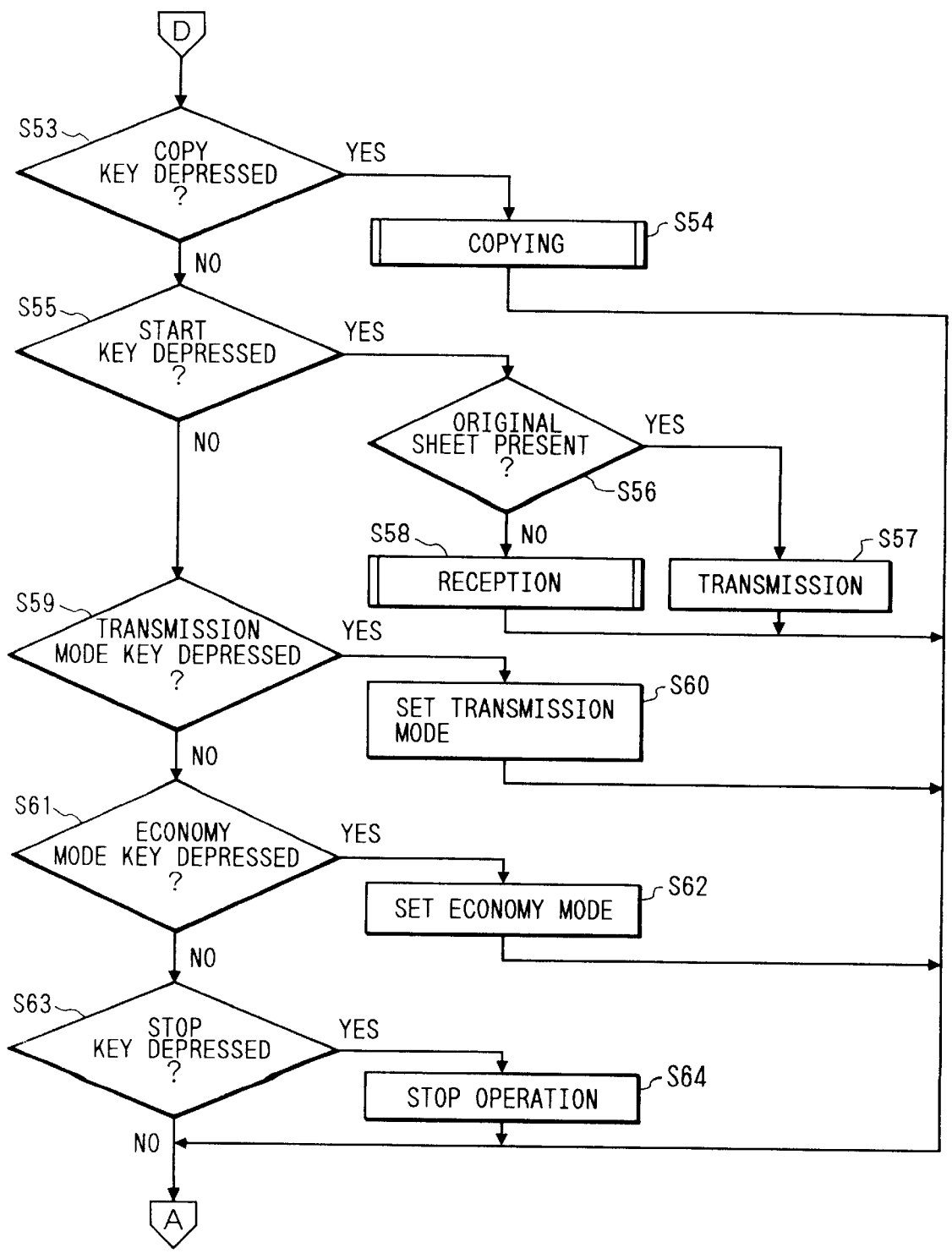
FIG. 11 is a flow chart showing the facsimile operation of the first embodiment.

If the signal DSK/PRT=1 in step S3, the CPU determines that the current state is the portable state, and the flow advances to step S4. It is determined in step S4 whether the recording paper is present. If YES in step S4, the flow advances to step S5 to fed and set the recording paper. However, if NO in step S4, the recording paper is set, and a flow D (FIG. 11) is initiated.

If the signal DSK/PRT=0 in step S3, then the CPU determines the stationary state wherein the main body is connected to the external device. The flow advances to step S6 to determine whether the recording paper is present. If NO in step S6, a display command is sent to the display in step S7 to prompt the operator to confirm the replacement or state of recording paper (e.g., to fill paper or check paper). At the same time, a speaker command is sent to the speaker. When the recording paper is set and after the display and speaker commands are sent out, the flow advances to step S8.

Figure 8:
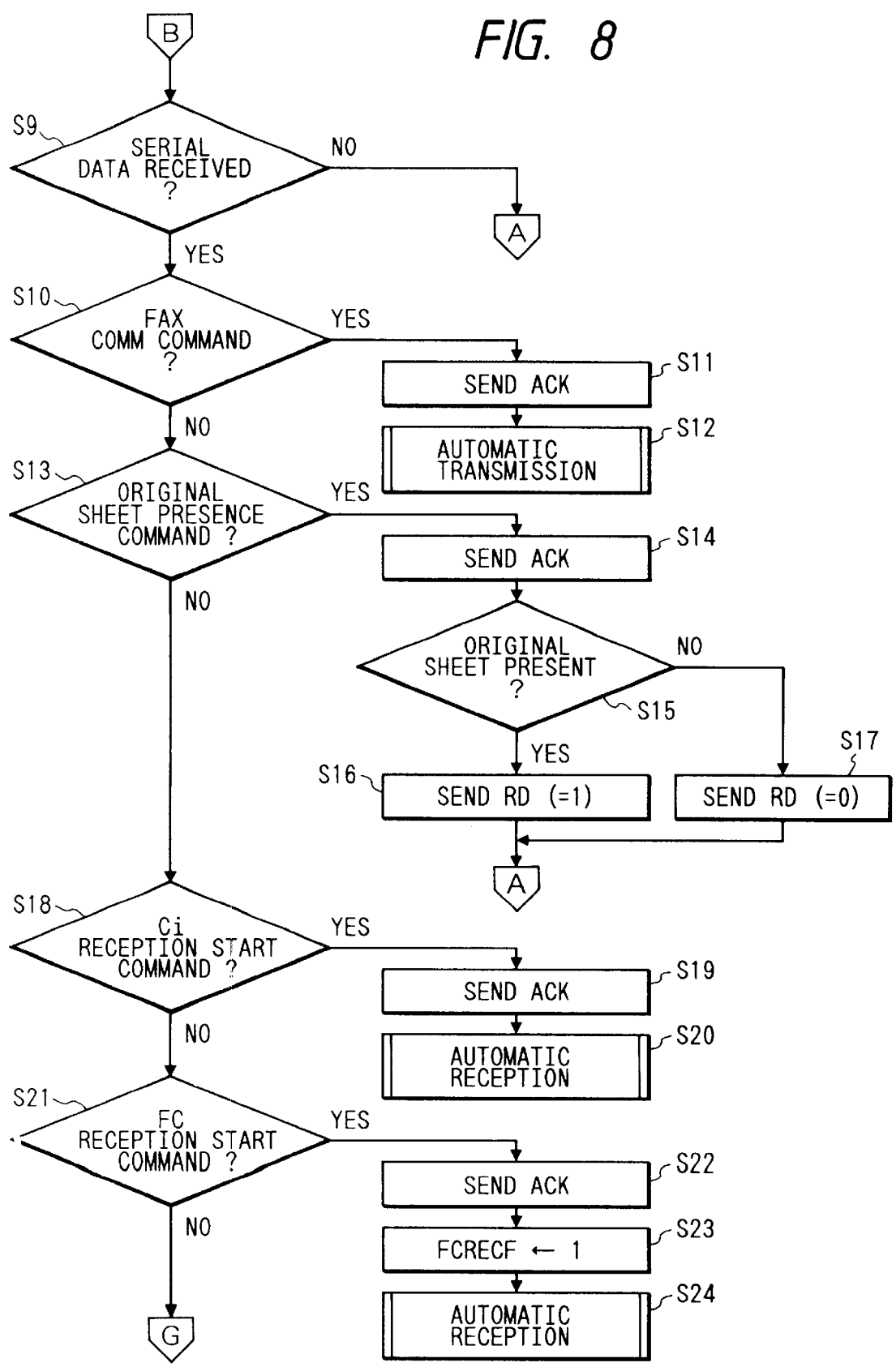
FIG. 8 is a flow chart showing the facsimile operation of the first embodiment.
Figure 10:
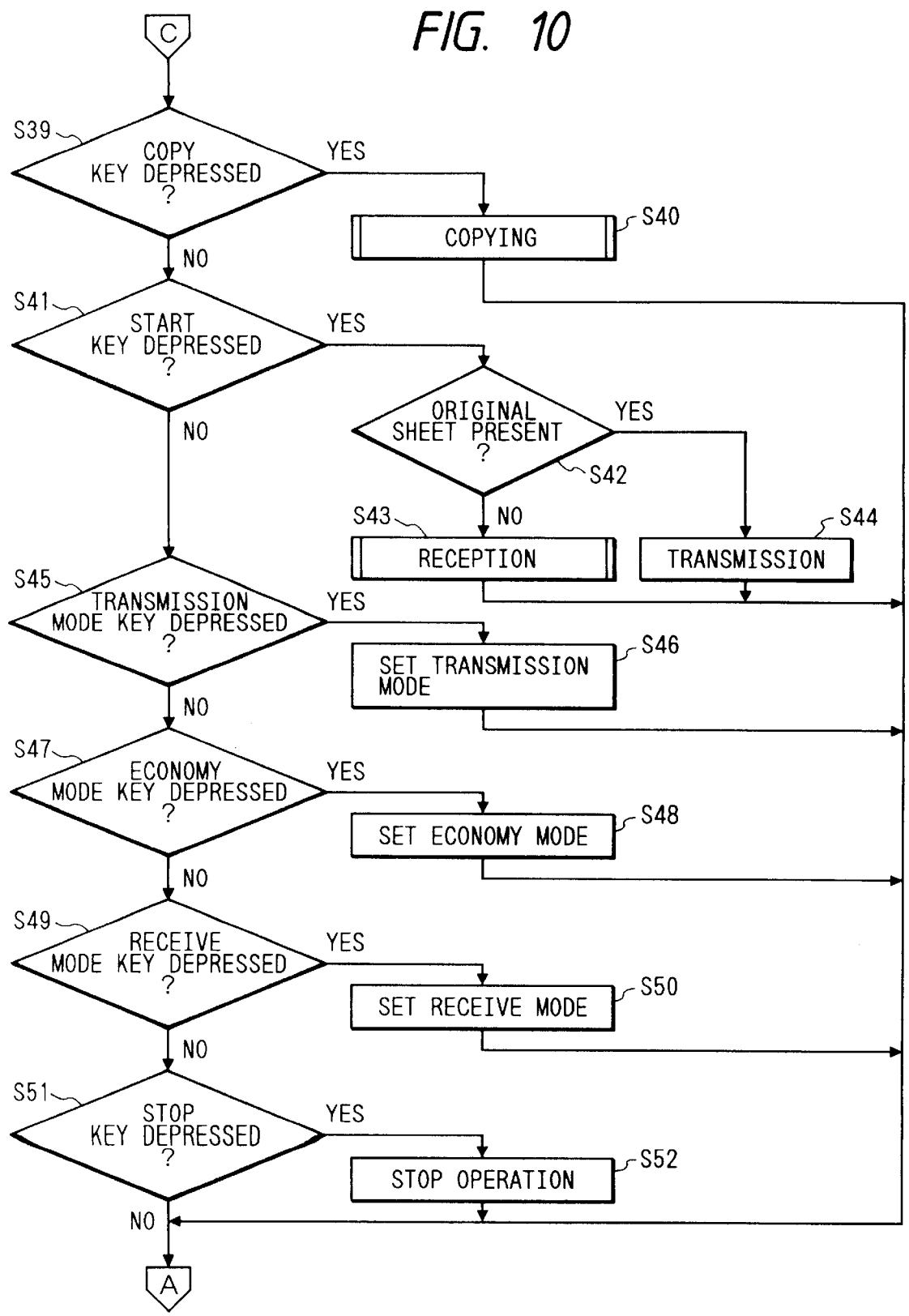
FIG. 10 is a flow chart showing the facsimile operation of the embodiment.

It is determined in step S8 whether any one of the keys in the first console unit 14 is depressed. If YES in step S8, the operation for determining a key input in the stationary state in a flow C (FIG. 10) is performed. However, if NO in step S8, a flow B (FIG. 8) is initiated.

Figure 9:
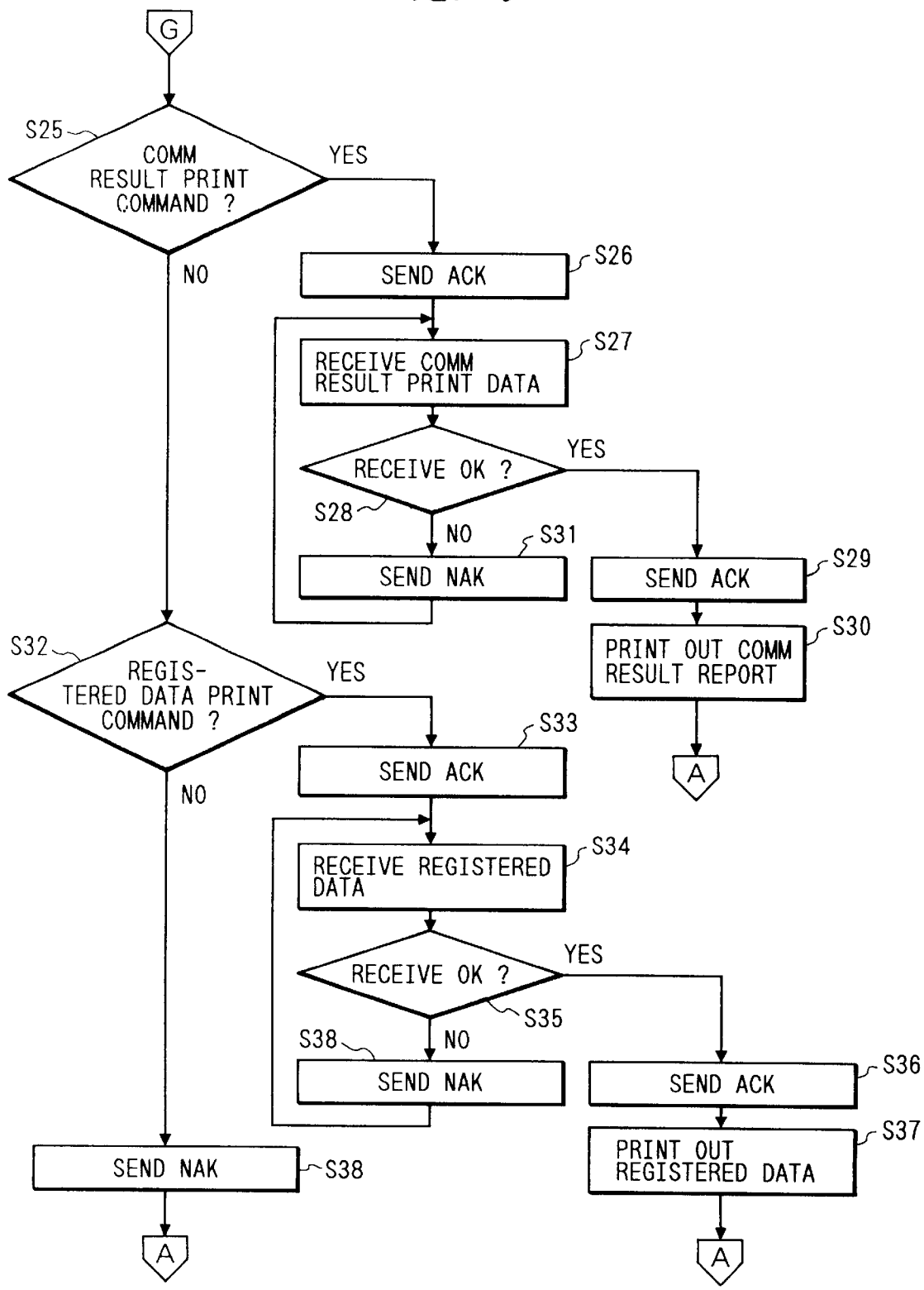
FIG. 9 is a flow chart showing the facsimile operation of the first embodiment.

In the flow B, when serial data is received from the external device in step S9, a FAX communication command, an original sheet presence command, a CI reception start command, an FC reception start command, a communication result report print command (communication result print command), and a registered data print command are determined in steps S10, S13, S18, S21, S25 (FIG. 9), and S32 (FIG. 9), respectively, and the corresponding operations are performed. When the received command is not one of the commands described above, an NAK signal (i.e., a signal representing that the command signal is not acknowledged) is output to the external device in step S38 (FIG. 9), and the flow returns to the stand-by state (FIG. 7).

When the FAX communication command is received in step S10, an ACK signal (i.e., a signal representing the command signal is acknowledged) is sent out in step S11, and automatic transmission is performed in step S12.

When the original sheet presence command is received in step S13, an ACK signal is sent out in step S14. If the presence of the original sheet is detected by the original presence sensor (DS) of the FAX main body in step S15, a serial signal RDS=1 is sent out to the external device, and the flow returns to the stand-by state (FIG. 7).

If the CI reception start command is received in step S18, an ACK signal is sent out in step S19, and automatic reception is performed in step S20.

If the FC reception start command is received in step S21, an ACK signal is sent out in step S22. In step S23, a flag FCRECF representing FC reception is set at logic "1" to indicate that FC reception is made. Automatic reception is performed in step S24.

If the communication result print command is received in step S25 (FIG. 9), an ACK signal is output in step S26. Coded data of communication result report data is received as serial data from the external device in step S27. If the received data is correct, i.e., if the data reception is O.K. in step S28, an ACK signal is output in step S29. The coded data is developed into an image in step S30 to print out the communication result report in a predetermined format, and the flow returns to the stand-by state (FIG. 7). If NO in step S28, an NAK signal is output in step S31 to receive data again. Whether the received data is correct is determined by detection of a check sum and a signal end mark.

If the registered data print command is received in step S32, the sum registered data print operation as in the communication result report in steps S26 to S31 is performed in steps S33 to S38.

Figure 7:
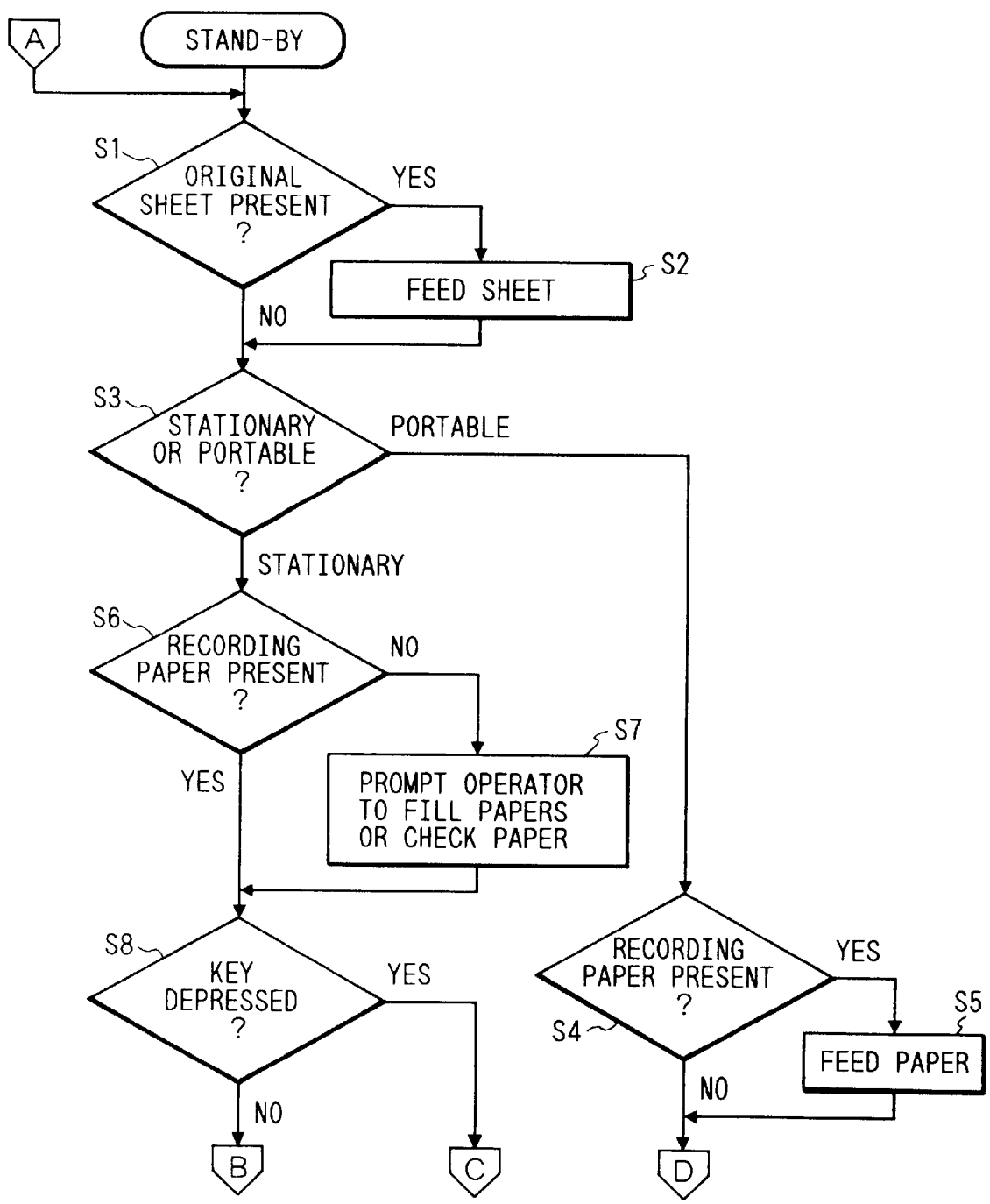
FIG. 7 is a flow chart showing a facsimile operation of the first embodiment.

If the received command is a signal except for the FAX communication command, the original sheet presence command, the CI reception start command, the FC reception start command, the communication result report command (communication result print command), and the registered data print command, a signal NAK (i.e., a signal representing the input command signal is not acknowledged) is sent out to the external device in step S38, and the flow returns to the stand-by state (FIG. 7).

An operation flow C (FIG. 10) in the stationary state will be described below.

It is determined in step S39 whether the copy key is depressed. If YES in step S39, the copy mode is set in step S40.

If NO in step S39, it is determined in step S41 whether the start key is depressed. If YES in step S41, it is determined in step S42 whether the original sheet for transmission is present. If YES in step S42, manual facsimile transmission is performed in step S43. If NO in step S43, the reception mode is set in step S44.

If NO in step S41, it is determined in step S45 whether a transmission mode key is depressed. If YES in step S45, the transmission mode (fine or standard) is set in step S46.

If NO in step S45, it is determined in step S47 whether an economy key is depressed. If YES in step S47, the economy mode is set in step S48 to perform a thin print operation in the print mode.

If NO in step S47, it is determined in step S49 whether the receive mode key is depressed. If YES in step S49, the receive mode (manual, FAX/TEL change, or automatic answer/record phone mode) is set in step S50.

If NO in step S49, it is determined in step S51 whether a stop key is depressed. If YES in step S51, the operation is immediately stopped in step S52, and the flow returns to the stand-by mode (FIG. 7).

If NO in step S51, i.e., if any key input is not detected, the flow also returns to the stand-by state (FIG. 7).

The operation flow D (FIG. 11) in the portable mode will be described below.

It is determined in step S53 whether the copy key is depressed. If YES in step S53, the copy mode is set in step S54.

If NO in step S53, it is determined in step S55 whether the start key is depressed. If YES in step S55, it is determined in step S56 whether an original sheet for transmission is present. If YES in step S56, manual facsimile transmission is performed in step S57. If NO in step S56, the receive mode is set in step S58.

If NO in step S55, it is determined in step S59 whether the transmission mode key is depressed. If YES in step S59, the transmission mode (fine or standard) is set in step S60.

If YES in step S59, it is determined in step S61 whether the economy key is depressed. If YES in step S61, the economy mode is set in step S62 to perform a thin print operation in the print mode.

If NO in step S61, it is determined in step S63 whether the stop key is depressed. If YES in step S63, the operation is immediately stopped in step S64, and the flow returns to the stand-by state (FIG. 7).

If NO in step S63, i.e., if any key input is not detected, the flow also returns to stand-by state (FIG. 7).

Figure 12:
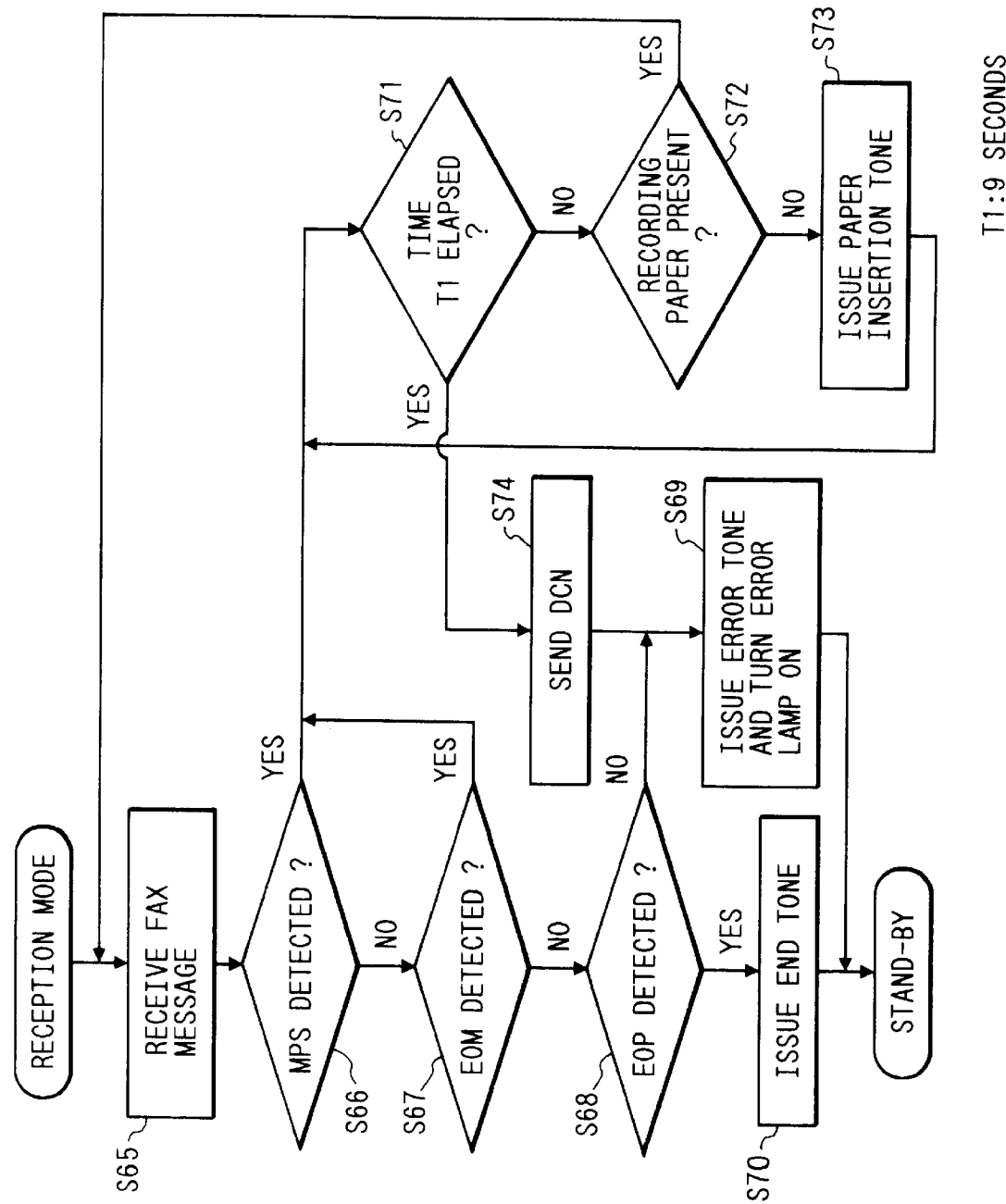
FIG. 12 is a flow chart showing a reception or receive mode of the first embodiment.

The reception operations in steps S43 (FIG. 10) and S58 (FIG. 11) will be described in detail with reference to a flow chart in FIG. 12.

When the reception or receive mode is set, conventional facsimile message reception is performed in step S65. Upon reception of an RTC (consecutive transmission of six EOLS), it is determined in steps S66, S67, and S68 whether signals MPS, EOM, and EOP are detected. If NO in steps S66, S67, and S68, an error tone is issued and the error lamp is turned on in step S69. The flow then returns to the stand-by state (FIG. 7).

If the signal EOP is detected in step S68, a signal MCF is output in step S70 if no image error is present. If an image error is present, an end tone is issued in step S70. The flow then returns to the stand-by state.

If the signal MPS or EOM is detected in step S66 or S67, it is determined in step S71 whether a time T1 has elapsed. The time T1 is defined as a period for setting the recording paper for the next facsimile message reception when manual reception using a cut sheet as the recording paper is to be performed. The time T1 is set to be about 9 seconds in consideration of the MCF reception time range on the transmission side. If NO in step S71, it is determined in step S72 whether the recording paper is set. If YES in step S72, the signal MCF is sent out to return to the facsimile message reception operation of step S65. However, if NO in step S71, a paper insertion tone for prompting the user to set the recording paper is generated in step S73, and the flow returns to step S71 to determine whether the time T1 has elapsed. If YES in step S71, a signal DCN is sent out in step S74. The error tone is issued and the error lamp is turned on in step S69. The flow then returns to the stand-by state.

Figure 13:
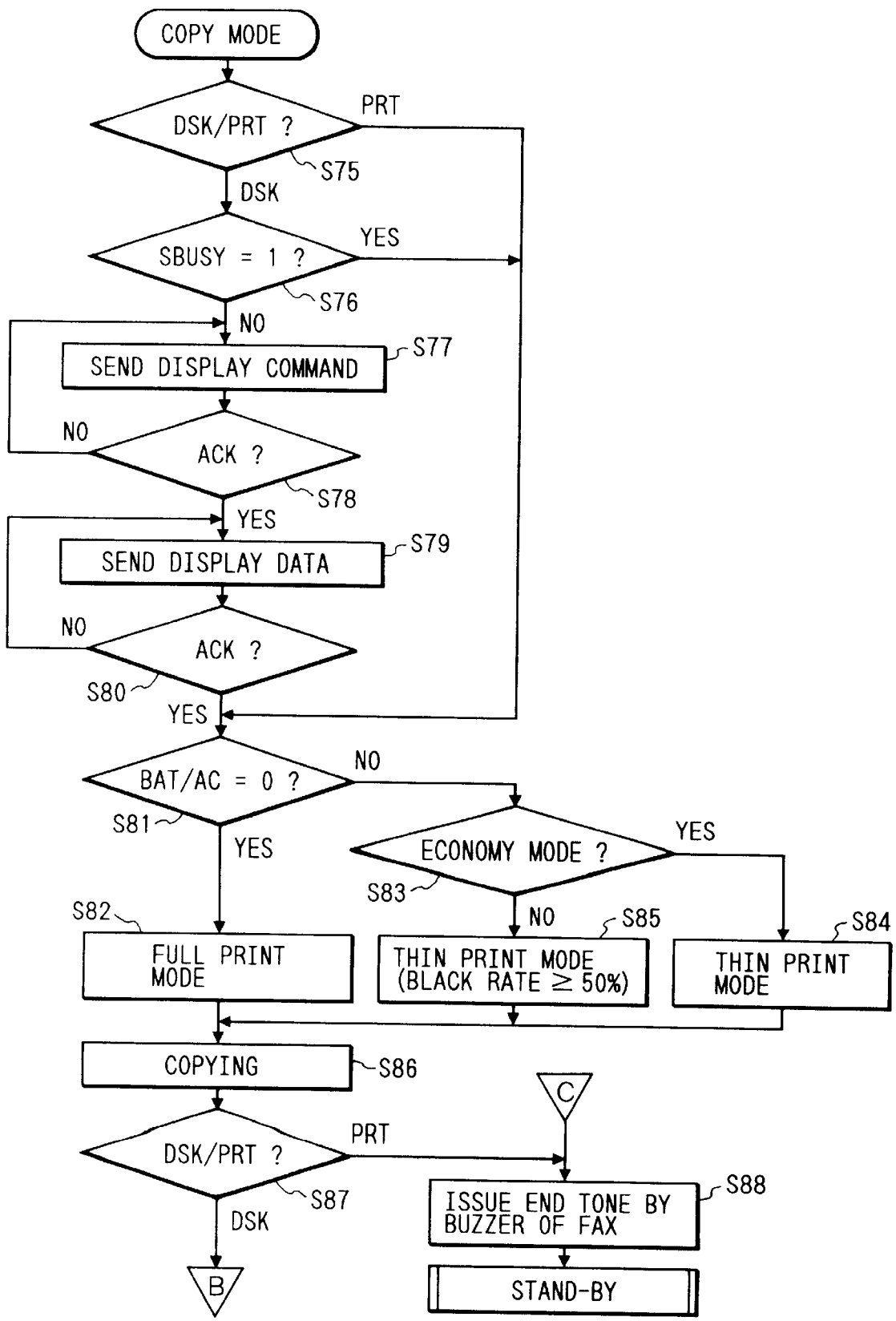
FIG. 13 is a flow chart showing a copy mode of the first embodiment.

The copy operation will be described in detail with reference to a flow chart in FIG. 13.

When the copy mode is set, it is determined in step S75 whether the signal DSK/PRT from the contacts is set high (PRT=1) or low (DSK=0). If YES in step S75, operations from step S81 are performed. However, if NO in step S75, the SBUSY signal in the external device is checked in step S76. If the SBUSY signal is set at logic "1", the external device is set in a state wherein a command cannot be received. In this case, no command is transmitted to the external device, and operations from step S81 are performed. However, if the SBUSY signal is set at logic "0", a display command is output to the external device in step S77. The display command is output a maximum of three times until an ACK signal is received.

When the ACK signal is received in step S78, display data is sent out in step S79. The data is transmitted a maximum of three times until an ACK signal is received in step S80. Upon reception of the ACK signal, it is determined in step S81 whether the signal BAT/AC from the contacts is set at logic "0". The signal BAT/AC is a signal for determining whether the power source is an AC power source or battery, and details of the signal BAT/AC are shown in FIG. 18.

Figure 18:
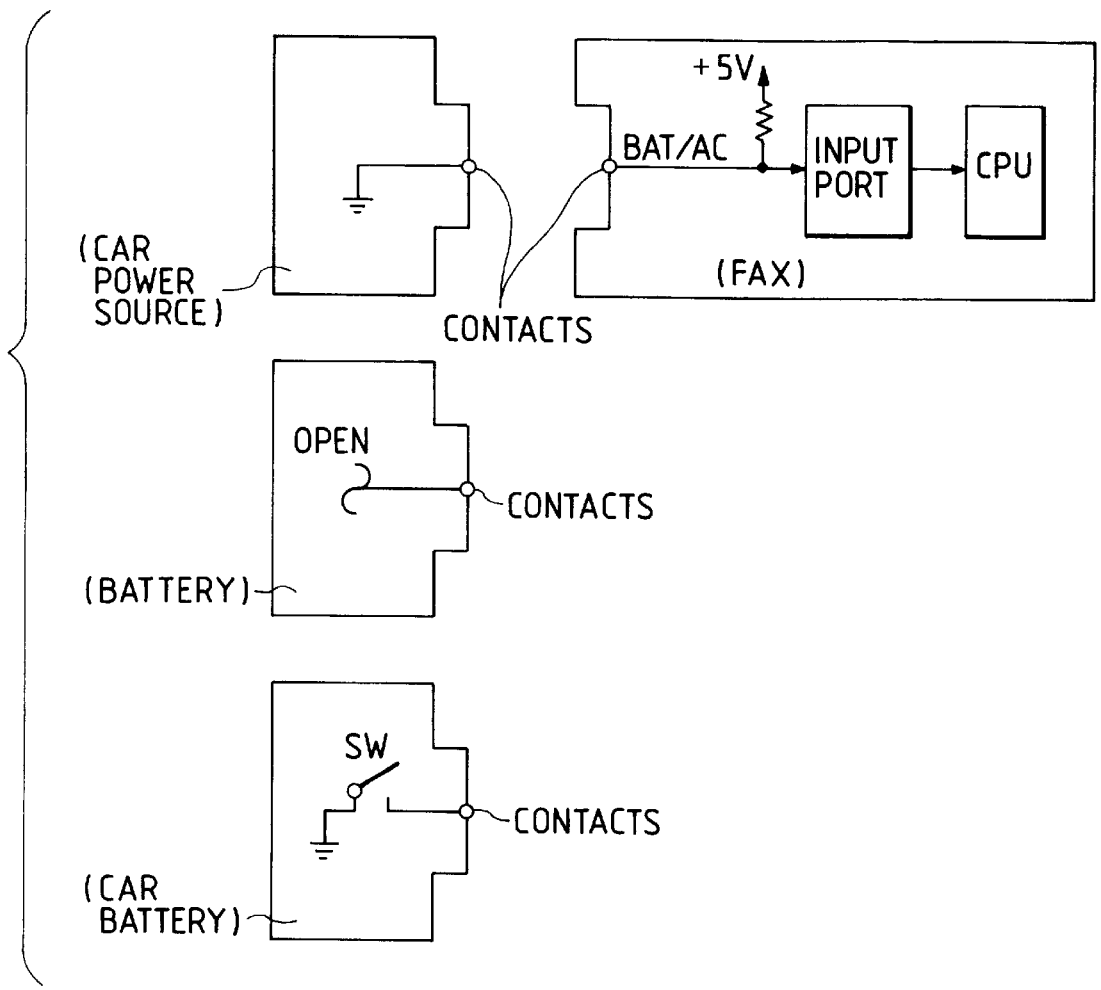
FIG. 18 is a block diagram showing power source determination schemes of the first embodiment.

Referring to FIG. 18, the signal BAT/AC in the main body is pulled up to a voltage of +5 V and is input to the input port of the CPU 11. When the AC power source is connected, the signal BAT/AC is grounded through the contacts and is therefore set to be the signal BAT/AC=0.

On the other hand, when the battery is connected, the signal BAT/AC is open through the contacts, and the signal BAT/AC=1 is set by the pull-up behavior in the main body. When a car battery is connected, the car battery switch is operated depending on the capacity of the car battery. If the car battery capacity is large, the switch is turned on, so that the signal BAT/AC=0 is set through the contacts. However, when the car battery capacity is small, the switch is turned off, so that the signal BAT/AC=1 is set through the contacts.

Figure 14:
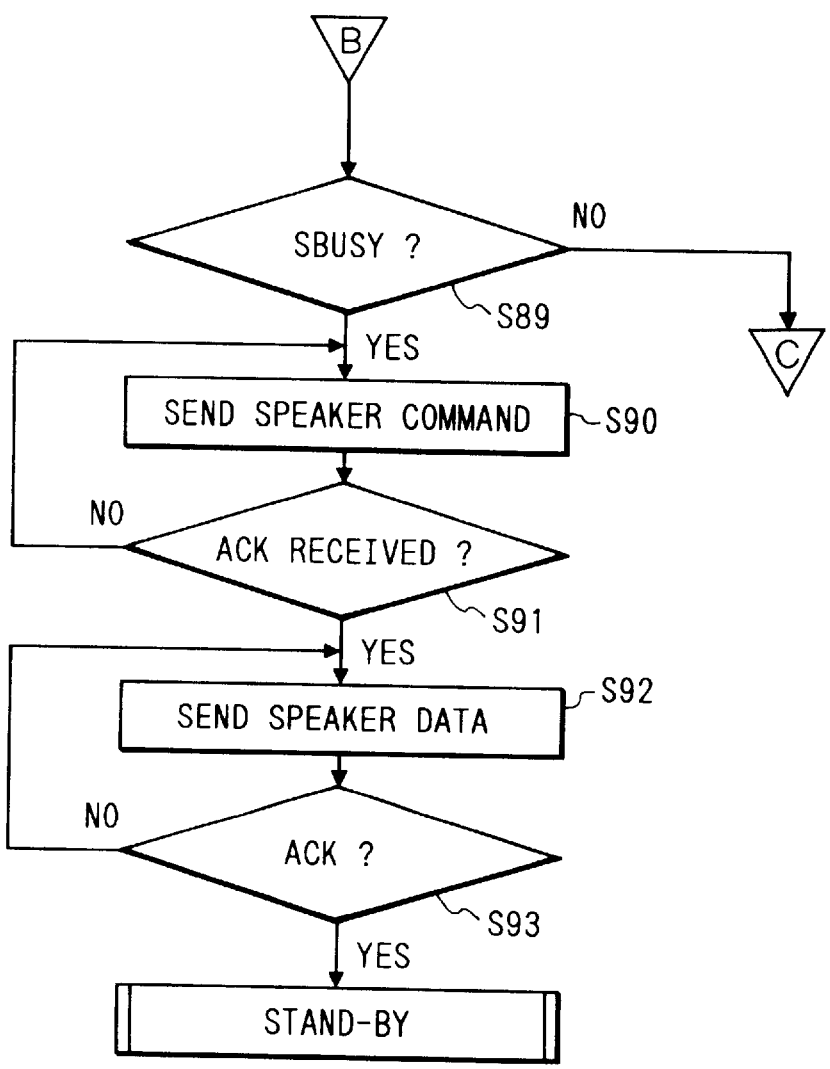
FIG. 14 is a flow chart showing the copy mode of the first embodiment.

If the signal BAT/AC=0 in step S81, then a full print mode is set in step S82. However, if the signal BAT/AC=1 in step S81, then it is determined in step S83 whether the economy mode is set. If YES in step S83, the thin print mode is set in step S84. If NO in step S83, a mode for thinning the data only when the black rate is equal to or higher than 50% in one read line of the original sheet is set. After the any one of the modes in steps S82, S84, and S85 is set, a copy operation is performed in step S86. At the end of copying, it is determined in step S87 whether the signal DSK/PRT represents PRT or DSK. If PRT is determined in step S87, an end tone is issued by the buzzer of the FAX (main body) in step S88, and the flow returns to the stand-by state (FIG. 7). However, if DSK is determined in step S87, the content of the SBUSY signal is determined in step S89 (FIG. 14). If SBUSY=1, then operations from step S88 (FIG. 13) are performed. However, if SBUSY=0 in step S89, a speaker command and speaker data are sent out in steps S90 (FIG. 14) and S92 (FIG. 14) as in the display command and display data in steps S77 (FIG. 13) and S79. When an ACK signal is received in step S93, the stand-by state (FIG. 7) is set.

The thin print mode and the mode for thinning the data only when the black rate in one line is 50% or more are energy-saving modes in use of a power source except for the AC power source. This also applies to the print operation of the facsimile message during reception.

During the operation in the copy mode, the line is switched to an external telephone set by the NCU.

Figure 15:
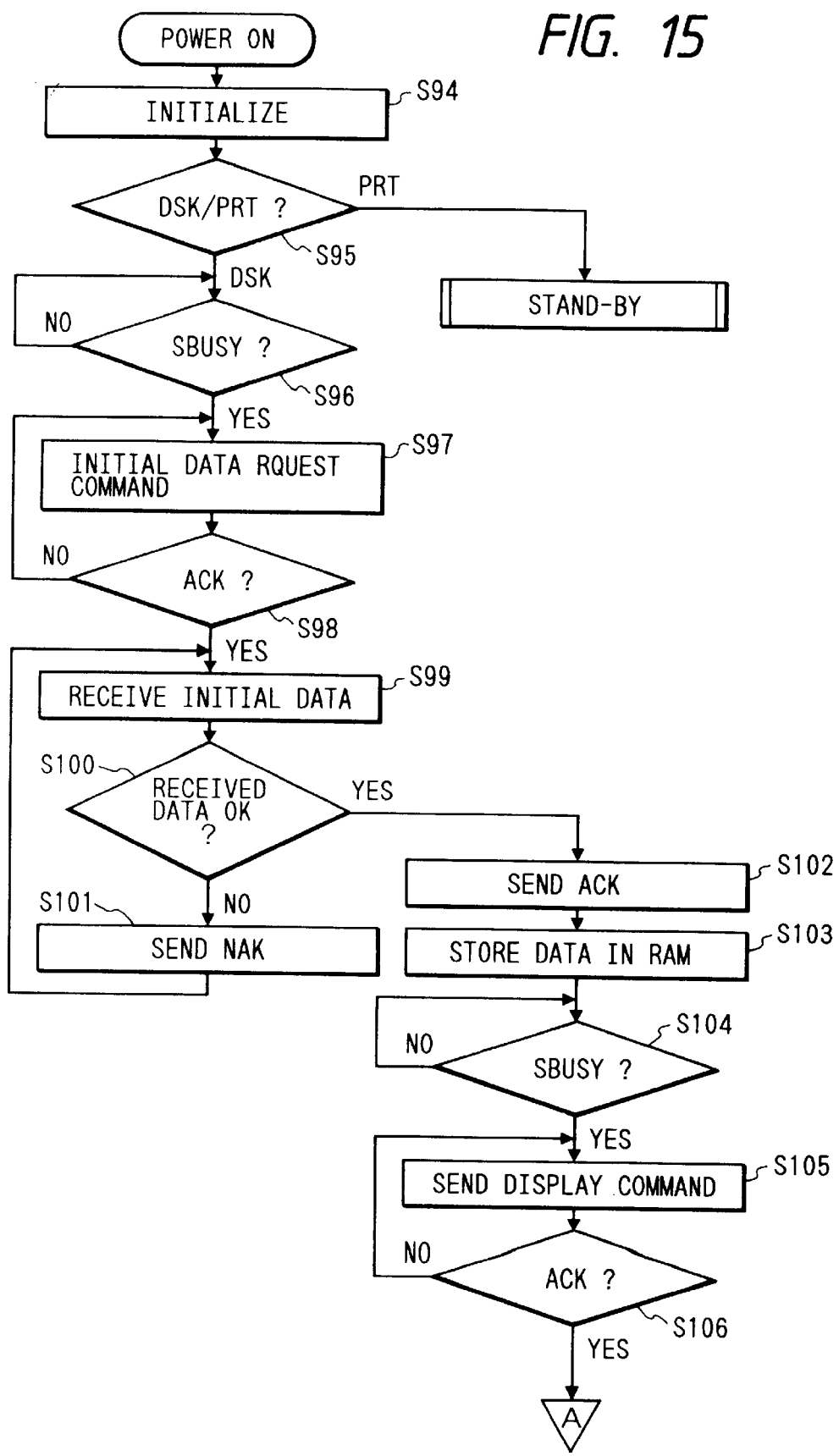
FIG. 15 is a flow chart showing a power-ON operation of the first embodiment.

The operation upon the power-ON operation will be described in detail with reference to a flow chart in FIG. 15.

Figure 16:
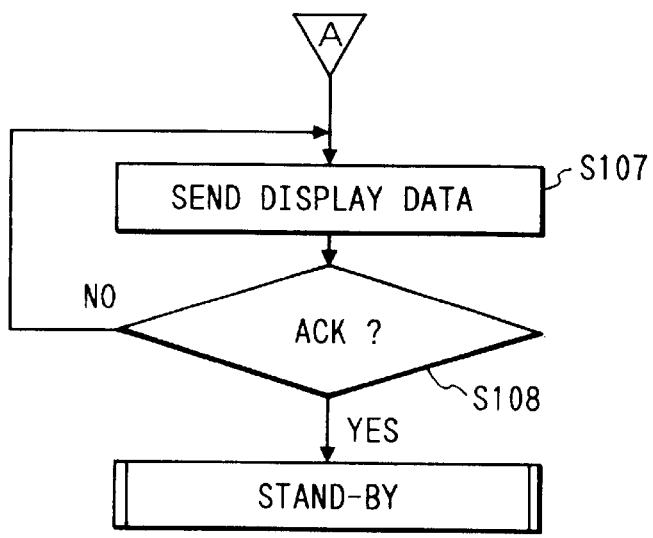
FIG. 16 is a flow chart showing the power-ON operation mode of the first embodiment.

Each I/O, the SRAM 13, and the like are initialized in step S94. If DSK/PRT=PRT in step S95, then the stand-by state (FIG. 7) is set. On the other hand, if DSK/PRT=DSK, then the CPU waits until the SBUSY signal in the external device goes to logic "0" in step S96. If SBUSY=0, then an initial data request command is transmitted to the external device in step S97. This command is repeatedly transmitted a maximum of three times until an ACK signal is received in step S98. Initial data is received from the external device in step S99. If the sum of reception data is zero, it is determined that the reception data is correctly received, and an ACK signal is output in step S102. The input initial data is stored in the RAM 13 in step S103. A display command and display data are transmitted in steps S104 to S108 (FIG. 16) as in steps S77 and S79 in FIG. 13. The time is displayed on the display of the external device, and the flow advances to the stand-by state.

Figure 17:
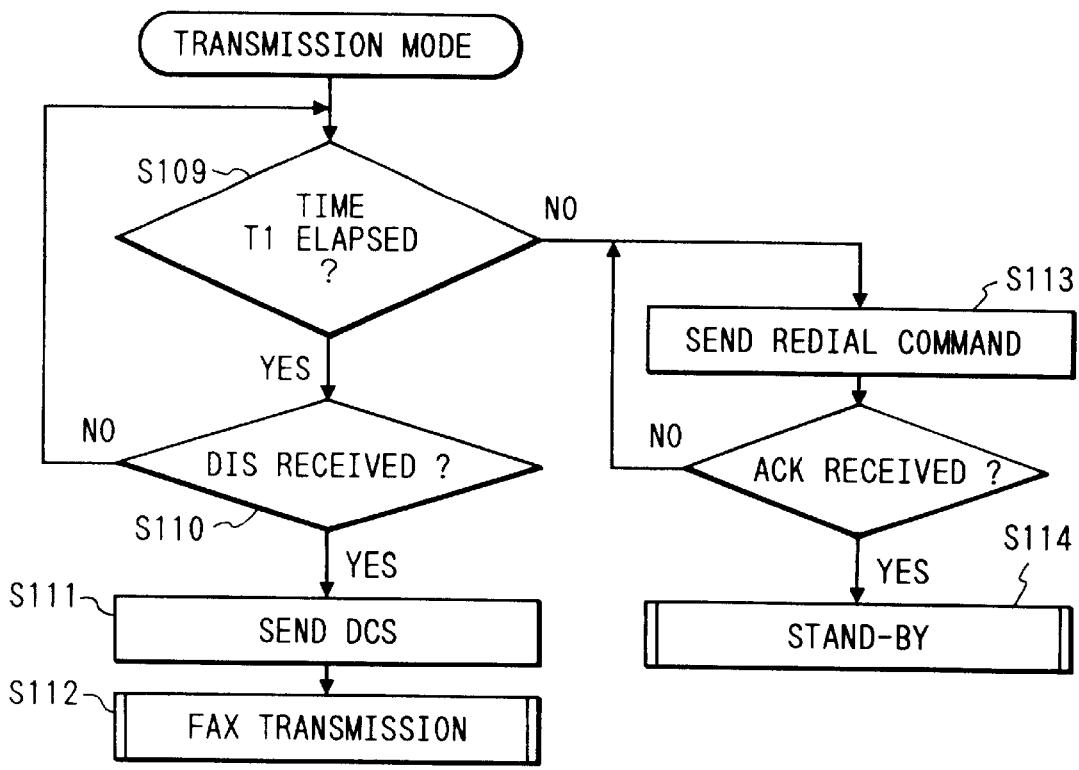
FIG. 17 is a flow chart showing a transmission mode in which a transmission command is received by the main body of the first embodiment.

An operation upon reception of the transmission command will be described on the basis of a flow chart in FIG. 17.

Upon reception of the transmission command, it is determined in step S109 whether 35 seconds have elapsed. After a signal DIS is received in step S110, normal FAX transmission defined by the CCITT T-30 is performed. When the source device cannot recognize that the destination is FAX within 35 seconds in step S109, a redial command is sent out to the external device in step S113. When an ACK signal is received in step S114, the stand-by mode is set.

Figure 20:
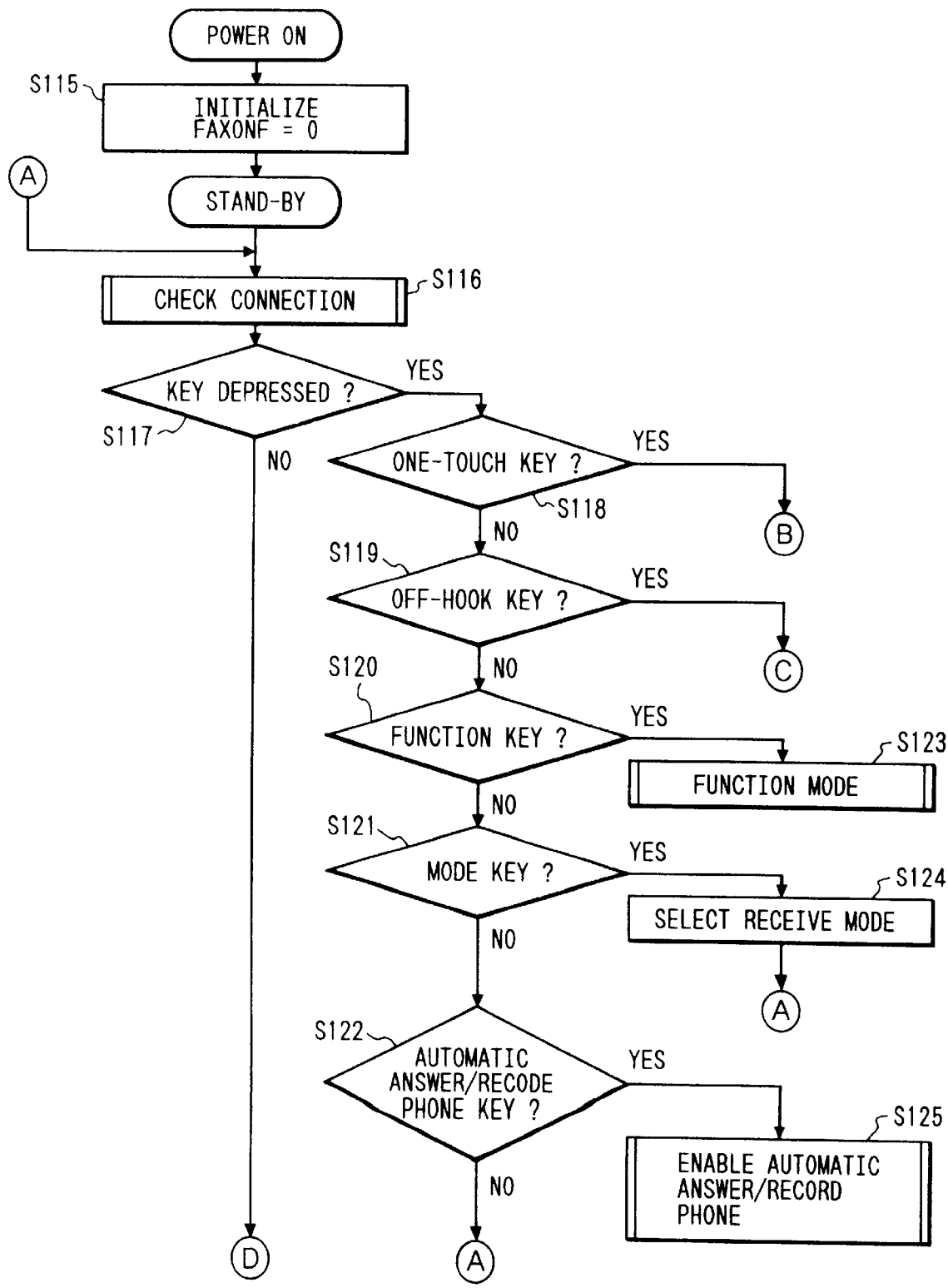
FIG. 20 is a flow chart showing a stand-by operation of the external device of the first embodiment.

The operation of the external device will be described in detail with reference to a flow chart in FIG. 20.

Upon a power-ON operation, each I/O, the SRAM 23, the non-volatile RAM or EEPROM 24, and the like are initialized in step S115. At this time, a flag FAXONF representing that the main body is connected to the external device is reset. The flag FAXONF represents that the main body is connected to the external device if FAXONF=1. Upon completion of initialization of the respective components, the flow advances to the stand-by mode.

Figure 21:
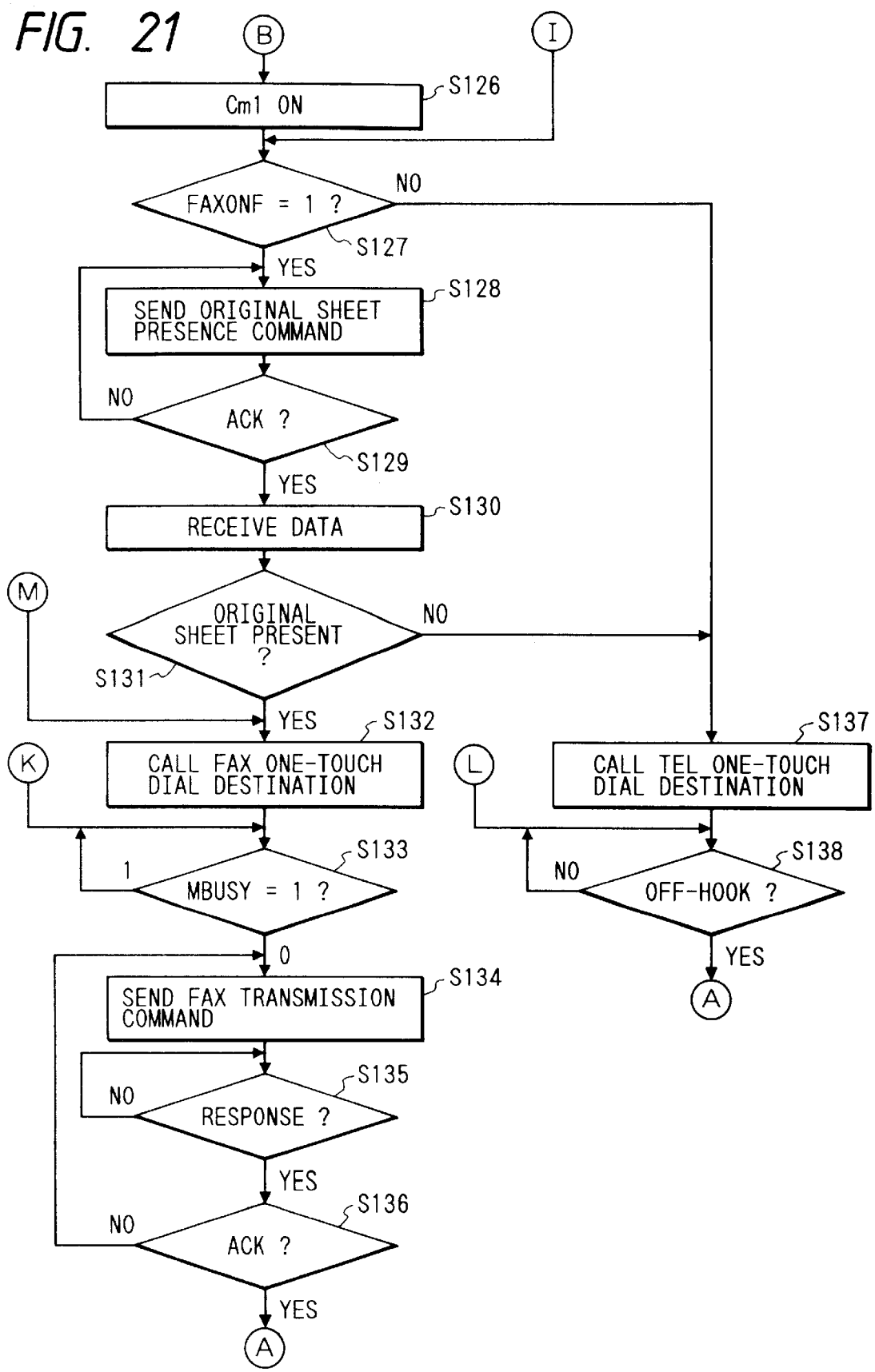
FIG. 21 is a flow chart showing the stand-by operation of the external device of the embodiment.

In the stand-by mode, it is checked in step S116 whether the main body is connected to the external device. This connection check operation will be described in detail later. If any key of the second console unit 28 is depressed in step S117, the flow advances to step S118. It is determined in steps S118, S119, S120, S121, and S122 whether a one-touch key, an off-hook key, a function key, a mode key, and an automatic answer/record phone key are depressed. Control operations corresponding to the key inputs are performed and will be described in detail later. When the one-touch key is depressed, the CML relay of the second NCU 211 is turned on to form a loop between the line 212 and the external device (S126 in FIG. 21). It is determined in step S127 whether the main body is connected to the external device. If YES in step S127, the flow advances to step S128. However, if NO in step S127, the flow advances to step S137. When the main body is connected to the external device, an original sheet presence command is sent from the SRX of the contacts (external) 214 to the main body at 9,600 bps in step S128. In step S129, a response signal is received from the main body (FAX). If this response signal is an ACK signal, the flow advances to step S130. Otherwise, the flow returns to step S128 to send the original sheet presence command again. This command is transmitted a maximum of three times. Data from the FAX main body is received in step S130. If the received data represents RDS=1 in step S131, it represents an original sheet. However, if RDS=0, no original sheet is present in the FAX main body, and the flow advances to step S137.

In step S132, the select signal sender 215 calls a FAX one-touch dial destination stored in the SRAM 24. The CPU in the main body waits in step S133 until the MBUSY signal goes to logic "0" in step S133. If the MBUSY signal goes to logic "0", a FAX communication command is sent to the FAX main body a maximum of three times in step S134 until signals ACK are received in steps S135 and S136. Upon reception of the signals ACK, the flow returns to a stand-by state (FIG. 20).

In step S137, the select signal sender 215 calls a TEL one-touch dial destination stored in the SRAM 24 as in the step S132. While the message on the line 212 is kept monitored, an on-hook state of the telephone set connected to the NCU is detected in step S138. If the off-hook operation is detected, the flow returns to the stand-by state (FIG. 20).

A call operation using the off-hook key will be described below.

Figure 22:
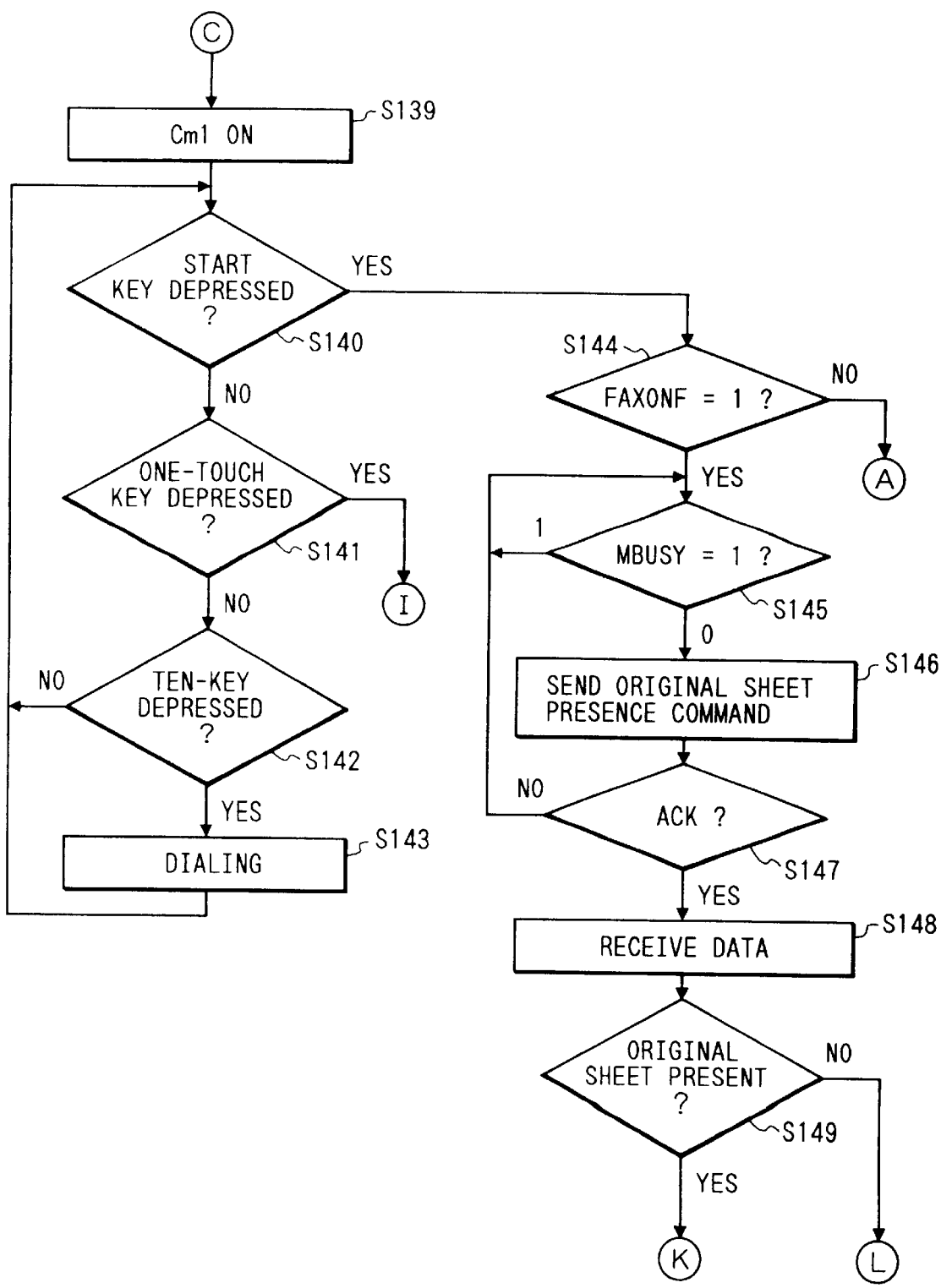
FIG. 22 is a flow chart showing the stand-by operation of the external device of the first embodiment.

The CML relay is turned on in step S139 (FIG. 22) to form a loop with the line 212. It is determined in steps S140, S141, and S142 whether dial associated keys are depressed. If the one-touch key is depressed, operations from step S127 (FIG. 21) are performed. When one of the keys in the ten-key pad is depressed, a pulse or DTMF signal corresponding to the depressed key is sent from the select signal sender 215 to the line 212 in step S143. When the start key is depressed, the call operation is interrupted, and the flow advances to step S144. If FAXONF=0 in step S144, the main body is not connected to the external device. The facsimile transmission/reception operation need not be performed, and the flow returns to the stand-by state (FIG. 20). However, if FAXONF=1, then the flow advances to step S145. The operations in steps S145 to S149 are the same as those in steps S128 to S131. If an original sheet is present in the FAX main body in step S149, operations from step S133 (FIG. 21) are performed. Otherwise, operations from step S138 (FIG. 21) are performed.

When the function key is depressed, the function mode is set in step S123. The operation in the function mode will be described later.

When the mode key is depressed, the manual mode, the FAX/TEL auto change mode, the automatic answer/record phone mode 1, and the automatic answer/record phone mode 2 are switched every depression of the mode key in step S124. In this embodiment, mode selection is performed by software, but may be performed by a hardware slide switch or the like.

When the automatic answer/record phone key is depressed, the automatic answer/record phone mode is set in step S125. In the automatic answer/record phone mode, automatic answer/record phone operations such as recording and reproduction are performed.

The stand-by operations except for the key input will be described below.

Figure 28:
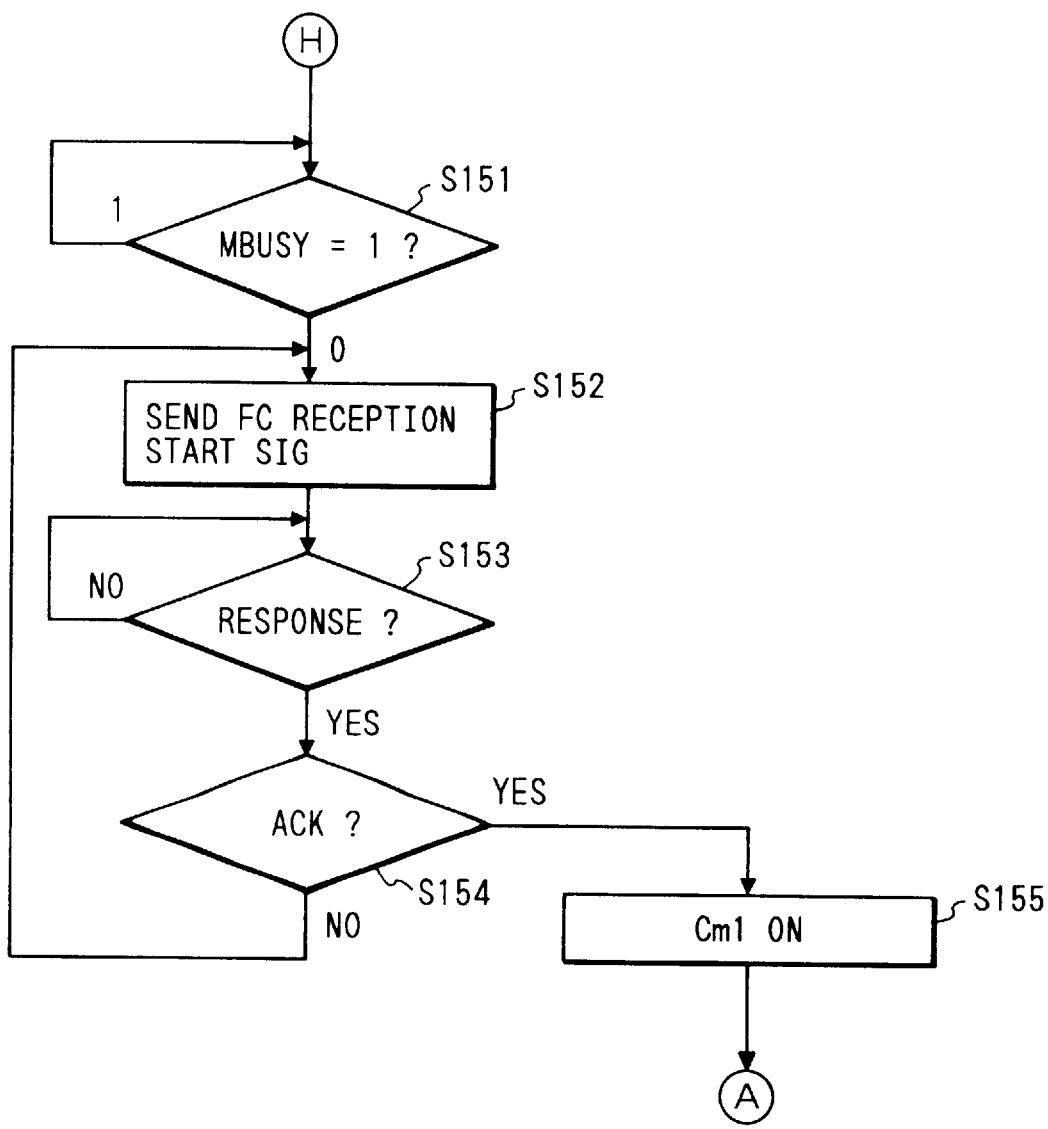
FIG. 28 is a flow chart showing the stand-by operation of the external device of the embodiment.

When the FC signal (1,300 Hz) is detected in step S150 (FIG. 23), the flow advances to step S151 (FIG. 28). When the MBUSY signal goes to logic "0", the FC reception start command is transmitted to the FAX main body in step S152. Upon reception of the ACK signals in steps S153 and S154, the CML is turned on in step S155. The line 212 forms a loop with the FAX side, and the flow returns to the stand-by state (FIG. 20).

When the reception mode is a manual reception mode in step S156 (FIG. 23), and a specific signal such as a hooking or DTMF signal from the external device is detected in step S157, the flow advances to step S162. It is determined in step S158 whether the manual reception mode stored in the non-volatile RAM 24 is changed to the automatic reception mode. If NO in step S158, the flow returns to the stand-by mode (FIG. 20). In this case, no response is made until a key input is made. If YES in step S158, the switching time is set as data, e.g., 30 seconds, stored in the non-volatile RAM 24 in step S159. When the CI signal is continuously detected within 30 seconds (this value can be changed by a set value) in steps S160 and S161, the flow advances to step S162. Otherwise, the flow returns to the stand-by mode (FIG. 20). When the MBUSY signal goes to logic "0" in step S162, the CI reception start command is transmitted to the FAX main body in step S163. Upon reception of ACK signals in steps S164 and S165, the CML is turned on in step S166 to form a loop between the line 212 and the FAX side. The flow then returns to the stand-by state (FIG. 20).

When the reception mode is the FAX/TEL auto change mode in step S167 (FIG. 24), the CML is turned on in step S169 upon detection of the CI signal in step S168. A reply message 1 (Calling now. Please wait.) is sent out from the message generator 26 onto the line 212. Upon completion of this operation, when the FC signal and the CNG signal are detected in steps S170 and S171, processing operations in steps S151 (FIG. 28) and S162 (FIG. 23) are performed, respectively. When neither signals are detected, a quasi-CI (Ci) signal having a p-p value of 120 V at the frequency of 16 Hz to 50 Hz is output to the external telephone set in step S172. Upon detection of the FC signal, the CNG signal, the lapse of sending time of quasi-CI signal which can be set by the user, and the on-hook state of the external telephone set in steps S170, S171, S173, and S174, processing operations are performed in steps S151 (FIG. 28), S162 (FIG. 23), S177, and S175, respectively. When the off-hook state is detected in step S174, the quasi-CI signal is disabled in step S175. The CML is turned off in step S176, and the line 212 is switched from the external device to the external telephone set. When the sending time of the quasi-CI signal exceeds the set time in step S173, the quasi-CI signal is disabled in step S177. A reply message 2 (No answer. Please send FAX.) is sent out to the line 212 in step S178, and operations from step S162 (FIG. 23) are performed.

When the reception mode is the automatic answer/record phone mode 1 in step S179, operations from step S162 (FIG. 23) are performed when the CNG signal is detected and any tone is not detected over a predetermined time settable by the user in steps S180 and S181.

Figure 23:
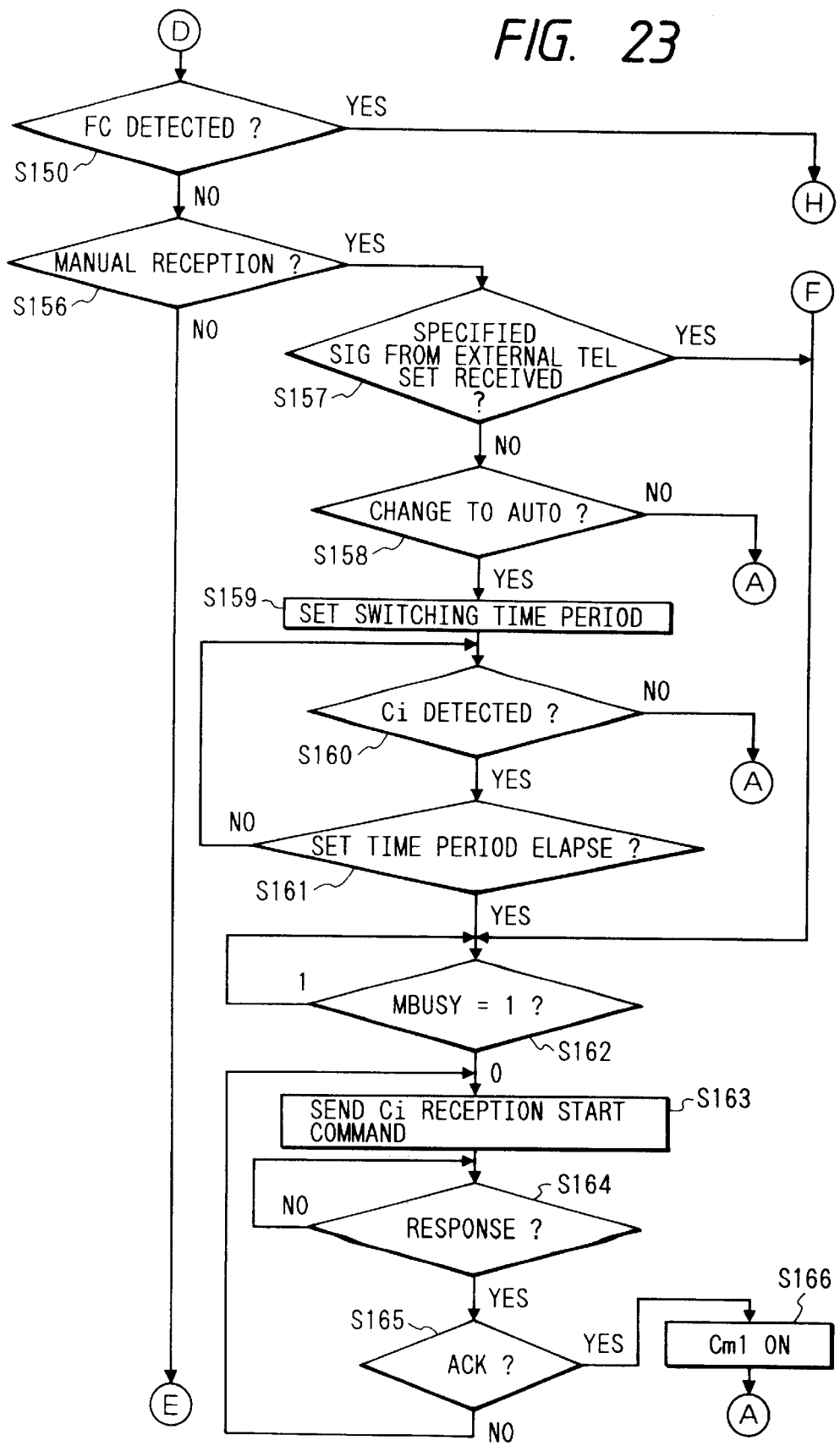
FIG. 23 is a flow chart showing the stand-by operation of the external device of the embodiment.
Figure 25:
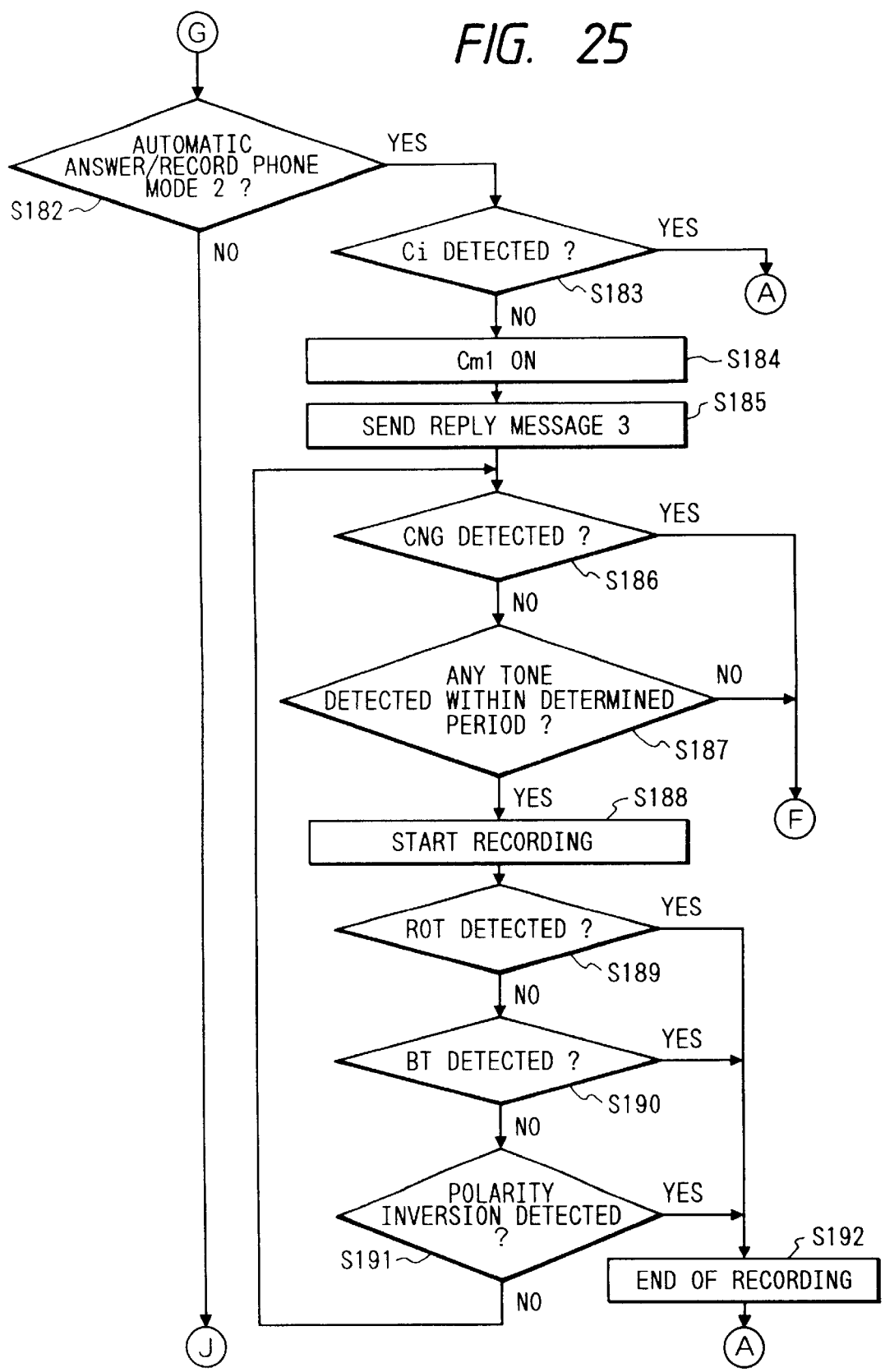
FIG. 25 is a flow chart showing the stand-by operation of the external device of the embodiment.

When the reception mode is the automatic answer/record phone mode 2 in step S182 (FIG. 25), the CML is turned on in step S184 to form a loop between the external device and the line 212 to send out a reply message 3 (Your telephone set is connected to the automatic answer/record phone. Please leave a message after you hear a beep tone) on the line 212. The same operations as in steps S180 and S181 are performed in steps S186 and S187. Recording of the message is started by the message recorder 27 in step S188. When the CNG signal is detected in step S186 and any tone is not detected within the predetermined time in step S187, the flow advances to step S162 (FIG. 23). On the other hand, if an ROT (ReOrder Tone: a pulse signal may be output when the mating telephone set is released from the line, and this pulse signal is called a reorder tone), a BT (busy tone), polarity inversion are detected in steps S189, S190, and S191, respectively, message recording is stopped in step S192. The flow then returns to the stand-by state (FIG. 20).

Figure 26:
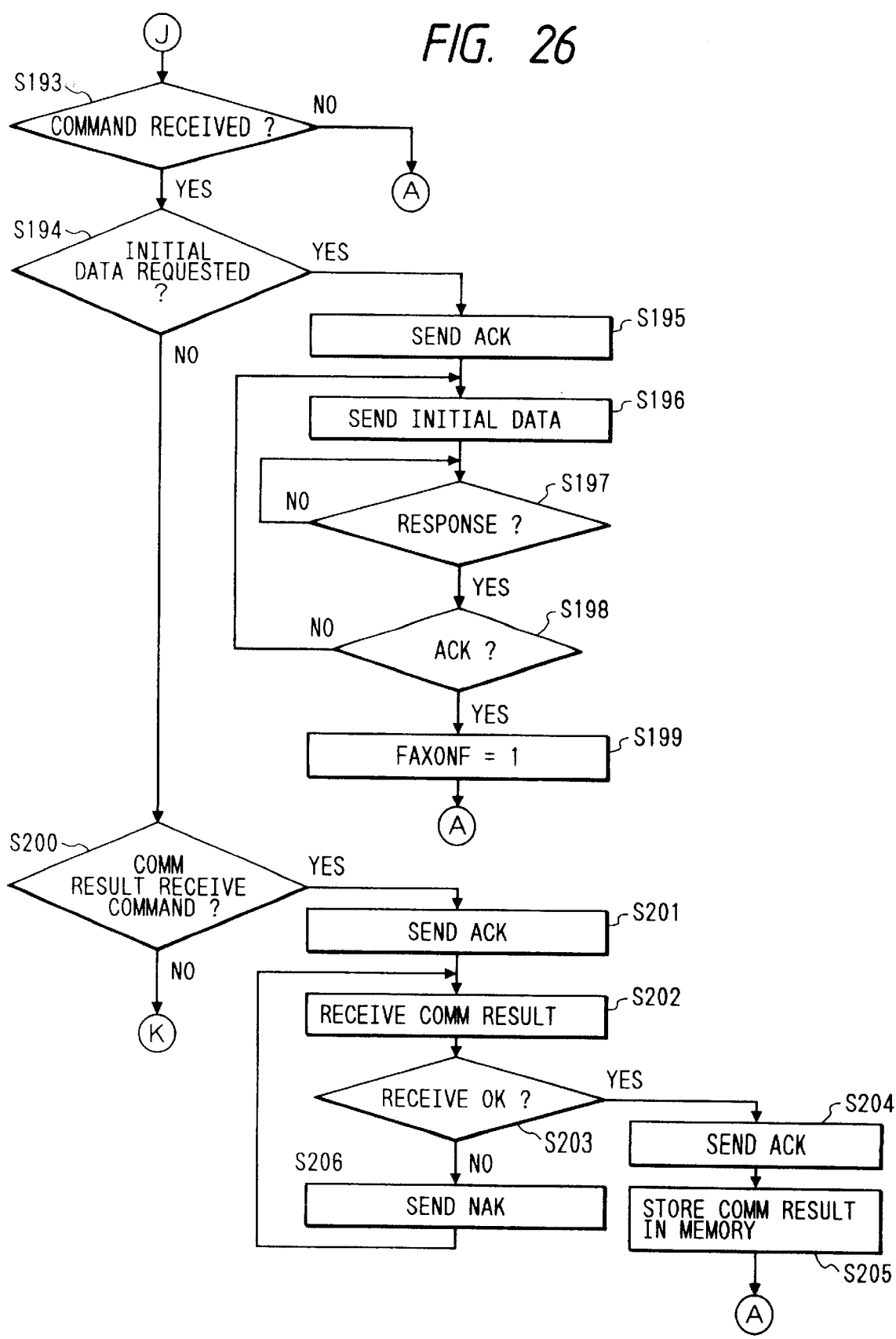
FIG. 26 is a flow chart showing the stand-by operation of the external device of the embodiment.

When a command as serial data is received from the FAX main body through the contacts (external) 214 in step S193 (FIG. 26), the following signals are detected in steps S194, S200, S207, S214, and S221, respectively, and the corresponding operations are performed. These signals are the initial data request command, the communication result receive command, the display command, the speaker command, and the redial command.

If the command received in step S194 is the initial data request command, an ACK signal is sent back to the FAX main body in step S195, and then the initial data is sent in step S196. The initial data includes an external device version No., polling ID and closed net ID Nos. stored in the non-volatile RAM 24, a user name, and the telephone number of the telephone line connected to the external device. Of all pieces of the information of the initial data, necessary ones are displayed on the display. Responses to the initial data are to be received from the FAX main body in steps S197 and S198. In this case, when no response is received and a signal except for the ACK signal is received, the initial data is transmitted a maximum of three times. When the ACK signal is received, it is determined that the facsimile main body is connected to the external device. In step S199, the flag FAXONF is set at logic "1", and the flow returns to the stand-by state (FIG. 20). Otherwise, processing is ended with an error.

When the communication result receive command is received in step S200, an ACK signal is sent back in step S201. The communication result data is received in step S202. If the check sum of the reception data is O.K. in step S203, an ACK signal is sent out in step S204, and the reception data is stored in the SRAM 24 in a predetermined format in step S205. The flow returns to the stand-by state (FIG. 20). The communication result data includes a destination name, a destination telephone number, and the like. When the reception data is N.G. in step S203, an NAK signal is sent back to the FAX main body in step S206, and the communication result data is received again in step S202. The NAK signal is sent back a maximum of three times.

Figure 27:
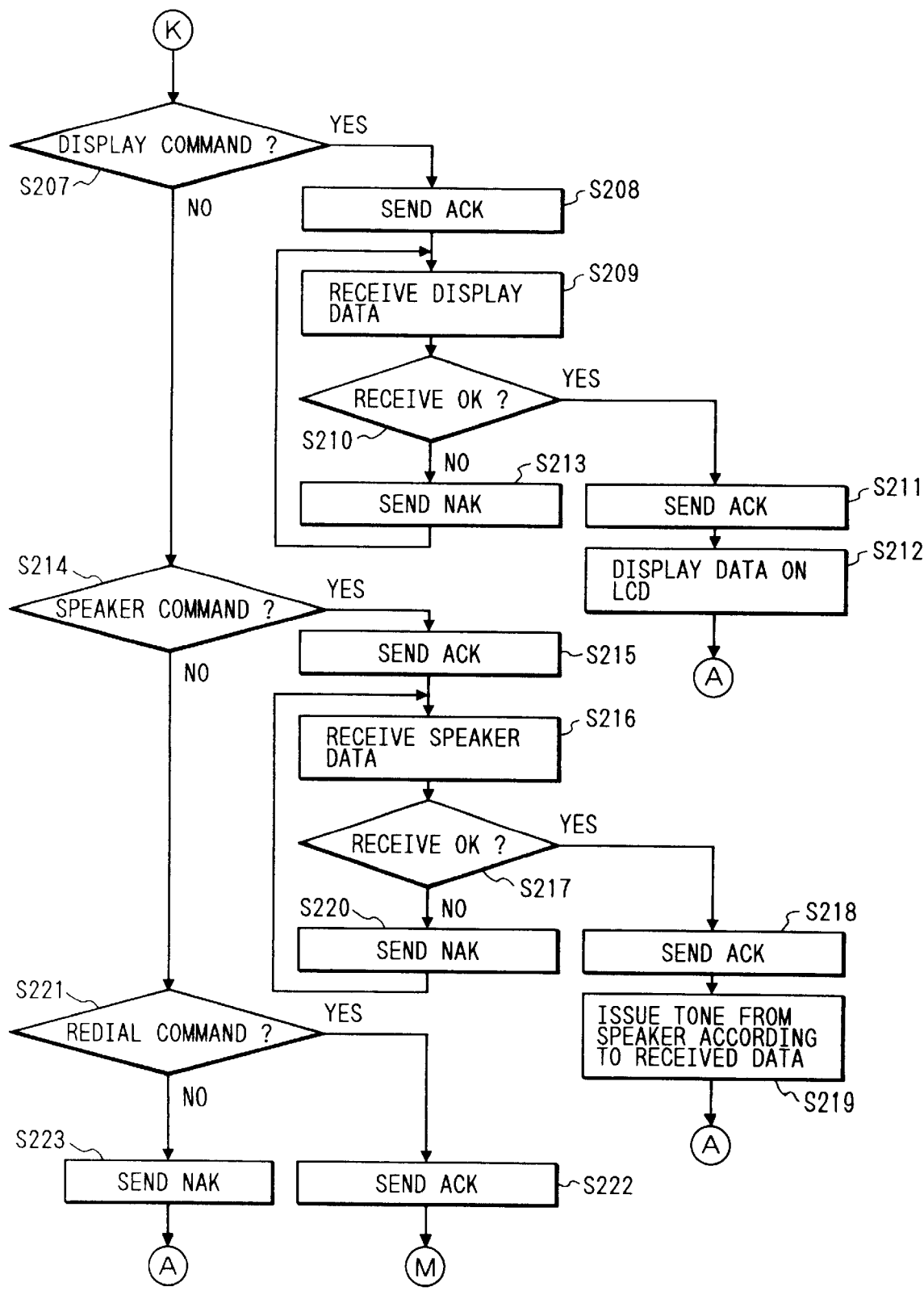
FIG. 27 is a flow chart showing the stand-by operation of the external device of the embodiment.

When the display command is received in step S207 (FIG. 27), the subsequent operations are the same as those in the communication result receive command described above. Display data reception in step S209 and an LCD display operation in step S212 will be described below. The operation in step S209 is an operation for receiving the display data, and the operation in step S212 is an operation for displaying the display data on the LCD.

When the speaker command is received in step S214, the same operations as in the communication result receive command described above are performed. A speaker operation data receiving operation in step S216 and a speaker driving operation in step S219 will be described. The operation in step S216 is an operation for receiving the speaker operation data, and the operation in step S219 is an operation for issuing a warning tone from the speaker on the basis of the received data.

When the redial command is received in step S221, an ACK signal is sent back in step S222, and operations form step S132 are performed.

When the received command is a command which cannot be acknowledged by the external device or a command representing an operation which cannot be performed by the external device, an NAK signal is sent back from the external device to the FAX main body in step S223.

The detailed operations of the external device in the stand-by state of this embodiment have been described.

Figure 29:
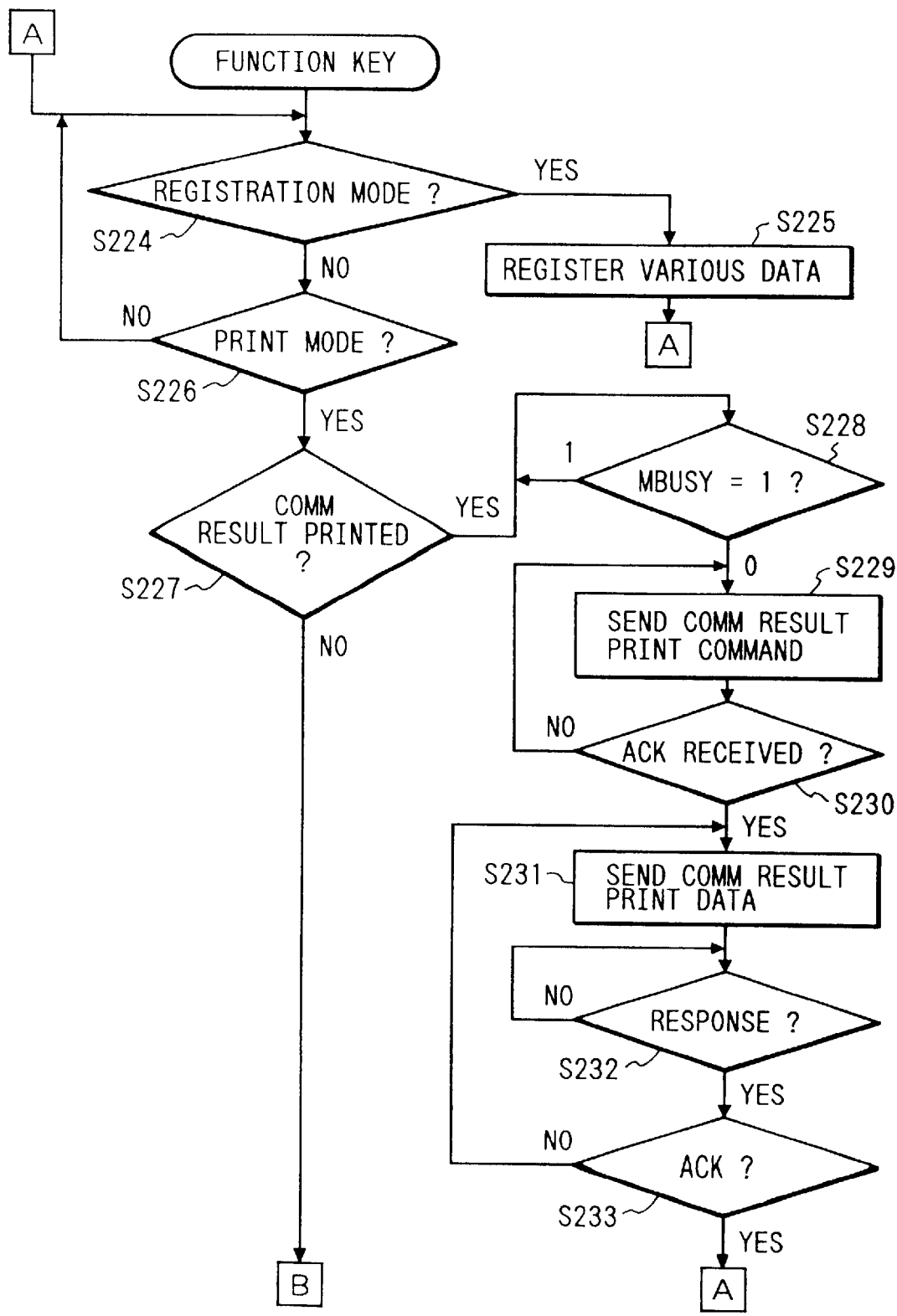
FIG. 29 is a flow chart showing the operation in a function mode of the external device of the embodiment.

Operations in the function mode in step S123 (FIG. 20) will be described in detail in FIG. 29.

The function modes are a registration mode and a print mode. When the registration mode is set in step S224, various data such as the current time, the user name, the telephone number of the connected telephone line, the polling ID No., the closed net ID No., the one-touch dial destination telephone number and its name, the destination telephone number and the name of an electronic telephone directory, the manual/automatic switching time in the manual reception mode described above, detection of the absence of any tone in the automatic answer/record phone mode, and the type of connection line are registered in the SRAM 24 in step S225. The flow then returns to the stand-by state (FIG. 20).

When the print mode is set, operations from step S226 are performed. When the communication result report print mode is set in step S227, the communication result print command is sent to the FAX main body in step S229, provided that the MBUSY signal goes to logic "0" in step S228. When an ACK signal is received in step S230, the communication result stored in the SRAM 24 is sent out as serial data to the FAX main body in step S231. If any ACK signal is received, the flow returns to step S229, and the above operations are repeated. In this case, the command is repeatedly sent a maximum of three times. After the communication result data is sent out, the external device waits for a response from the FAX main body for three seconds. If no response is sent back, processing is ended with an error. However, if a response is sent back from the FAX main body, the flow advances to step S233. If this response is an ACK signal, the flow returns to the stand-by state (FIG. 20). In this case, the data is repeatedly sent a maximum of three times in step S231.

Figure 30:
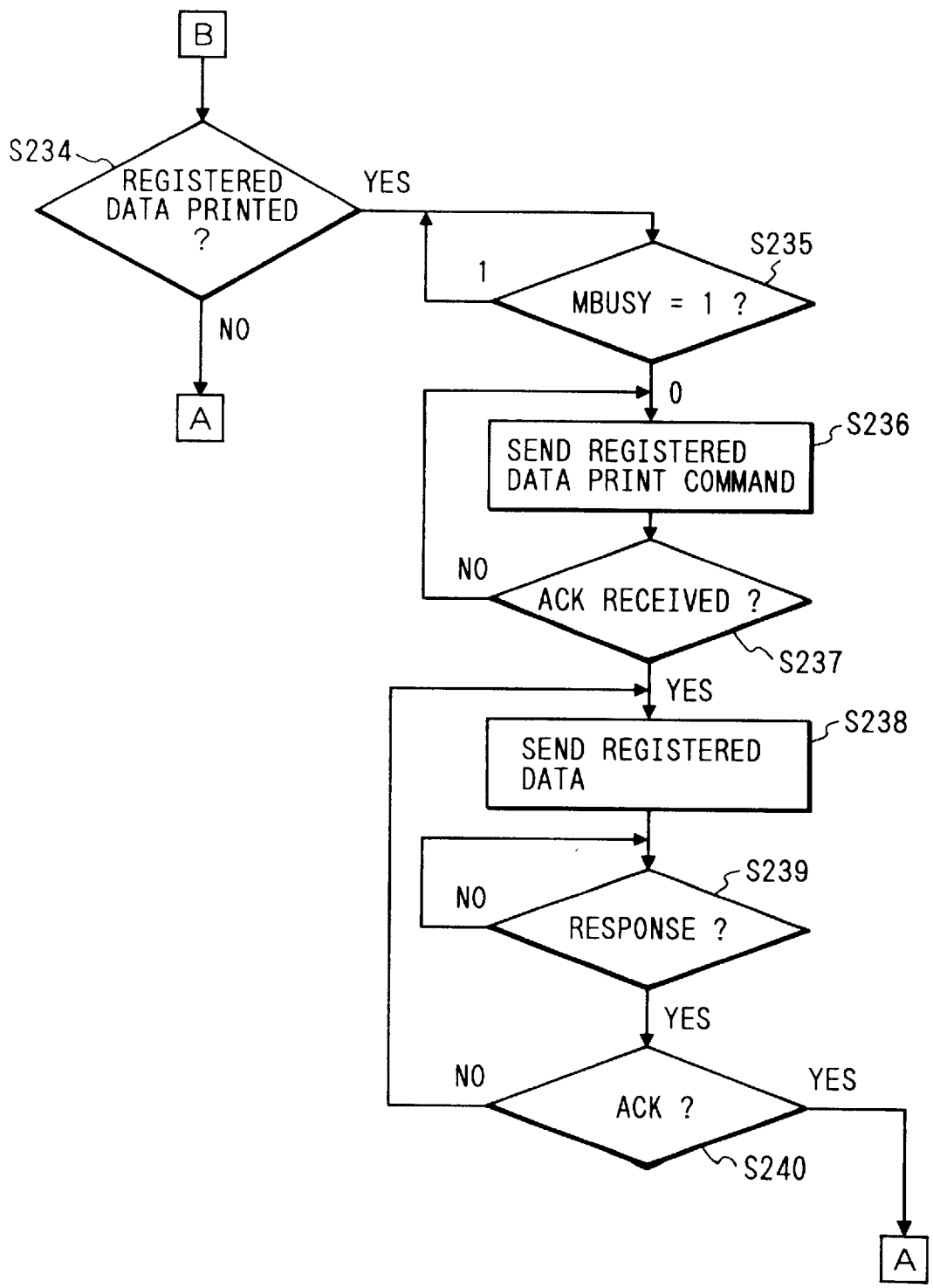
FIG. 30 is a flow chart showing the operation in the function mode of the external device of the embodiment.

When the registration data print mode is set (FIG. 30), the same operations as in the communication result print mode are performed. In this case, the data sent out in step S238 are various data registered in the registration mode and are sent as serial data to the main body.

The detailed operations in the function modes have been described.

Figure 31:
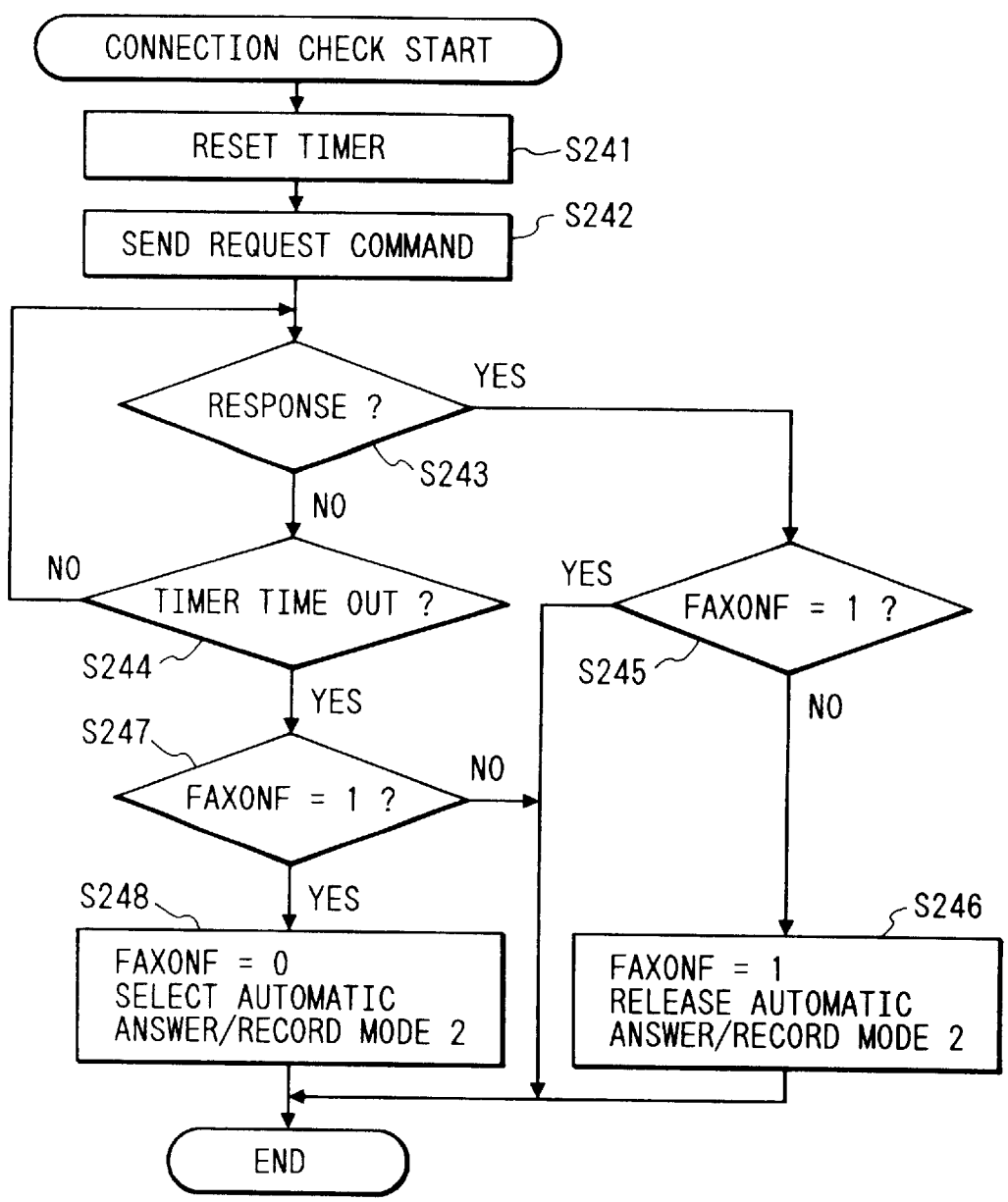
FIG. 31 is a flow chart showing a connection check mode of the external device of the first embodiment.

The connection check operation in step S116 (FIG. 20) will be described with reference to FIG. 31. This operation is repeated every time the stand-by state is set in the flow charts in FIGS. 20 to 28, so that connection between the main body and the external device is always monitored. When disconnection of the main body from the external device is determined, the current mode is set to the automatic answer/record mode 2.

A timer for measuring the time required for waiting the response in the main body is reset and started in step S241. A request command is sent out to obtain a response from the main body in step S242, and the external device waits for the response from the main body in step S243 while the timeout of the timer is kept monitored in step S244. If the response is received before the timeout of the timer, the state of the flag FAXONF representing the connection of the main body is checked in step S245. If this flag is set at logic "1", the previous state is not changed, and the connection check operation is ended. However, if the flag is set at logic "0" in represents that, the main body is newly connected to the external device. In step S246, the flag FAXONF is set at logic "1" to release the automatic answer/record mode 2. The current mode is then set to the latest mode (i.e., the mode before the main body is disconnected). The latest mode is stored in the RAM 23 or the non-volatile RAM 24. When the timeout of the timer is detected in step S244, the flag FAXONF is checked in step S247. If this flag is set at logic "0", the previous mode is kept unchanged, and the connection check operation is ended. However, if the flag is set at logic "1", it is determined that the main body is disconnected from the external device. The flag is set at logic "0" in step S248, and the current mode is stored in the RAM 23 or the non-volatile RAM 24. The current mode is then changed to the automatic answer/record phone mode 2.

The operations of the external device have been described. In addition, when the external device has a scanner function of reading an image and a video input terminal function, the overall system can be made more convenient.

[Second Embodiment]

Unlike the first embodiment, the second embodiment exemplifies a facsimile system to be connected to an external device having no CPU. In this arrangement, when the external device is singly used, a subscriber line is connected to an external telephone set.

The arrangement of the main body is substantially the same as that of the first embodiment, except for the arrangement of contacts. The contacts will be described later.

Figure 32:
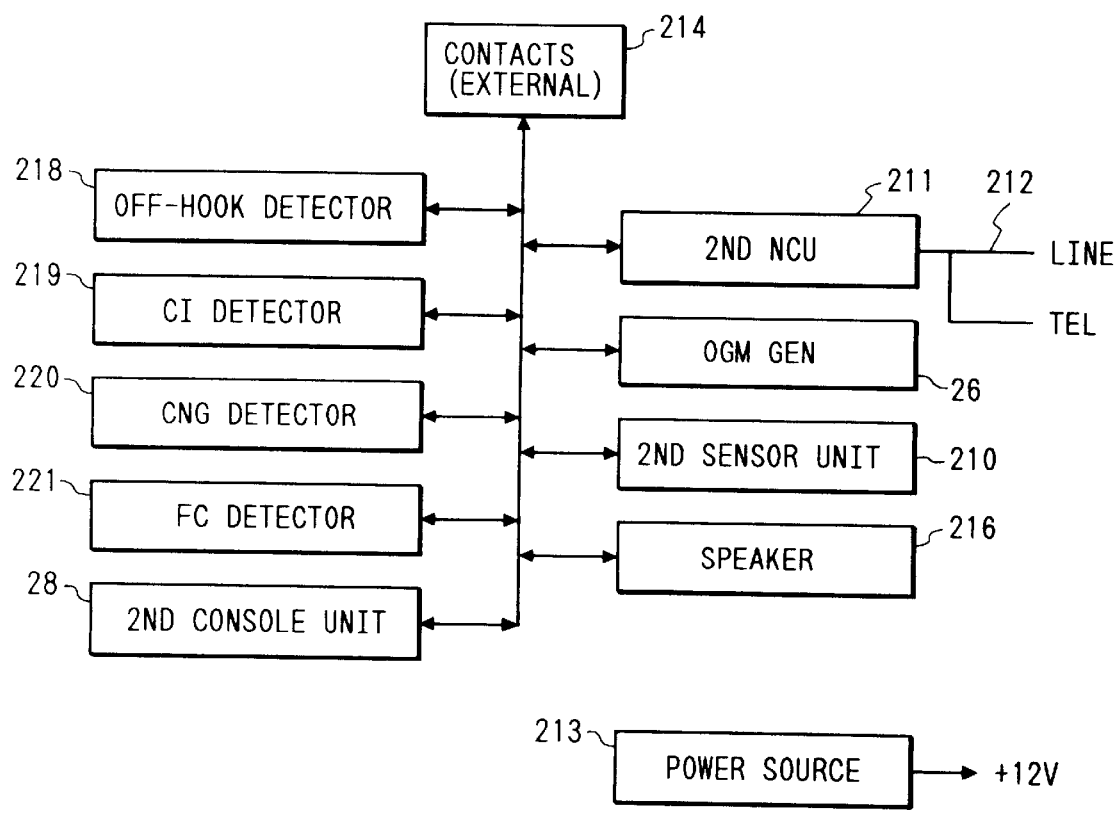
FIG. 32 is a block diagram showing the arrangement of an external device according to the second embodiment of the present invention.

FIG. 32 is a block diagram showing the arrangement of the external device. The blocks having the same functions as in the first embodiment will not be described below.

Using 2-to-4 wire conversion or a CML relay controlled by a CPU 11, a second NCU 211 connects a subscriber line 212 to a modem 18 or an external telephone set. The second NCU 211 is different from that of the first embodiment in that the second NCU 211 does not include an off-hook detector for the external telephone set, a CI detector, an FC detector, and a CNG detector.

Figure 33:
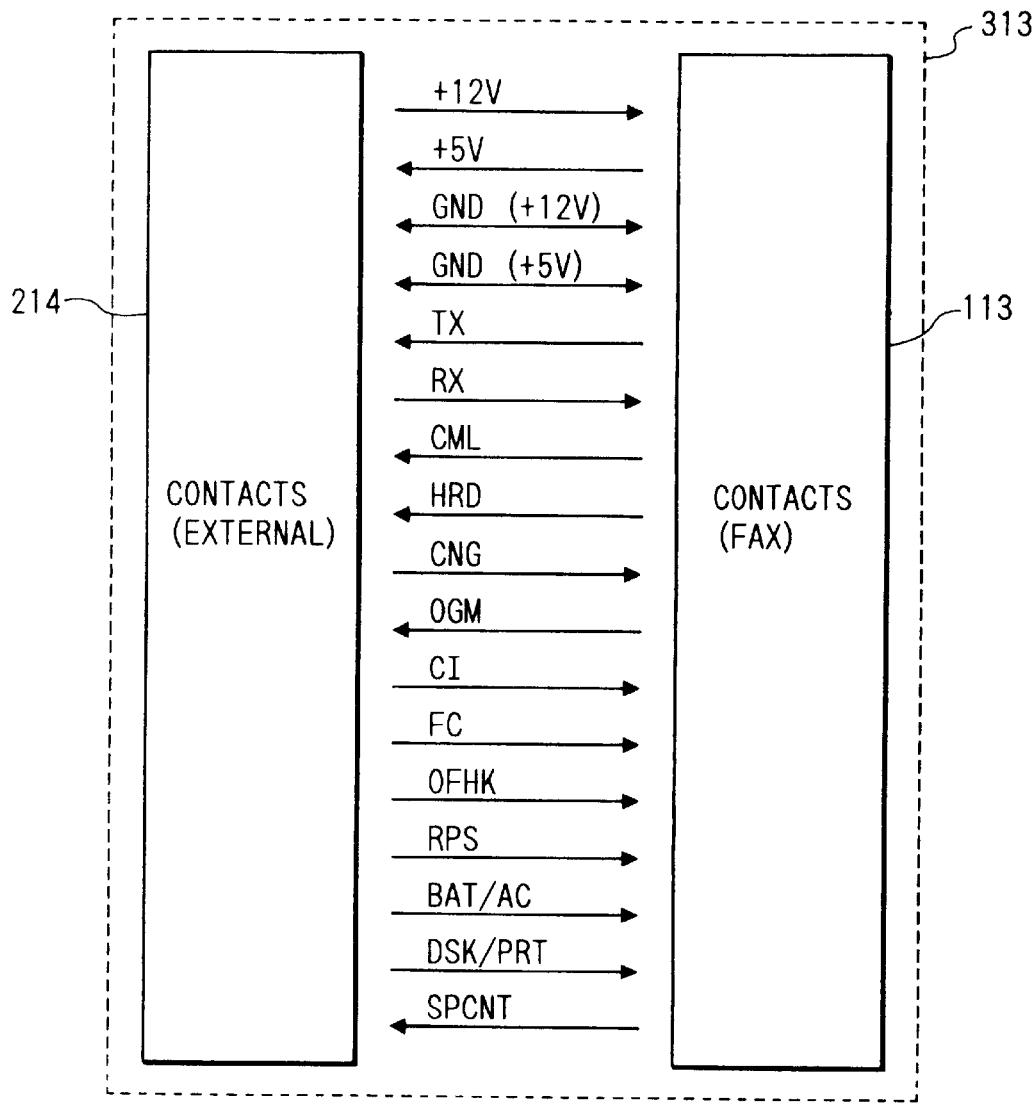
FIG. 33 is a block diagram showing another arrangement of contacts of the second embodiment.

An off-hook detector 218 detects an off-hook state of the external telephone set. When the CML relay of the second NCU 211 connects the subscriber line to the modem, a quasi DC loop is formed with the external telephone set, thereby detecting a current. In this case, an H relay is arranged to switch between the quasi DC loop and the subscriber line and is controlled in accordance with an HRD control signal (FIG. 33) from the CPU 11.

A CI detector 219 performs primary/secondary separation of a call signal (CI signal) input from the subscriber line 212 by using a photocoupler. Only an AC signal component is passed and detected by the CI detector 219.

A CNG detector 220 performs primary/secondary separation of a CNG control signal defined by the protocol T-30 in FAX communication by means of an audio transformer when the subscriber line is connected to the external telephone set by the CML relay. Only an AC signal component is passed and detected by the CNG detector 220.

An FC detector 221 causes a PLL circuit and the like to detect an FC signal in a non-ringing incoming call signal.

An OGM (OutGoing Message) generator 26 sends out a preregistered message upon reception of an incoming call in accordance with a control signal output from a contact (OGM) of contacts (external) 214.

A second sensor unit 210 is constituted by a recording paper end detection sensor. In the second sensor unit 210, a reflection sensor is arranged and detects the black band of the recording paper so as to detect the state of the recording paper under the control of the CPU 11.

Figure 34:
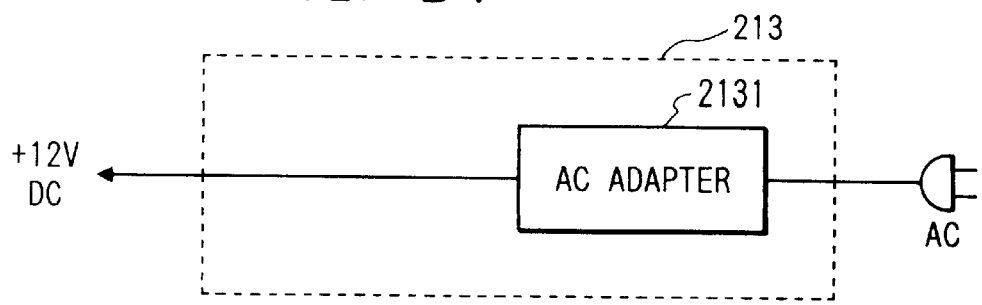
FIG. 34 is a block diagram showing the arrangement of a power source of the external device of the second embodiment.

A power source 213 is constituted by an AC adapter for converting an AC voltage into a DC voltage of +12 V, as will be described in FIG. 34, and applies the DC voltage of +12 V to the respective components of the external device.

A second console unit 28 is constituted by a mode key for designating a reception mode. The CPU 11 detects a key depression state and controls the respective components in accordance with the detected key depression state.

A speaker 216 is constituted by a speaker and a speaker driver and issues a warning tone under the control of the CPU in the main body. The speaker 216 also issues a warning tone under the control of the NCU. A transmission line can also be monitored through the second NCU 211.

Figure 4B:
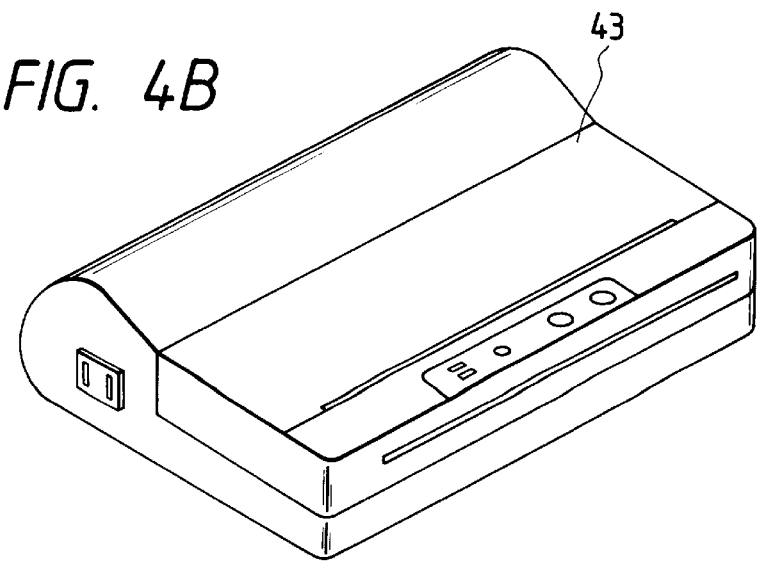
Figure 37:
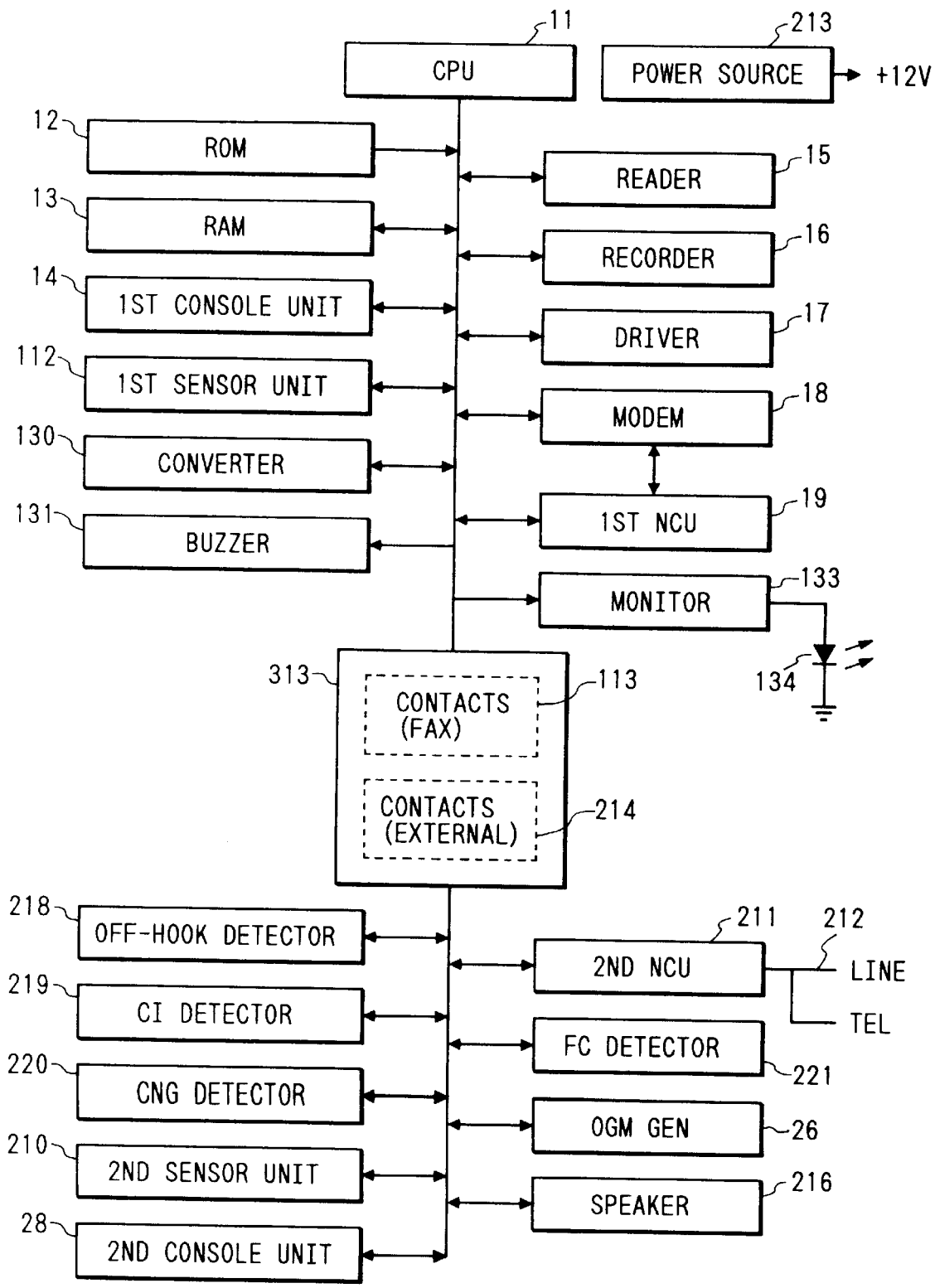
FIG. 37 is a block diagram showing electrical connections when the main body is connected to the external device.

FIG. 37 shows a state in which a facsimile main body 41 is connected to an external device 42, as indicated by the stationary state 43 in FIG. 4B. In this state, the voltage of +12 V is applied from the external device 42 to the facsimile main body 41 through the +12 V terminal. The voltage of +12 V is regulated into a voltage of +5 V by the facsimile main body 41. The voltage of +5 V is applied to both the facsimile main body 41 and the external device 42.

The GND (+12 V) and GND (+5 V) terminals are common to the facsimile main body 41 and the external device 42.

A transmission signal TX is input from a modem 18 of the facsimile main body 41 to the second NCU 211 of the external device 42 through the TX terminal.

A reception signal RX is input from the second NCU 211 of the external device 42 to the modem 18 of the facsimile main body 41 through the RX terminal.

A CML (Connect Modem to Line) signal is a signal for switching the line to the telephone set or the facsimile apparatus. The CML signal is input from the CPU 11 of the facsimile main body 41 to the second NCU 211 of the external device 42 through the CML terminal.

An HRD (Hook Relay Drive) signal is a signal for detecting the off-hook state of the telephone set and is input from the CPU 11 of the facsimile main body 41 to the second NCU 211 of the external device 42 through the HRD terminal.

A CNG (calling tone) signal is input from the CNG detector 220 of the external device 42 to the CPU 11 of the facsimile main body 41 through the CNG terminal.

An outgoing message OGM is input from the CPU 11 of the facsimile main body 41 to the OGM generator 26 of the external device 42 through the OGM terminal.

A CI signal is a call signal which is input from the CI detector 219 of the external device 42 to the CPU 11 of the facsimile main body 41 through the CI terminal.

An FC signal is a facsimile call signal which is input from the FC detector 221 of the external device 42 to the CPU 11 of the facsimile main body 41 through the FC terminal.

An OFHK signal is an off-hook detection signal which is input from the off-hook detector 218 of the external device 42 to the CPU 11 of the facsimile main body 41 through the OFHK terminal.

An RPS signal is a recording paper sensor signal which is input from the second sensor unit 210 of the external device 42 to the CPU 11 of the facsimile main body 41 through the RPS terminal.

A BAT/AC signal is a control signal for determining whether a battery, an AC power source, or a car battery is used. The BAT/AC signal is input to the CPU 11 of the facsimile main body 41 through the BAT/AC terminal.

A DSK/PRT signal is a control signal for determining whether a stationary or portable state is set. The DSK/PRT signal is input from the external device 42 to the CPU 11 of the facsimile main body 41 through the DSK/PRT terminal.

An SPCNT signal is a speaker control signal which is input from the CPU 11 of the facsimile main body 41 to the speaker 216 of the external device 42 through the SPCNT terminal.

Figures 35, 35A:
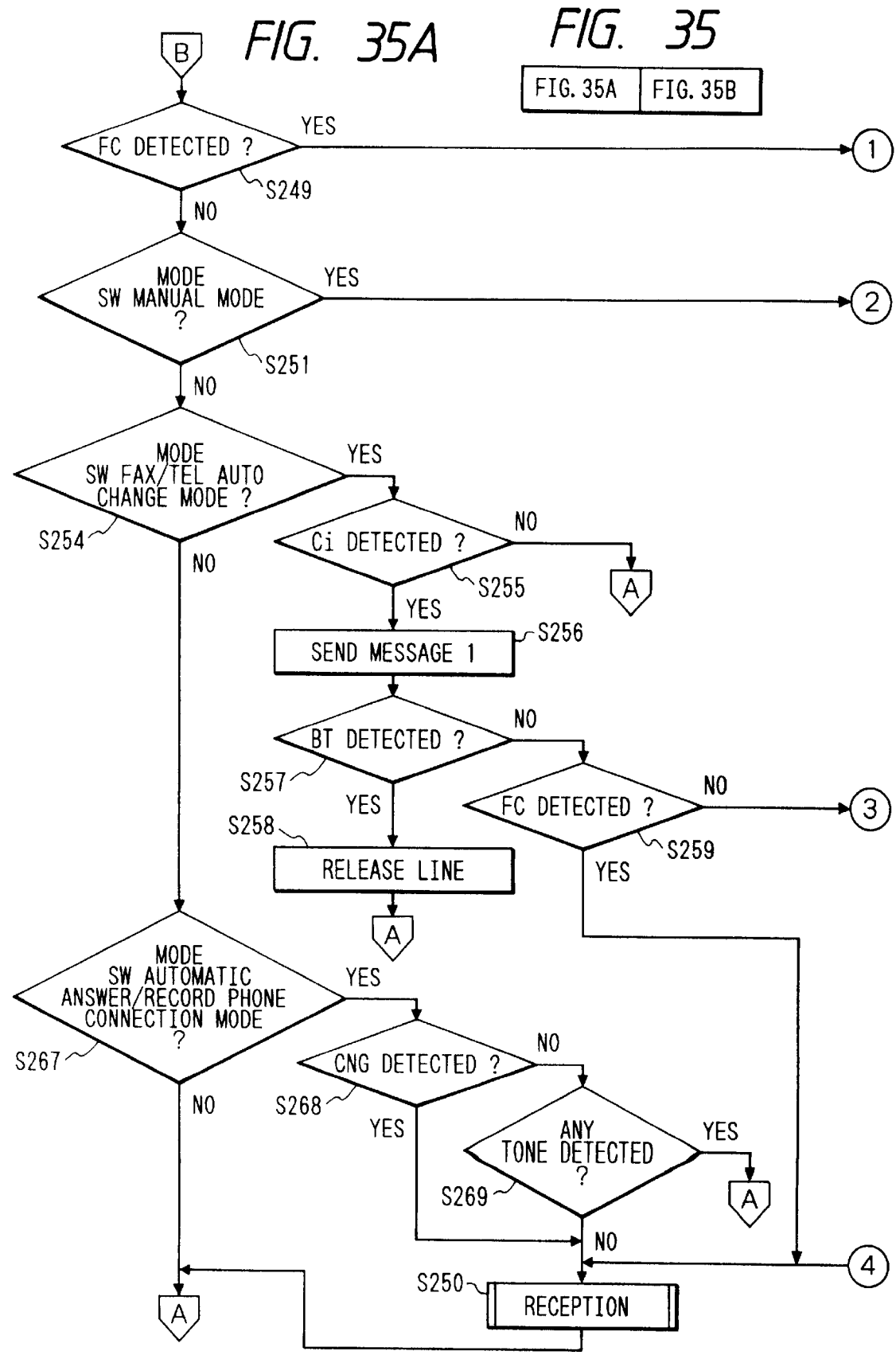
FIG. 35 is a flow chart showing a routine different from that of the facsimile operation of the first embodiment according to the second embodiment.
Figure 35B:
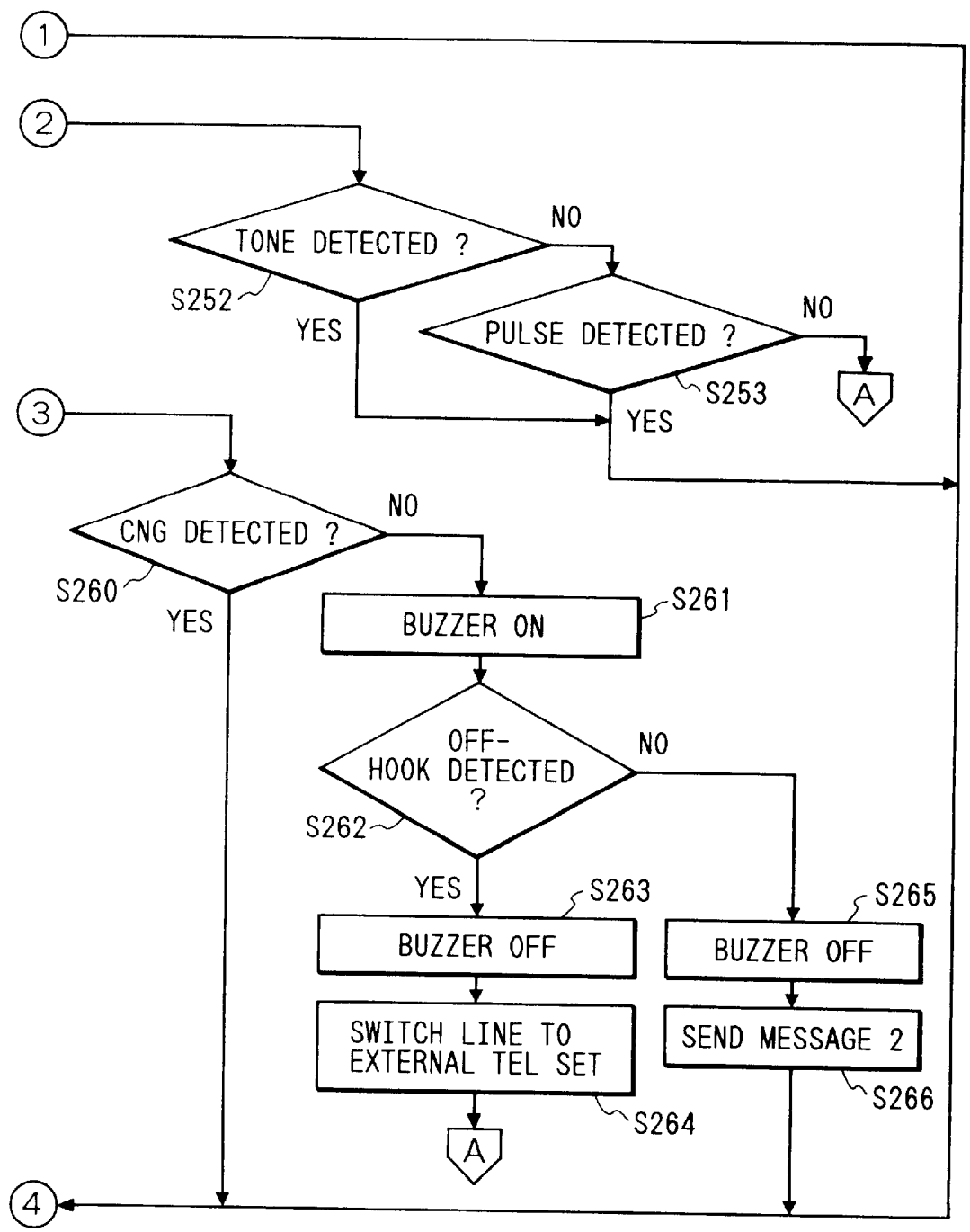

Operations of the second embodiment different from those of the first embodiment will be described below. In the second embodiment, the operations from the flow B in FIG. 8 of the first embodiment are changed. The flow B in FIG. 7 advances to a flow B in FIG. 35.

It is determined in step S249 whether the FC signal having the frequency of 1,300 Hz is detected. If YES in step S249, the receive or reception mode is set in step S250. If NO in step S249, it is determined in step S251 whether the mode switch sets the manual mode. If YES in step S251, a tone or pulse signal sent from the telephone set to the facsimile apparatus to switch the mode is detected in step S252 or S253. In this case, the tone signal is detected by a modem in the main body through the RX contact of the contacts, and the pulse signal is detected by the CPU in the main body through an OFHK (off-hook signal) contact of the contacts. When neither signals are detected, the flow returns to the stand-by state (FIG. 7). When either signal is detected, the CML relay is switched to the facsimile side, and the reception mode is set in step S250.

If NO in step S251, it is determined in step S254 whether the mode switch sets the FAX/TEL auto change mode. If YES in step S254, it is determined in step S255 whether the CI signal is detected. If NO in step S255, the flow returns to the stand-by mode (FIG. 7). However, if YES in step S255, a reply message 1 (Calling now. Please wait.) is sent out in step S256. It is determined in step S257 whether the BT (Busy Tone) signal is detected by the modem in the main body. If YES in step S257, the line is released in step S258, and the flow returns to the stand-by state (FIG. 7). However, if NO in step S257, it is determined in step S259 or S260 whether the FC signal is detected or the CNG signal having the frequency of 1,100 Hz is detected. If either signal is detected, the reception mode is set in step S250. However, if neither signals are detected, a buzzer tone is issued in step S261 to inform that the other end of the line is a telephone set. Thereafter, it is determined in step S262 whether the handset is picked up, i.e., the off-hook signal is detected. If YES in step S262, the buzzer tone is stopped in step S263. The line is switched to the external telephone set in step S264, and the flow returns to the stand-by mode (FIG. 7). However, if NO in step S262, the buzzer tone is stopped in step S265, and a reply message 2 (No answer. Please send a facsimile.) is sent out in step S266. The reception mode is then set in step S250.

If the FAX/TEL auto change mode is not set in step S254, it is determined in step S267 whether the mode switch sets the automatic answer/record telephone connection mode. If NO in step S267, the flow returns to the stand-by mode (FIG. 7). However, if YES in step S267, it is determined in step S268 whether the CNG signal is detected. If YES in step S268, the reception mode is set in step S250. However, if NO in step S268, it is determined in step S269 whether any tone is detected. If NO in step S269, the reception mode is set in step S250. Otherwise, the stand-by state (FIG. 7) is set.

Figure 36:
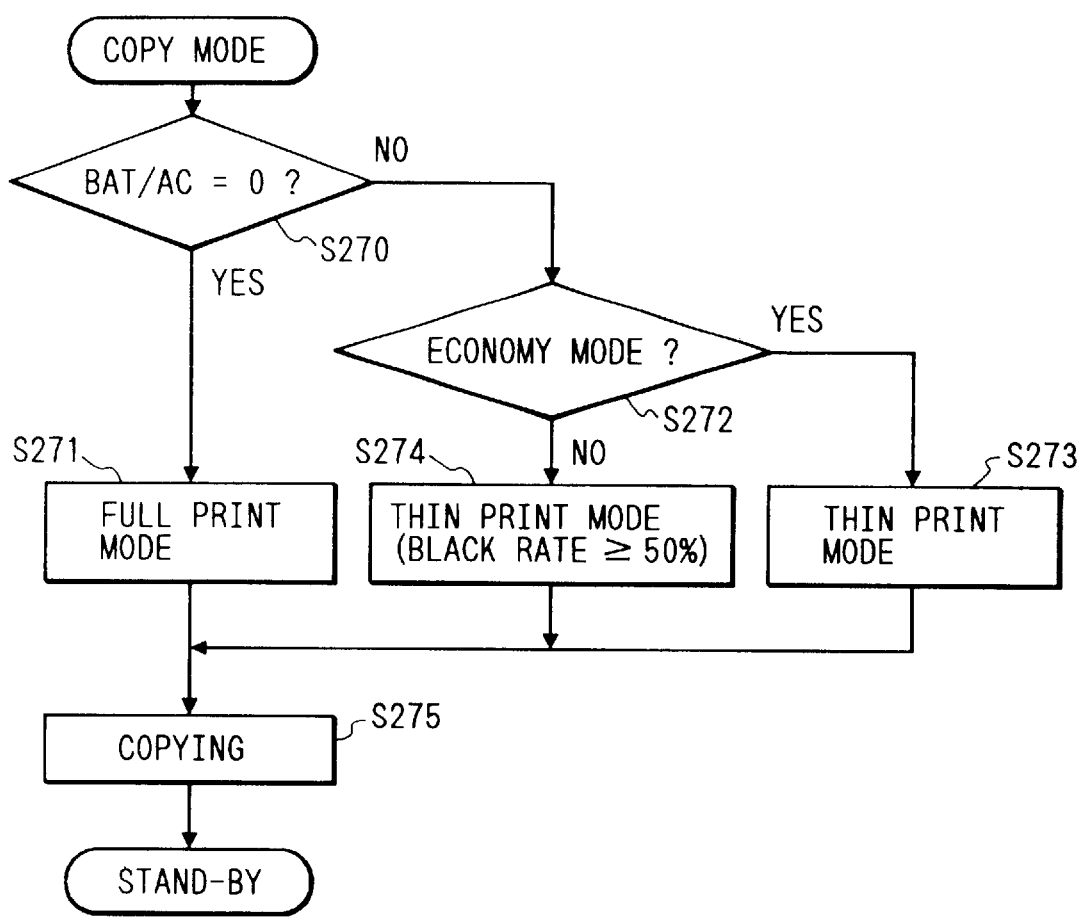
FIG. 36 is a flow chart showing a copy mode according to the second embodiment.

A copy operation will be described in detail with reference to a flow chart in FIG. 36.

When a copy mode is set, it is determined in step S270 whether the BAT/AC signal from the corresponding contact is set at logic "0". The BAT/AC signal is a signal for determining whether the power source is an AC power source, a battery, or a car battery, and this signal has been described in detail in FIG. 18. If the signal BAT/AC=0 in step S270, then a full print mode is set in step S271. However, if the signal BAT/AC=1 in step S270, then it is determined in step S272 whether an economy mode is set. If YES in step S272, a thin print mode for performing a thin print operation is set in step S273. However, if NO in step S272, a mode for thinning the data only when the black rate in one read line of the original sheet is 50% or more is set. Any one of the modes is set in step S271, S273, or S274, and the copy operation is performed in step S275. The flow then returns to the stand-by state.

The thin print mode and the mode set when the black rate is 50% or more are energy-saving modes in use of a power source except for the AC power source. This also applies to facsimile message printing during reception.

In this embodiment, the off-hook detector 218 for detecting the off-hook state of the telephone set or the like connected to the subscriber line 212 detects a current by forming a quasi DC loop with the telephone set connected to the subscriber line 212 by the CML relay of the second NCU 211 when the subscriber line is connected to the modem. However, the off-hook state may be detected by comparing the detected voltage with a threshold level.

Alternatively, the CI detector 219, the CNG detector 220, and the FC detector 221 may comprise Hall elements for performing primary/secondary separation of the corresponding signals to extract only the corresponding AC components.

The discharge characteristics of the battery and remaining amount warning of the battery will be described below.

Figure 39A:
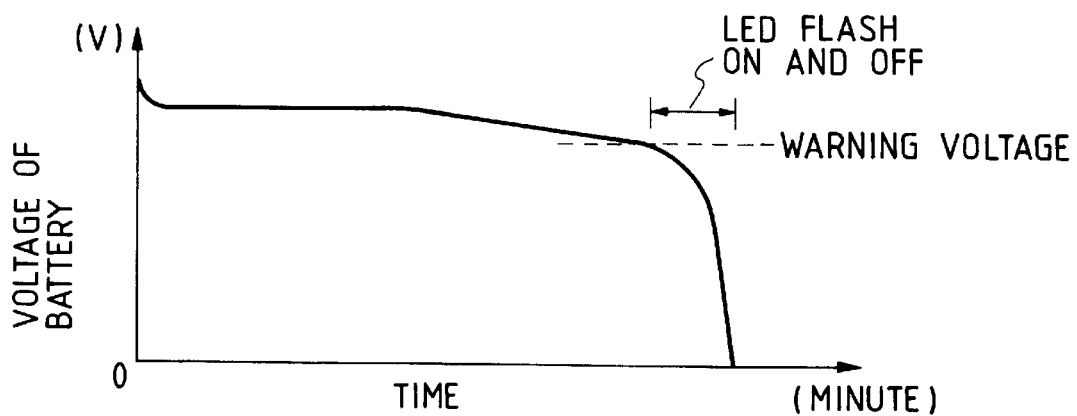
FIGS. 39A and 39B are graphs showing a relationship between battery discharge characteristics and an operation for warning a battery remaining amount by a warning voltage.

FIG. 39A is a graph showing the discharge voltage characteristics when a battery discharge current, i.e., a current consumed by the apparatus is constant. In the initial period, the battery has almost a rated value. However, the voltage is decreased with a lapse of time, and finally the voltage level is abruptly decreased.

In consideration of the above discharge voltage characteristics, a small remaining amount of the battery is warned to the user by a voltage setting circuit in a voltage monitor 133.

Figure 39B:
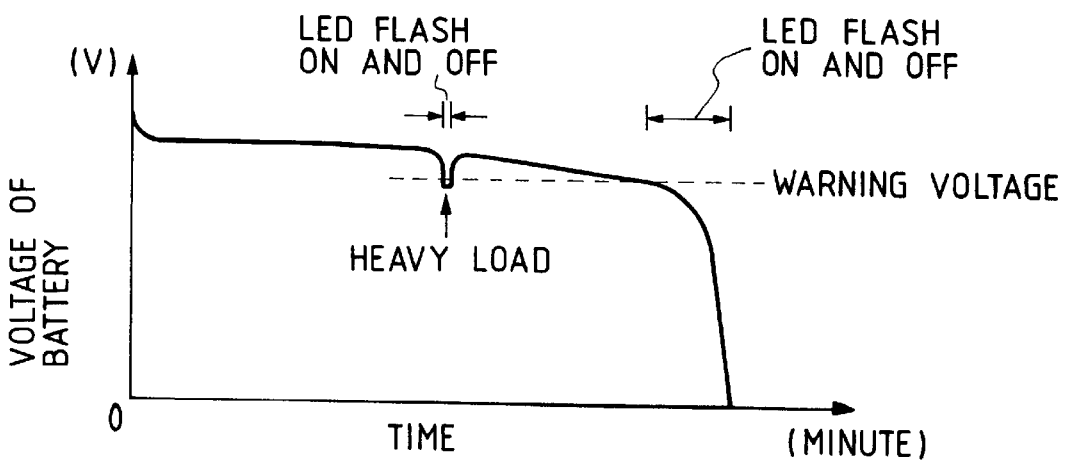

FIG. 39B is a graph showing discharge voltage characteristics when a battery discharge current is changed.

The current consumed by the facsimile apparatus varies depending on states, i.e., the stand-by state, the transmission state, the reception state, and the copy state as well as the type of original sheet. As shown in FIG. 39B, even if the remaining amount of he battery is sufficient, if a heavy load is imposed, the battery voltage is decreased. If the decreased voltage is lower than a warning voltage set in the voltage setting circuit in the voltage monitor 133, an LED 134 flashes ON and OFF. The battery voltage is increased again because of the sufficient remaining amount of the battery, and the LED 134 stops flashing and is kept on.

When the detected voltage is lower than the warning voltage in continuous normal use of the battery, the LED 134 flashes ON and OFF again. At this moment, since the remaining amount of the battery is small, the battery voltage is not increased, and the LED 134 is kept flashing, thereby giving a warning to the user.

The low battery level can be informed to the user, and a countermeasure can be taken by the user such that the battery is charged.

In the first embodiment, the low battery level can be informed by flashing of the LED 134. However, a buzzer tone may be issued in place of use of the LED 134. In the arrangement shown in FIG. 1, a buzzer 131 can be driven in accordance with an output signal from the voltage monitor 133. In this case, the LED 134 can be omitted from the arrangement of the main body.

Figure 40A:
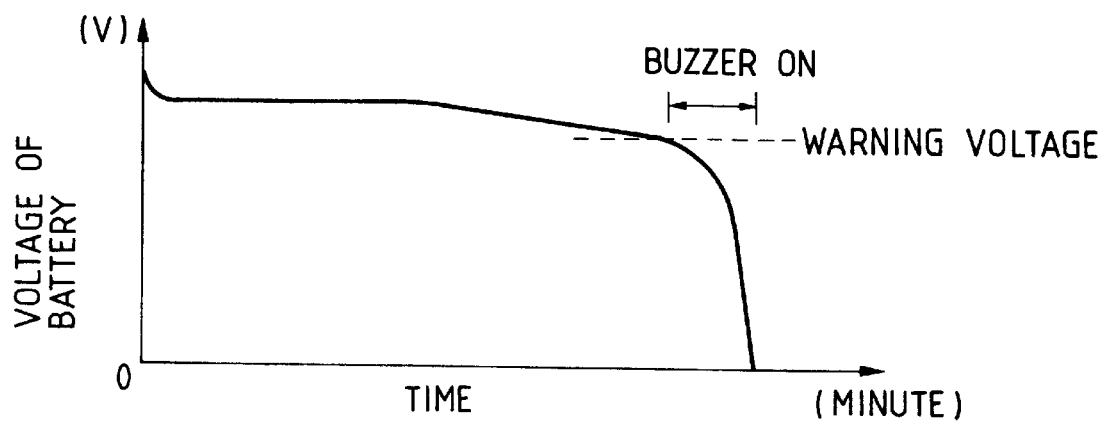
FIGS. 40A and 40B are graphs showing another relationship between battery discharge characteristics and an operation for warning a battery remaining amount by a warning voltage.
Figure 40B:
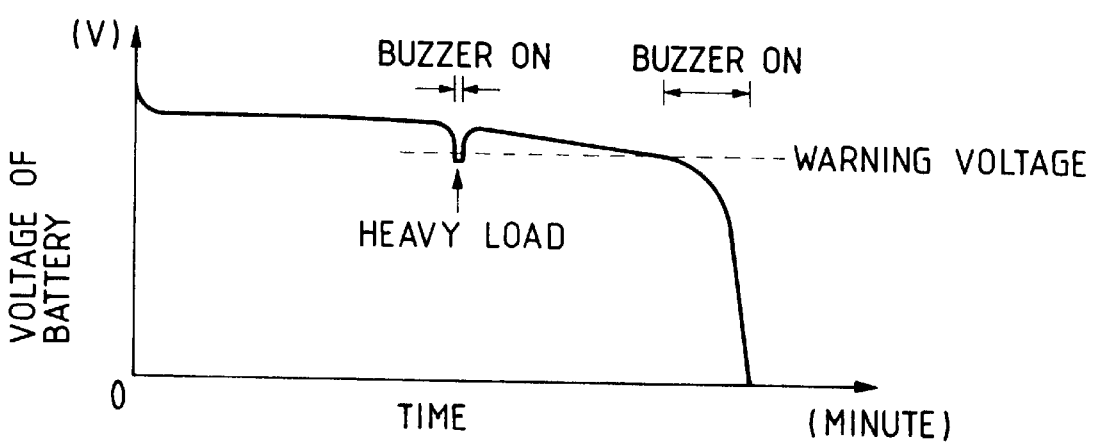

FIGS. 40A and 40B are graphs showing the discharge characteristics of a battery and operation for warning the remaining amounts of the battery. The operations in FIGS. 40A and 40B are the same as those in FIGS. 39A and 39B except that the buzzer is operated in place of flashing of the LED 134.

In this embodiment, the LED 134 is used for warning the remaining amount of the battery. However, the LED 134 may also be used as a power indication LED for indicating the power-ON state.

Figure 41A:
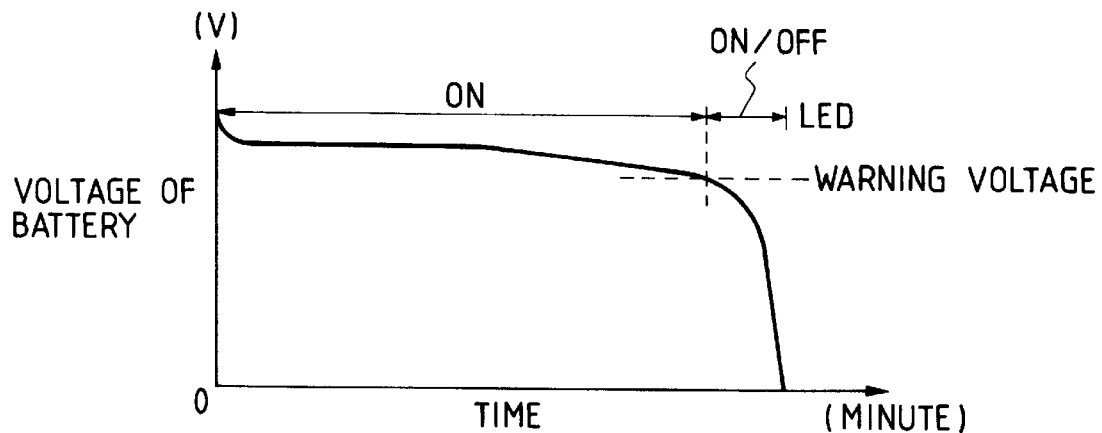
FIGS. 41A and 41B are graphs showing still another relationship between battery discharge characteristics and an operation for warning a battery remaining amount by a warning voltage.
Figure 41B:
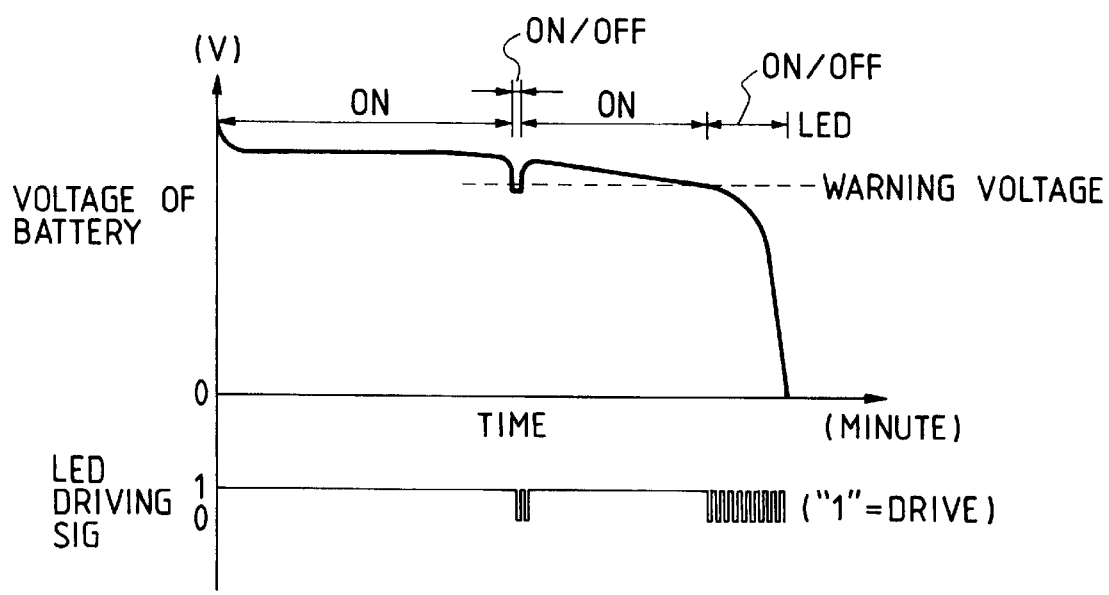

FIGS. 41A and 41B are graphs for explaining the discharge characteristics of the battery, warning of the remaining amount of the battery, and power indication.

FIG. 41A shows the discharge voltage characteristics when the discharge current of the battery is constant. As in the above embodiment, the battery voltage is kept at the rated voltage in the initial period. However, the voltage is gradually decreased with a lapse of time, and finally the voltage level is abruptly decreased.

In consideration of these discharge voltage characteristics, the voltage level for changing power indication as the continuous ON state of the LED 134 to the low battery level as flashing of the LED 134 is set by a voltage setting circuit in a voltage monitor 133.

FIG. 41B is a graph showing the discharge voltage characteristics and the LED drive waveform of the voltage monitor 133 which monitors the discharge voltage characteristics when the discharge current of the battery is changed.

When the battery voltage is sufficiently high in the normal application state, the continuous ON state of the LED 134 is kept by the voltage monitor 133. When a heavy load is temporarily imposed to decrease the battery voltage, and the detected voltage is lower than the warning voltage set by the voltage setting circuit, the LED 134 flashes ON and OFF. In this case, since the battery capacity is sufficient, the battery voltage is increased again, and the LED 134 stops flashing ON and OFF and is kept on.

When the detected voltage is lower than the warning voltage in continuous normal use of the battery, the LED 134 flashes ON and OFF again. At this moment, since the remaining amount of the battery is small, the battery voltage is not increased, and the LED 134 is kept flashing, thereby giving a warning to the user.

The state of the LED 134 is apparent from the LED drive output indicated in the lower part of FIG. 41B. That is, when the detected voltage is the warning voltage or more, the LED drive output is kept at "1" to keep the LED 134 on. However, when the detected voltage is lower than the warning voltage, the level of the LED drive output is repeatedly changed between "0" and "1", thereby flashing the LED 134.

As described above, the battery remaining amount warning LED and the power indication LED are constituted by a single LED to reduce the parts in the main body, thereby reducing the cost and size of the main body.

According to the present invention, the portable image communication apparatus using the battery includes a means for warning a decrease in battery voltage. A system resetting function for resetting the system upon a voltage variation need not be provided, and a proper operation can be suitably performed for the low battery level, thereby eliminating an unnecessary resetting operation and obtaining an optimal operation.

The above description is concerned about the differences from the first embodiment and about the second embodiment having no CPU in the external device.

As described above, a single facsimile apparatus wherein the external device and the main body can be separated from each other can be selectively used as a portable facsimile apparatus or a desktop personal facsimile apparatus.

The main body used as the portable facsimile apparatus has minimum functions such as transmission, reception, and copying required for portable use and is thus compact and lightweight.

When the main body is connected to the external device, other various functions are added, and the integral unit can be used as a stationary facsimile apparatus. The additional functions are an automatic receive function, an automatic answer/record phone function, an external telephone set/automatic answer/record phone terminal function, an F network non-ringing incoming call function, an automatic outgoing call function, a display (e.g., an LCD) function, and a speaker function. Of these functions, necessary functions are selected in accordance with the application environment of the facsimile apparatus, thereby providing an apparatus having cost equivalent to the functions. Data required for controlling the external device and data for using the functions of the external device are stored in the external device, so that the memory capacity of the main body can be minimized.

When the main body is disconnected from the external device, the external device can be operated singly to serve as an automatic answer/record phone. In addition, the input facsimile data may be stored in the form of analog signals. When the main body is connected to the external device, the analog data are synthesized through a modem, thereby extracting the composite image as a facsimile image.

The roll of paper is stored in the external device, and cut sheets are used in the portable use, thereby providing a lightweight portable apparatus.

[Third Embodiment]

The third embodiment exemplifies a stationary facsimile apparatus in which a recording apparatus of the present invention is arranged.

Figure 42:
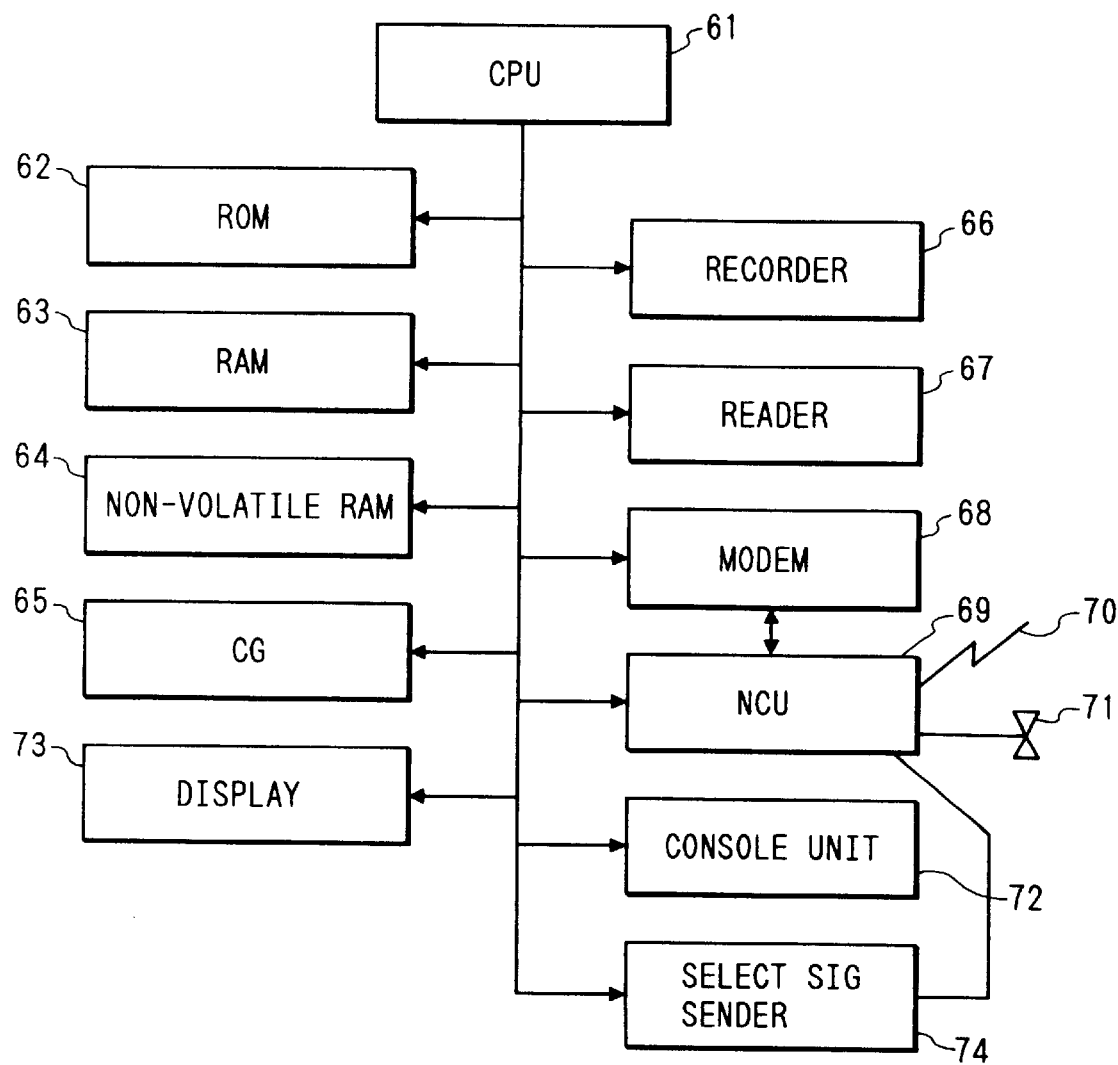
FIG. 42 is a block diagram showing the third embodiment.
Figure 43:
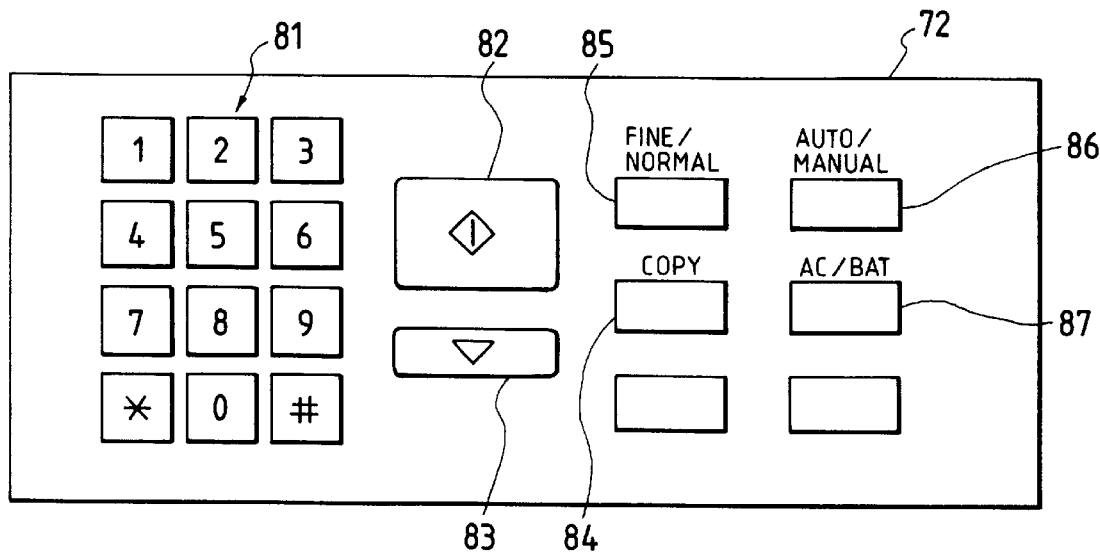
FIG. 43 is a plan view showing the arrangement of a console panel of the third embodiment.

FIG. 42 is a block diagram showing a facsimile apparatus according to the third embodiment of the present invention. This facsimile apparatus can selectively use an AC adapter or a battery in accordance with a key input by an operator. The record mode is changed in accordance with the type of power source. The respective components of this embodiment will be sequentially described below.

A CPU 61 controls the overall operation of the apparatus in accordance with programs stored in a ROM 62. More specifically, the CPU 61 controls a RAM 63, a non-volatile RAM 64, a character generator (CG) 65, a recorder 66, a reader 67, a modem 68, a network control unit (NCU) 69, a console unit 72, a display 73, and a select signal sender 74.

The RAM 63 is used as a work area of the CPU 61 and has an image memory area for storing binary image data read by the reader 67 and externally input binary image data. The non-volatile RAM 64 stores data to be saved even if the main power switch is turned off. The CG 65 comprises a ROM for storing characters constituted by JIS or ASCII codes.

The recorder 66 includes a thermal recording head and a recording paper convey system and records a received image or an image during copying of an original sheet. The reader 67 includes a CCD line sensor and an original sheet convey system and reads an image of an original sheet.

The modem 68 performs modulation or demodulation of communication image data and the like. The NCU 69 selectively connects a telephone line 70 to the modem 68 or a telephone set 71.

The console unit 72 has a ten-key pad 81, a start key 82, a stop key 83, a copy key 84, a resolution (fine/normal) key 85, and an auto/manual key 86 and inputs various data. In particular, in this embodiment, the console unit 72 includes a select (AC/BAT) key 87 for selecting an AC adapter power source or a battery as a power source.

The display 73 includes an LCD and displays the current time and operating states. The select signal sender 74 sends out a select signal such as a pulse dialer or a tone dialer through the NCU 69.

Figure 44:
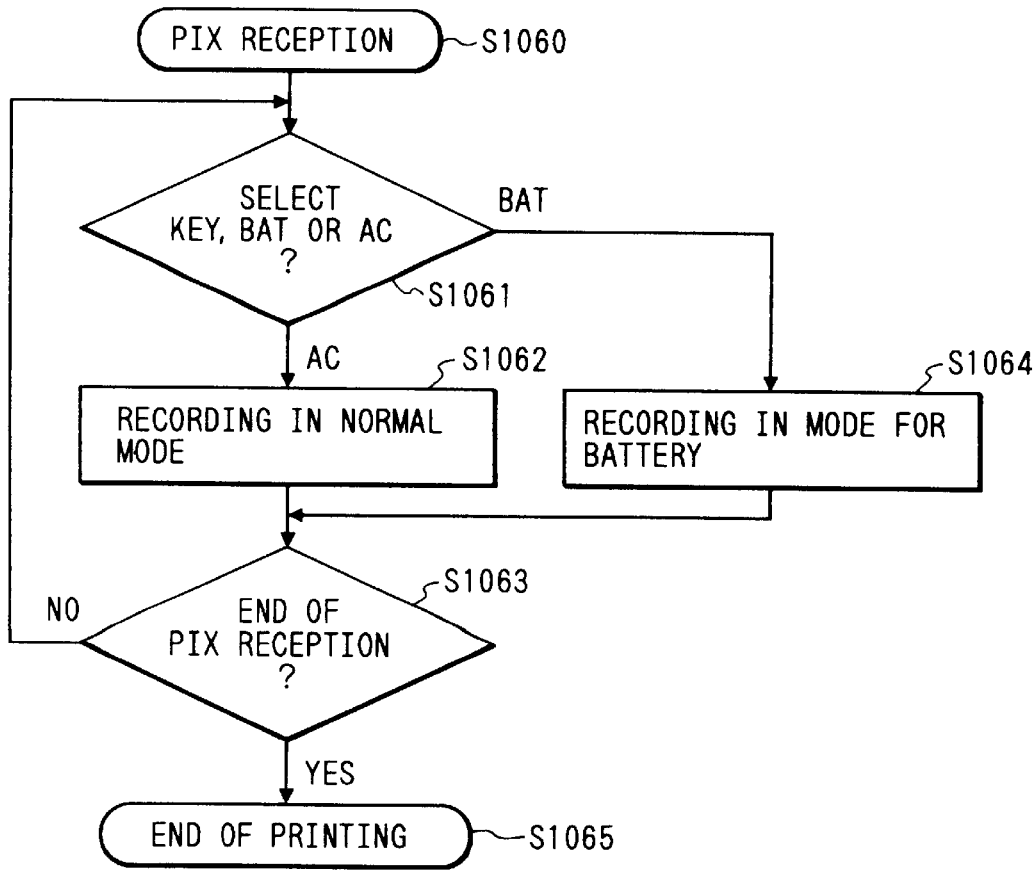
FIG. 44 is a flow chart showing PIX reception according to the third embodiment.

FIG. 44 is a flow chart showing a recording operation in the receive or reception mode of the third embodiment.

Up to reception of an image signal in step S1060, the known facsimile reception procedures are used. In image reception, the CPU 61 refers to the state of the select (AC/BAT) key 87 (S1061). When the AC adapter power source is used, recording is performed in accordance with a printing scheme of the normal mode (S1062). In this embodiment, the normal mode is defined as a mode in which all lines are printed, data of each line is decoded to obtain raw data, and the raw data is sent to the recorder 66, thereby printing the data on the recording paper.

In step S1061, when the battery is used, recording is performed in accordance with a printing scheme for performing a thin print operation in accordance with a black rate as the record mode for battery (S1064). That is, the record mode for battery is the thin print operation for lines each having a black rate of 50% or more.

The recording operation is repeated while checking the recording scheme every line. When an RTC is received and recording of the entire input image is completed (S1063), the print operation is completed (S1065), and the known post procedures are performed.

Figure 45:
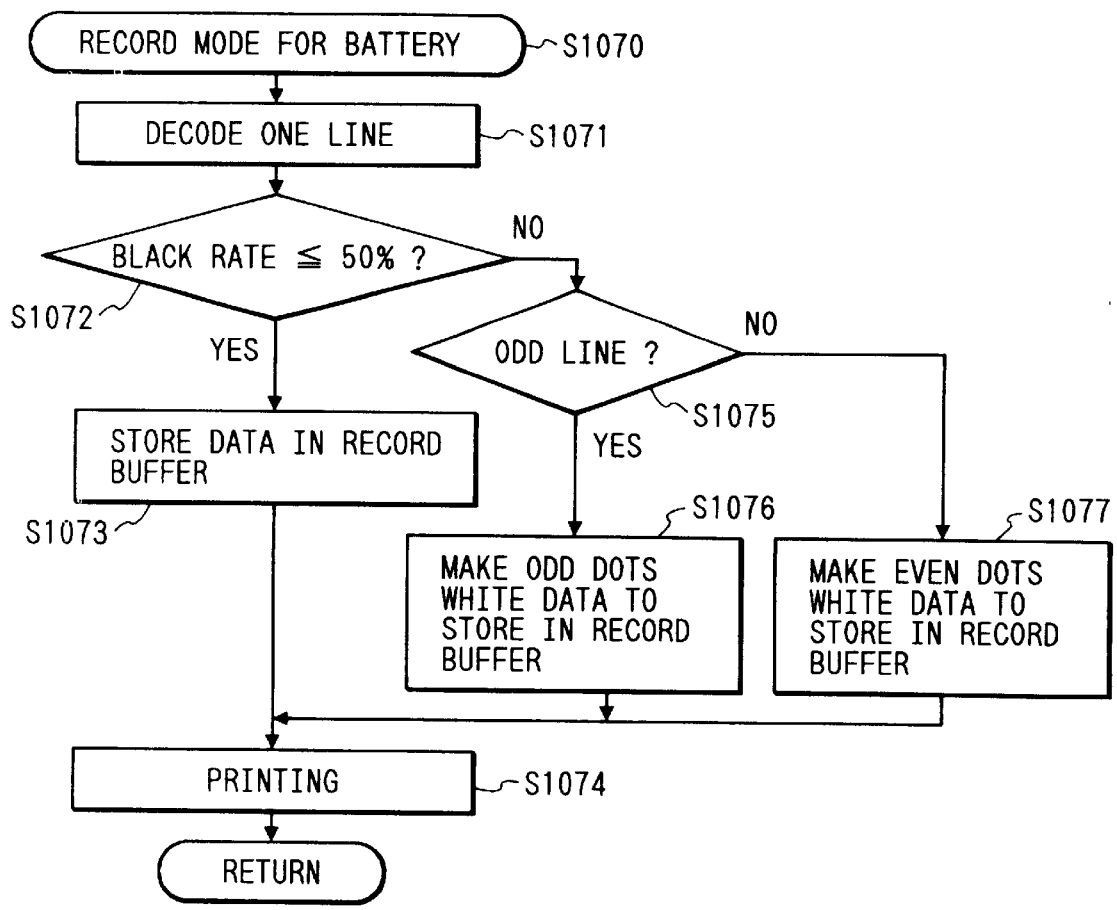
FIG. 45 is a flow chart showing printing in a record mode for battery according to the third embodiment.

FIG. 45 is a flow chart showing the record mode for battery in step S1064.

The record mode for battery is confirmed (S1070), and one line is decoded. The decoded raw data is stored in a decoding buffer (S1071). A black rate is calculated (S1072). For this purpose, a sum of black run-length data is calculated. For example, if the sum is less than 1,024 bits of the one-line data length, i.e., 2,048 bits for the B4 size, the black rate is determined to be less than 50%. The raw data in the decoding buffer is transferred to a record buffer, and printing is performed (S1074).

If the sum of the black run-length data is 1,025 bits or more, the black rate is determined to be 50% or more. It is determined in step S1075 whether this line is an odd or even line. If this line is determined to be the odd line, all even dots are made into white data, and the white data are transferred to the record buffer (S1077). Printing is then performed (S1074).

As described above, the peak current during printing can be almost halved in use of the battery. The service life of the battery can be prolonged.

The third embodiment exemplifies receive mode processing but can also be applied to a copy operation. In the third embodiment, data is thinned bit by bit in accordance with the black rate of 50% or more in use of the battery. However, one bit every four bits may be thinned at the black rate of 25% or more.

The present invention is not limited to the facsimile apparatuses described above, but is applicable to a variety of devices using an AC adapter power source and a battery or car battery.

According to the present invention, different printing schemes are used in use of the AC adapter power source and in use of the battery, respectively. Therefore, high-quality printing by the AC adapter power source can be assured while the power consumption of the battery can be kept low.

The present invention has been described with reference to the preferred embodiments. However, the present invention is not limited to these particular embodiments, and various changes and modifications may be made within the scope of the appended claims.

What is claimed is:

1. An image communication apparatus connectable to a detachable external device having a power supply function of providing power from an AC power supply to said image communication apparatus and a communication function for communicating with another apparatus via a communication line, comprising:

reading means for reading an original image;

communicating means for transmitting and receiving image data through the communication line;

recording means for recording the image read by said reading means and the image data received by said communicating means on recording paper;

control means for controlling an operation of said image communication apparatus;

connecting means for connecting the external device via a serial interface so that the external device conducts the power supply function of said image communication apparatus; and operation means arranged to be actuated manually by an operator, wherein said control means, responsive to an operation input from said operation means, sends to said external device via said connecting means a control signal for controlling said external device, and wherein the image data to be transmitted and received by said communicating means passes through said external device to and from the communication line, respectively.

2. An apparatus according to claim 1, wherein said control means controls said external device when said external device is connected to said image communication apparatus.

3. An apparatus according to claim 1, wherein said image communication apparatus can be used singly regardless of whether said external device is connected to said image communication apparatus.

4. An apparatus according to claim 1, wherein said external device performs the communication function on the basis of the control signal.

5. An external device connectable to an image communication apparatus equipped with means for reading an original image, means for recording image data, and means for transmitting and receiving the image data via a communication line, said external device comprising:

means for performing a power supply function for supplying power from an AC power supply to the image communication apparatus;

communicating means for communicating with another apparatus through the communication line;

connecting means for performing communication and control with respect to said image communication apparatus and connecting said image communication apparatus via a serial interface; and operation means arranged to be actuated manually by an operator, wherein said connecting means, responsive to an operation input from said operation means, sends a signal indicating the operation input to said image communication apparatus, and said image communication apparatus operates depending on the signal as sent.

6. A device according to claim 5, wherein said external device can be used regardless of whether said image communication apparatus is connected to said external device.

7. A device according to claim 5, further comprising network selecting means for detecting a type of network and selecting an appropriate network and appropriate communicating means.

8. A device according to claim 5, further comprising automatic outgoing call means for calling a designated destination at designated time.

9. A device according to claim 5, further comprising automatic receiving means for detecting a signal from a line to automatically receive a call.

10. A device according to claim 5, further comprising recording paper storing means function for storing recording paper.

11. A device according to claim 5, wherein said transmitting/receiving means from said image communication apparatus transmits and receives the image data in accordance with the signal indicating an operation input.

12. An image communication apparatus comprising a main body and an external device, said main body comprising:

reading means for reading an original image, first communicating means for transmitting and receiving image data through a communication line, recording means for recording the image read by said reading means and the image data received by said first communicating means on recording paper, control means for controlling an operation of said image communication apparatus, first connecting means for causing said control means to communicate with said external device, and operation means arranged to be actuated manually by an operator; and said external device comprising:

means for performing a power supply function for supplying power from an AC power supply to said main body, second connecting means for communicating with said first connecting means, and second communicating means for communicating with another apparatus through the communication line, wherein said main body and said external device are used while being connected to each other via a serial interface, said main body and said external device are detachable, and said external device is operated under the control of said control means of said main body, and wherein said control means, responsive to an operation input from said operation means, sends to said external device, via said first and second connecting means, a control signal for controlling said external device, and said second communicating means communicates based on the control signal, and wherein the image data to be transmitted and received by said first communicating means passes through said external device to and from the communication line, respectively.

13. An apparatus according to claim 12, further comprising network selecting means for detecting a type of network and selecting an appropriate network and appropriate communicating means.

14. An apparatus according to claim 12, further comprising automatic outgoing call means for calling a designated destination at designated time.

15. An apparatus according to claim 12, further comprising automatic receiving means for detecting a signal from a line to automatically receive a call.

16. An apparatus according to claim 12, wherein said external device causes said second communicating means to execute communication on the basis of the control signal.

17. An image communication apparatus comprising a main body and an external device, said main body comprising:

reading means for reading an original image, first communicating means for transmitting and receiving image data through a communication line, recording means for recording the image read by said reading means and the image data received by said first communicating means on recording paper, first control means for controlling an operation of said image communication apparatus, first connecting means for causing said first control means to communicate with said external device, and operation means arranged to be actuated manually by an operator; and said external device comprising:
   means for performing a power supply function for supplying power from an AC power supply to said main body,
   second control means for controlling said external device,
   second connecting means for causing said second control means to communicate with said main body, and
   second communicating means for transmitting and receiving image data through the communication line,
   wherein control signals and control data are exchanged between said first and second control means to cause said main body and said external device to operate as a single image communicating apparatus when said main body and said external device are connected via a serial interface, and when said main body and said external device are separated from each other they can be independently used, and
   wherein said first control means, responsive to an operation input from said operation means, sends a control signal to said second control means through said first and second connecting means, and said second control means controls said second communicating means in response to reception of the control signal, and
   wherein the image data to be transmitted and received by said first communicating means passes through said external device to and from the communication line, respectively.

18. An apparatus according to claim 17, wherein said second control means causes said second communicating means to execute communication on the basis of the control signal.

19. An image communication apparatus comprising a main body and an external device,
   said main body comprising:
      a modem,
      first switching means for connecting one of a second subscriber line and a mobile communication unit to said modem,
      image input means for supplying transmission image data to said modem, and
      recording means for recording an image received by said modem, and
   said external device comprising:
      second switching means for switching a first subscriber line to an externally connected communication terminal when said external device is disconnected from said main body,
      wherein said first subscriber line of said external device is connected to said modem of said main body, through switching means of said external device, when said main body is connected to said external device.

20. An apparatus according to claim 19, wherein said external device further comprises off-hook signal detecting means for detecting an off-hook signal of said externally connected communication terminal.

21. An apparatus according to claim 19, wherein said image communication apparatus includes means for detecting that said main body is connected to said external device.

22. An apparatus according to claim 19, wherein said image communication apparatus includes means for detecting whether a connected power source is a battery or an AC power source.

23. An apparatus according to claim 19, wherein said external device further comprises call signal detecting means for detecting a call signal.

24. An apparatus according to claim 19, wherein said external device further comprises facsimile call signal detecting means for detecting a facsimile call signal.

25. An apparatus according to claim 19, wherein said external device further includes a dial tone detecting means for detecting a dial tone when said first subscriber line is connected to said telephone set externally connected to said external device.

26. An apparatus according to claim 19, wherein said external device further comprises message/warning tone generating means for generating a message or a warning tone in accordance with an event.

27. An apparatus according to claim 19, wherein said external device comprises an AC outlet.

28. An apparatus according to claim 19, wherein said external device further comprises mode changing means for changing a mode to one of an automatic receive mode, an automatic answer/record phone mode, and a facsimile/telephone auto change mode.

29. An image communication apparatus connectable to a detachable external device having a first function of said image communication apparatus and a communication function for communicating with another apparatus via a communication line, comprising:
   reading means for reading an original image;
   communicating means for transmitting and receiving image data through the communication line;
   recording means for recording the image read by said reading means and the image data received by said communicating means on recording paper;
   control means for controlling an overall operation of said image communication apparatus; and
   connecting means for connecting the external device via a serial interface so that the external device conducts the first function of said image communication apparatus,
   wherein said external device has operation means arranged to be actuated manually by an operator, and said control means receives via said connecting means a signal indicating an operation input from said operation means and executes control based on the received signal.

30. An apparatus according to claim 29, wherein said control means controls said external device when said external device is connected to said image communication apparatus.

31. An apparatus according to claim 29, wherein said communication apparatus can be used regardless of whether said external device is connected to said image communication apparatus.

32. An apparatus according to claim 29, wherein said control means causes said communicating means to execute communication, in accordance with the signal indicating an operation input.

33. An external device connectable to an image communication apparatus which is equipped with means for reading an original image, means for recording image data, and means for transmitting and receiving the image data via a communication line, said external device comprising:
   means for performing a first function for assisting said image communication apparatus;
   communication means for communicating with another apparatus through the communication line; and
   connecting means for performing communication and control with respect to said image communication apparatus and connecting said image communication apparatus via a serial interface,
   wherein said apparatus has operation means arranged to be activated manually by an operator, and said external device conducts the first function on the basis of a signal indicating an operation input from the operation means received via said connecting means, and
   wherein the image data to be transmitted and received by said communicating means passes through said external device to and from the communication line, respectively.

34. A device according to claim 33, wherein said external device can be used regardless of whether said image communication apparatus is connected to said external device.

35. A communication according to claim 33, further comprising network selecting means for detecting a type of network and selecting an appropriate network and appropriate communicating means.

36. A device according to claim 33, further comprising automatic outgoing call means for calling a designated destination at a designated time.

37. A device according to claim 33, further comprising automatic receiving means for detecting a signal from a line to automatically receive a call.

38. A device according to claim 33, further comprising recording paper storing means for storing recording paper.

39. A device according to claim 33, wherein said communicating means executes communication based on the signal indicating an operation input.

40. An image communication apparatus comprising a main body and an external device,
   said main body comprising:
      reading means for reading an original image,
      first communicating means for transmitting and receiving image data through a communication line,
      recording means for recording the image read by said reading means and the image data received by said first communicating means on recording paper,
      control means for controlling an overall operation of said image communication apparatus, and
      first connecting means for causing said control means to communicate with said external device; and
   said external device comprising:
      means for performing a function for assisting said main body,
      second connecting means for communicating with said first connecting means,
      second communicating means for communicating with another apparatus through the communication line, and
      operation means arranged to be actuated manually by an operator,
      wherein said main body and said external device are used while being connected to each other via a serial interface, said main body and said external device are detachable, and said external device is operated under the control of said control means of said main body, and
      wherein said control means receives via said first and second connecting means a control signal indicating an operation input from said operation means and controls said image communication apparatus in accordance with the control signal.

41. An apparatus according to claim 40, further comprising network selecting means for detecting a type of network and selecting an appropriate network and appropriate communicating means.

42. An apparatus according to claim 40, further comprising automatic outgoing call means for calling a designated destination at designated time.

43. An apparatus according to claim 40, further comprising automatic receiving means for detecting a signal from a line to automatically receive a call.

44. An apparatus according to claim 40, wherein said control means causes said first communicating means to execute communication, on the basis of the control signal.

45. An image communication apparatus comprising a main body and an external device,
   said main body comprising:
      reading means for reading an original image,
      first communicating means for transmitting and receiving image data through a communication line,
      recording means for recording the image read by said reading means and the image data received by said first communicating means on recording paper,
      first control means for controlling an overall operation of said image communication apparatus, and
      first connecting means for causing said first control means to communicate with said external device; and
   said external device comprising:
      means for performing a function for assisting said main body,
      second control means for controlling said external device,
      second connecting means for causing said second control means to communicate with said main body, and
      second communicating means for transmitting and receiving image data through the communication line, and
      operation means arranged to be actuated manually by an operator,
      wherein control signals and control data are exchanged between said first and second control means to cause said main body and said external device as a single image communicating apparatus when said main body and said external device are connected via a serial interface, and said main body and said external device are separated from each other and can be independently used, and
      wherein said second control means, responsive to an operation input from said operation means, sends a control signal to said first control means through said first and second connecting means, and said first control means controls the main body in response to reception of the control signal.

46. An apparatus according to claim 45, wherein said first control means causes said first communicating means to execute communication on the basis of the control signal.

47. A method of operating an image communication apparatus connectable to a detachable external device having a power supply function of providing power from an AC power supply to said image communication apparatus and a communication function for communicating with another apparatus via a communication line, said method comprising the steps of:

reading an original image;

transmitting and receiving image data through the communicating line;

recording the image read by said reading step and the image data received by said communicating step on recording paper;

controlling an operation of said image communication apparatus;

connecting the external device via a serial interface so that the external device conducts the power supply function of said image communication apparatus; and actuating operating means actuatable manually by an operator, wherein said control step, responsive to an operation input from said actuating step, sends to said external device a control signal for controlling said external device, and wherein the image data to be transmitted and received by said communicating step passes through said external device to and from the communication line, respectively.

48. A method according to claim 47, wherein said control step controls said external device when said external device is connected to said image communication apparatus.

49. A method according to claim 47, wherein said image communication apparatus can be used singly regardless of whether said external device is connected to said image communication apparatus.

50. A method according to claim 47, wherein said external device performs the communication function on the basis of the control signal.

51. A method of operating an external device connectable to an image communication apparatus equipped with means for reading an original image, means for recording image data, and means for transmitting and receiving the image data via a communication line, said external device method comprising the steps of:

means for performing a power supply function for supplying power from an AC power supply to the image communication apparatus;

communicating with another apparatus through the communication line;

performing communication and control with respect to said image communication apparatus and connecting said image communication apparatus via a serial interface; and actuating operation means actuatable manually by an operator, wherein said connecting step, responsive to an operation input from said operation means, sends a signal indicating the operation input to said image communication apparatus, and said image communication apparatus operates depending on the signal as sent.

52. A method according to claim 51, wherein said external device can be used regardless of whether said image communication apparatus is connected to said external device.

53. A method according to claim 51, further comprising detecting a type of network and selecting an appropriate network and appropriate communicating means.

54. A method according to claim 51, further comprising calling a designated destination at designated time.

55. A method according to claim 51, further comprising detecting a signal from a line to automatically receive a call.

56. A method according to claim 51, further comprising storing recording paper.

57. A method according to claim 51, wherein said transmitting/receiving step from said image communication apparatus transmits and receives the image data in accordance with the signal indicating an operation input.

58. A method of operating an image communication apparatus comprising a main body and an external device, said method, in the main body, comprising the steps of:

reading an original image, first communicating including transmitting and receiving image data through a communication line, recording the image read by said reading step and the image data received by said first communicating step on recording paper, controlling an operation of said image communication apparatus, first connecting step for causing said control step to communicate with said external device, and actuating operation means actuatable manually by an operator; and said method in the external device, comprising the steps of:

means for performing a power supply function for supplying power from an AC power supply to said main body, second connecting step for communicating in accordance with said first connecting step, and second communicating step including communicating with another apparatus through the communication line, wherein said main body and said external device are used while being connected to each other via a serial interface, said main body and said external device are detachable, and said external device is operated under the control of said control step in said main body, wherein said control step, responsive to an operation input from said operation means, sends to said external device, using said first and second connecting step, a control signal for controlling said external device, and said second communicating step communicates based on the control signal, and wherein the image data to be transmitted and received by said first communicating step passes through said external device to and from the communication line, respectively.

59. A method according to claim 58, further comprising detecting a type of network and selecting an appropriate network and appropriate communicating means.

60. A method according to claim 58, further comprising calling a designated destination at designated time.

61. A method according to claim 58, further comprising detecting a signal from a line to automatically receive a call.

62. A method according to claim 58, wherein said external device causes said second communicating step to execute communication on the basis of the control signal.

63. A method of operating an image communication apparatus comprising a main body and an external device, said method, in the main body comprising the steps of:

reading an original image, first communicating including transmitting and receiving image data through a communication line, recording the image read by said reading step and the image data received by said first communicating step on recording paper, first control step for controlling an operation of said image communication apparatus, and first connecting step for causing said first control step to communicate with said external device, and actuating operation means actuatable manually by an operator; and said method, in the external device, comprising the steps of:

performing a power supply function for supplying power from an AC power supply to said main body, second control step for controlling said external device, second connecting step for causing said second control step to communicate with said main body, and second communicating step including transmitting and receiving image data through the communication line, wherein control signals and control data are exchanged in said first and second control steps to cause said main body and said external device to operate as a single image communicating apparatus when said main body and said external device are connected via a serial interface, and when said main body and said external device are separated from each other they can be independently used, wherein said first control step, responsive to an operation input from said operation means, sends a control signal for use in said second control step in said first and second connecting steps, and said second control step controls said second communicating step in response to reception of the control signal, and wherein the image data to be transmitted and received by said first communicating step passes through said external device to and from the communication line, respectively.

64. A method according to claim 63, wherein said second control step causes said second communicating step to execute communication on the basis of the control signal.

65. A method of operating an image communication apparatus comprising a main body and an external device, said method, in the main body, comprising the steps of:

providing a modem, first switching step for connecting one of a second subscriber line and a mobile communication unit to said modem, supplying transmission image data to said modem, and recording an image received by said modem, and said method, in the external device, comprising the steps of:

second switching step for switching a first subscriber line to an externally connected communication terminal when said external device is disconnected from said main body, wherein said first subscriber line of said external device is connected to said modem of said main body, through switching means of said external device, when said main body is connected to said external device.

66. A method according to claim 65, wherein said method in the external device further detecting an off-hook signal of said externally connected communication terminal.

67. A method according to claim 65, wherein said method in the image communication apparatus includes detecting that said main body is connected to said external device.

68. A method according to claim 65, wherein said method in the image communication apparatus includes detecting whether a connected power source is a battery or an AC power source.

69. A method according to claim 65, wherein said method in the external device further comprises detecting a call signal.

70. A method according to claim 65, wherein said method in the external device further comprises detecting a facsimile call signal.

71. A method according to claim 65, wherein said method in the external device further includes detecting a dial tone when said first subscriber line is connected to said telephone set externally connected to said external device.

72. A method according to claim 65, wherein said method in the external device further comprises generating a message or a warning tone in accordance with an event.

73. A method according to claim 65, wherein said external device comprises an AC outlet.

74. A method according to claim 65, wherein said method in the external device further comprises mode changing means for changing a mode to one of an automatic receive mode, an automatic answer/record phone mode, and a facsimile/telephone auto change mode.

75. A method of operating an image communication apparatus connectable to a detachable external device having a first function of said image communication apparatus and a communication function for communicating with another apparatus via a communication line, comprising the steps of:

reading an original image;

communicating including transmitting and receiving image data through the communication line;

recording the image read by said reading step and the image data received by said communicating step on recording paper;

controlling an overall operation of said image communication apparatus; and connecting the external device via a serial interface so that the external device conducts the first function of said image communication apparatus, wherein said external device has operation means arranged to be actuated manually by an operator, and said control means receives via said connecting means a signal indicating an operation input from said operation means and executes control based on the received signal.

76. A method according to claim 75, wherein said control step controls said external device when said external device is connected to said image communication apparatus.

77. A method according to claim 75, wherein said communication apparatus can be used regardless of whether said external device is connected to said image communication apparatus.

78. A method according to claim 75, wherein said control step causes said communicating step to execute communication, in accordance with the signal indicating an operation input.

79. A method of operating an external device connectable to an image communication apparatus which is equipped with means for reading an original image, means for recording image data, and means for transmitting and receiving the image data via a communication line, said method comprising the steps of:

performing a first function for assisting said image communication apparatus;

communicating with another apparatus through the communication line; and performing communication and control with respect to said image communication apparatus and connecting said image communication apparatus via a serial interface, wherein said apparatus has operation means arranged to be activated manually by an operator, and said method conducts the first function on the basis of a signal indicating an operation input from the operation means received via said connecting means, and wherein the image data to be transmitted and received by said communicating step passes through said external device to and from the communication line, respectively.

80. A method according to claim 79, wherein said external device can be used regardless of whether said image communication apparatus is connected to said external device.

81. A method according to claim 79, further comprising detecting a type of network and selecting an appropriate network and appropriate communicating means.

82. A device according to claim 79, further comprising calling a designated destination at a designated time.

83. A device according to claim 79, further comprising detecting a signal from a line to automatically receive a call.

84. A device according to claim 79, further comprising storing recording paper.

85. A device according to claim 79, wherein said communicating step executes communication based on the signal indicating an operation input.

86. A method of operating an image communication apparatus comprising a main body and an external device, said method, in the main body, comprising the steps of:
reading an original image,
first communicating step for transmitting and receiving image data through a communication line,
recording the image read by said reading step and the image data received by said first communicating step on recording paper,
controlling an overall operation of said image communication apparatus, and
first connecting step for causing said control step to communicate with said external device; and
said method, in the external device, comprising the steps of:
performing a function for assisting said main body,
second connecting step for communicating with said first connecting step,
second communicating step for communicating with another apparatus through the communication line, and
actuating operation means actuatable manually by an operator,
wherein said main body and said external device are used while being connected to each other via a serial interface, said main body and said external device are detachable, and said external device is operated under the control of said control step of said main body, and
wherein said control step receives in said first and second connecting steps a control signal indicating an operation input from said operation means and controls said image communication apparatus in accordance with the control signal.

87. A method according to claim 86, further comprising detecting a type of network and selecting an appropriate network and appropriate communicating means.

88. A method according to claim 86, further comprising calling a designated destination at designated time.

89. A method according to claim 86, further comprising detecting a signal from a line to automatically receive a call.

90. A method according to claim 86, wherein said control step causes said first communicating step to execute communication, on the basis of the control signal.

91. A method of operating an image communication apparatus comprising a main body and an external device, said method, in the main body, comprising the steps of:
reading an original image,
first communicating step for transmitting and receiving image data through a communication line,
recording the image read by said reading step and the image data received by said first communicating step on recording paper,
first control step for controlling an overall operation of said image communication apparatus, and
first connecting step for causing said first control means to communicate with said external device; and
said method, in said external device, comprising the steps of:
performing a function for assisting said main body,
second control step for controlling said external device,
second connecting step for causing said second control step to communicate with said main body, and
second communicating step for transmitting and receiving image data through the communication line, and
actuating operation means actuatable manually by an operator,
wherein control signals and control data are exchanged in said first and second control steps to cause said main body and said external device as a single image communicating apparatus when said main body and said external device are connected via a serial interface, and said main body and said external device are separable from each other and can be independently used, and
wherein said second control step, responsive to an operation input from said operation means, sends a control signal for said first control step in said first and second connecting steps, and said first control step controls the main body in response to reception of the control signal.

92. A method according to claim 91, wherein said first control step causes said first communicating step to execute communication on the basis of the control signal.

93. An image communication apparatus, connectable to a detachable external device having a communication function for communicating with another apparatus via a first communication line, comprising:
input means for inputting first image data;
communicating means for transmitting and receiving second image data through a second communication line;
output means for outputting at least one of the first image data input by said input means and the second image data received by said communicating means;
control means for controlling an operation of said image communication apparatus; and
connecting means for connecting the external device, wherein the external device has operation means arranged to be actuated manually by an operator, and said control means (1) receives via said connecting means a signal indicating an operation input from the operation means of the external device and (2) executes control based on the received signal.

94. An apparatus according to claim 93, wherein said control means controls the external device when the external device is connected to said image communication apparatus.

95. An apparatus according to claim 93, wherein said image communication apparatus can be used without being connected to the external device.

96. An apparatus according to claim 93, further comprising means for detecting that said image communication apparatus is connected to the external device.

97. An apparatus according to claim 93, further comprising a connected power source and means for detecting whether said connected power source is a battery or an AC power source.

98. An apparatus according to claim 93, wherein said input means reads an original image.

99. An apparatus according to claim 93, wherein said output means records at least first image data and second image data on a recording paper.

100. An apparatus according to claim 93, wherein said control means transmits the first image data input by said input means to the external device on the basis of the received signal.

101. An apparatus according to claim 100, wherein the first image data is transmitted via the first communication line of the external device to the other apparatus.

102. An apparatus according to claim 93, wherein said image communication apparatus receives third image data from the external device via said connecting means on the basis of the received signal and said control means causes said output means to output the third image data.

103. An external device, connectable to an image communication apparatus includes means for inputting image data, means for outputting image data, and means for transmitting and receiving the image data via a first communication line, said external device comprising:

communication means for communicating with another apparatus through a second communication line;

connecting means for connecting the image communication apparatus to said external device; and operation means for activating said external device manually by an operator, wherein said external device transmits to the image communication apparatus via said connecting means a signal indicating an operation input to said operation means, and the image communication apparatus operates based on the transmitted signal.

104. A device according to claim 103, wherein said external device can be used without being connected to the image communication apparatus.

105. A device according to claim 103, further comprising network selecting means for detecting a type of an incoming call and selecting a corresponding network.

106. A device according to claim 105, wherein said network selecting means externally connects said external device to a communication terminal, and said external device further comprises off-hook signal detecting means for detecting an off-hook signal of the externally-connected communication terminal.

107. A device according to claim 105, wherein said network selecting means externally connects said external device to a telephone set.

108. A device according to claim 107, further comprising a dial tone detecting means for detecting a dial tone when the second communication line is connected to the telephone set.

109. A device according to claim 103, further comprising automatic outgoing call means for calling a designated destination at a designated time.

110. A device according to claim 103, further comprising automatic receiving means for detecting a signal from the second communication line to automatically receive a call.

111. A device according to claim 103, further comprising facsimile call signal detecting means for detecting a facsimile call signal.

112. A device according to claim 103, further comprising message/warning tone generating means for generating a message tone or a warning tone in accordance with an event.

113. A device according to claim 103, further comprising an AC outlet.

114. A device according to claim 103, further comprising mode changing means for changing a mode to one of an automatic receive mode, an automatic answer/record phone mode, and a facsimile/telephone auto change mode.

115. A device according to claim 103, wherein the image communication apparatus reads an original image.

116. A device according to claim 103, wherein the image communication apparatus records the image data on a recording paper.

117. A device according to claim 116, further comprising recording paper storing means for storing recording paper.

118. A device according to claim 117, wherein the inputted image data are transmitted to the other apparatus by said communication means.

119. A device according to claim 103, wherein said external device receives via said connecting means the image data input by said input means and transmitted based on the transmitted signal from the image communication apparatus.

120. A device according to claim 103, wherein said image communication apparatus outputs transmitted image data from said external device on the basis of the transmitted signal.

121. A method of operating an image communication apparatus, connectable to a detachable external device having a communication function for communicating with another apparatus via a first communication line, said method comprising the steps of:

inputting first image data;

transmitting and receiving second image data through a second communication line;

outputting at least one of the first image data input by said inputting step and the second image data received by said communicating step;

controlling an operation of said image communication apparatus; and connecting the external device, wherein the external device has operation means arranged to be actuated manually by an operator, and said controlling step (1) receives via said connecting step a signal indicating an operation input from the operation means of the external device and (2) executes control based on the received signal.

122. A method according to claim 121, wherein said controlling step controls the external device when the external device is connected to said image communication apparatus.

123. A method according to claim 121, wherein said image communication apparatus can be used without being connected to the external device.

124. A method according to claim 121, further comprising detecting that said image communication apparatus is connected to the external device.

125. A method according to claim 121, further comprising a connected power source and detecting whether said connected power source is a battery or an AC power source.

126. A method according to claim 121, wherein said inputting step reads an original image.

127. A method according to claim 121, wherein said outputting step records at least first image data and second image data on a recording paper.

128. A method according to claim 121, wherein said controlling step transmits the first image data input by said inputting step to the external device on the basis of the received signal.

129. A method according to claim 128, wherein the first image data is transmitted via the first communication line of the external device to the other apparatus.

130. A method according to claim 121, wherein said image communication apparatus receives third image data from the external device via said connecting step on the basis of the received signal and said controlling step causes said outputting step to output the third image data.

131. A method of operating an external device, connectable to an image communication apparatus includes means for inputting image data, means for outputting image data, and means for transmitting and receiving the image data via a first communication line, said method comprising the steps of:

communicating with another apparatus through a second communication line;

connecting the image communication apparatus to said external device; and activating said external device manually by an operator, wherein said external device transmits to the image communication apparatus via said connecting step a signal indicating an operation input to said activating step, and the image communication apparatus operates based on the transmitted signal.

132. A method according to claim 131, wherein said external device can be used without being connected to the image communication apparatus.

133. A method according to claim 131, further comprising detecting a type of an incoming call and selecting a corresponding network.

134. A method according to claim 133, wherein said selecting step externally connects said external device to a communication terminal, and said external device further comprises off-hook signal detecting means for detecting an off-hook signal of the externally-connected communication terminal.

135. A method according to claim 133, wherein said selecting step externally connects said external device to a telephone set.

136. A method according to claim 135, further comprising detecting a dial tone when the second communication line is connected to the telephone set.

137. A method according to claim 131, further comprising calling a designated destination at a designated time automatically for outgoing calls.

138. A method according to claim 131, further comprising detecting a signal from the second communication line to automatically receive a call.

139. A method according to claim 131, further comprising detecting a facsimile call signal.

140. A method according to claim 131, further comprising generating a message tone or a warning tone in accordance with an event.

141. A method according to claim 131, wherein said device further comprising an AC outlet.

142. A method according to claim 131, further comprising changing a mode to one of an automatic receive mode, an automatic answer/record phone mode, and a facsimile/telephone auto change mode.

143. A method according to claim 131, wherein the image communication apparatus reads an original image.

144. A method according to claim 131, wherein the image communication apparatus records the image data on a recording paper.

145. A method according to claim 144, further comprising storing the recording paper.

146. A method according to claim 145, wherein the inputted image data are transmitted to the other apparatus by said communicating step.

147. A method according to claim 131, wherein said external device receives via said connecting step the image data input by said inputting step and transmitted based on the transmitted signal from the image communication apparatus.

148. A method according to claim 131, wherein said image communication apparatus outputs transmitted image data from said external device on the basis of the transmitted signal.

149. An image communication apparatus connectable to a detachable external device having a power supply function of providing power from an AC power supply to said image communication apparatus and a communication function for communicating with another apparatus via a communication line, comprising:

a reader;

a modem connected to a network control unit, where said modem transmits and receives image data through the communication line connected to said network control unit;

a recorder, wherein said recorder records the image data received by said modem on recording paper;

a controller to control operation of said reader, modem and recorder;

a plurality of contacts arranged to enable connection of said image communication apparatus to the external device via a serial interface so that the external device conducts power supply function for said image communication apparatus; and a console unit having a plurality of manual input designators which can be actuated by an operator, wherein said controller, responsive to a manual input designation from said console unit, sends to the external device via said plurality of contacts a control signal for controlling the external device, and wherein the image data to be transmitted and received by said modem passes through the external device to and from the communication line, respectively.

150. An external device connectable to an image communication apparatus equipped with a reading unit, a recording unit, and a modem for transmitting and receiving the image data via a communication line, said external device comprising:

a power supply source which supplies power from an AC power supply to the image communication apparatus;

a network control unit arranged to communicate with another apparatus through the communication line;

a plurality of contacts for connecting said image communication apparatus and sending communication and control signals via a serial interface; and a console unit having a plurality of manual input designators which can be actuated by an operator, wherein said plurality of contacts, responsive to an manual input designation from said console unit, sends a signal indicating the manual input designation to said image communication apparatus, and said image communication apparatus operates depending on the signal as sent.

151. An image communication apparatus comprising a main body and an external device, said main body comprising:

a reader, a first network control unit, a modem connected to said first network control unit, where said modem transmits and receives image data through a communication line connected to said first network control unit, a recorder, wherein said recorder records the image data received by said first modem on recording paper, a controller to control operation of said reader, first modem and recorder, a first plurality of contacts arranged to enable connection of said controller to said external device, and a console unit having a plurality of manual input designators which can be actuated by an operator; and said external device comprising:

a power supply source which supplies power from an AC power supply to said main body, a second plurality of contacts for connection to said first plurality of contacts, and a second network control unit arranged to communicate with another apparatus through the communication line, wherein said main body and said external device are used while said first and second plurality of contacts are connected to each other, said main body and said external device are detachable, and said external device is operated under the control of said controller of said main body, wherein said controller, responsive to an manual input designation from said console unit, sends to said external device, via a serial interface, a control signal for controlling said external device, and said second network control unit communicates based on the control signal, and wherein the image data to be transmitted and received by said modem passes through said external device to and from the communication line, respectively.

152. An image communication apparatus comprising a main body and an external device, said main body comprising:

a reader, a first network control unit, a modem connected to said first network control unit, where said modem transmits and receives image data through a communication line connected to said first network control unit, a recorder, wherein said recorder records the image data received by said first modem on recording paper, a first controller to control operation of said reader, first modem and recorder, a first plurality of contacts arranged to enable connection of said controller to said external device, and a console unit having a plurality of manual input designators which can be actuated by an operator, and said external device comprising:

a power supply source which supplies power from an AC power supply to said main body, a second controller to control operation of said external device, a second plurality of contacts for connection to said first plurality of contacts, and a second network control unit arranged to communicate with another apparatus through the communication line, wherein control and data signals are exchanged between said first and second plurality of contacts to cause said main body and said external device to operate as a single image communication apparatus when said main body and said external device are connected, and when said main body and said external device are separated from each other independent operation is possible, wherein said first controller, responsive to an manual input designation from said console unit, sends to said external device, via said first and second plurality of contracts, a control signal for controlling said external device, and said second network control unit communicates based on the control signal, and wherein the image data to be transmitted and received by said modem passes through said external device to and from the communication line, respectively.

153. An external device connectable to an image communication apparatus which is equipped with a reader which reads an original image, a recorder which records image data, and a modem for transmitting and receiving the image data via a communication line, said external device comprising:

a network control unit arranged to communicate with another apparatus through the communication line, a display;

a message generator connected to a speaker;

a modem for communication with another apparatus through a communication line connected to said network control unit, where said external device performs a function for assisting said image communication apparatus using said network control unit, display and message generator; and a plurality of contacts for connection to said image communication apparatus via a serial interface, wherein the image communication apparatus has a console unit having a plurality of manual input designators arranged to be activated manually by an operator, and said external device conducts the function on the basis of a signal indicating an operation input from the console unit received via said plurality of contacts, and wherein the image data to be transmitted and received by said modem passes through said external device to and from the communication line, respectively.

154. An image communication apparatus comprising a main body and an external device, said main body comprising:

a reader, a first network control unit, a modem connected to said first network control unit, where said modem transmits and receives image data through a communication line connected to said first network control unit, a recorder, wherein said recorder records the image data received by said first modem on recording paper, a controller to control operation of said image communication apparatus, a first plurality of contacts arranged to enable connection of said controller to said external device; and said external device comprising:

a second network control unit arranged to communicate with another apparatus through the communication line, a display,
a message generator connected to a speaker,
where said external device performs a function for assisting said image communication apparatus using said second network control unit, display and message generator,
a second plurality of contacts for connection to said first plurality of contacts, and
a console unit having a plurality of manual input designators arranged to be activated manually by an operator,
wherein said main body and said external device are used while said first and second plurality of contacts are connected to each other, said main body and said external device are detachable, and said external device is operated under the control of said controller of said main body, and
wherein said controller receives via said first and second plurality of contacts a control signal indicating an operation input from said console unit and controls said image communication apparatus in accordance with the control signal.

155. An image communication apparatus comprising a main body and an external device,
said main body comprising:
a reader,
a network control unit,
a modem connected to said network control unit, where said modem transmits and receives image data through a communication line connected to said network control unit,
a recorder, wherein said recorder records the image data received by said first modem on recording paper,
a first controller to control operation of said image communication apparatus,
a first plurality of contacts arranged to enable connection of said first controller to said external device; and
said external device comprising:
a second network control unit arranged to communicate with another apparatus through the communication line,
a display,
a message generator connected to a speaker,
where said external device performs a function for assisting said image communication apparatus using said second network control unit, display and message generator,
a second controller to control operation of said external device,
a second plurality of contacts for connection to said first plurality of contacts, and
a console unit having a plurality of manual input designators arranged to be activated manually by an operator,
wherein control and data signals are exchanged between said first and second plurality of contacts to cause said main body and said external device to operate as a single image communication apparatus when said main body and said external device are connected, and when said main body and said external device are separated from each other independent operation is possible, and
wherein said second controller, responsive to an manual input designation from said console unit, sends a control signal to said first controller through said first and second plurality of contracts, and said first controller controls said main body in response to reception of the control signal.

156. An image communication apparatus, connectable to a detachable external device having a communication function for communicating with another apparatus via a first communication line, comprising:
a reader;
a modem connected to a network control unit, where said modem transmits and receives second image data through a second communication line connected to said network control unit;
a recorder, wherein said recorder records at least one of the first image data or second image data;
a controller to control operation of said image communication apparatus; and
a plurality of contacts arranged to enable connection of the external device, wherein the external device has a console unit having a plurality of manual input designators which can be actuated by an operator, and said controller (1) receives via said plurality of contacts a signal indicating an operation input form the console unit of the external device and (2) executes control based on the received signal.

157. An external device, connectable to an image communication apparatus including a recorder, a recorder, and a modem for transmitting and receiving image data via a first communication line, said external device comprising:
a network control unit arranged to communicate with another apparatus through a second communication line;
a plurality of contacts for connection to said image communication apparatus;
a console unit arranged to be activated manually by an operator, where said console unit can activate said external device via an input designation, and wherein said external device transmits to the image communication apparatus via said plurality of contacts a signal indicating an operation input from said console unit, and the image communication apparatus operates based on the transmitted signal.

158. An apparatus connectable to a detachable external device having a power supply function of providing power to said apparatus and a communication function for communicating with another apparatus, comprising:
communicating means for transmitting or receiving data; and
connecting means for connecting said external device without a radio interface so that said external device conducts the power supply function of said apparatus,
wherein the data to be transmitted or received by said communicating means passes through said external device to and from said another apparatus.

159. An apparatus according to claim 158, further comprising a battery, said battery being charged by power supplied from said external device.

160. An apparatus according to claim 158, further comprising another communicating means for communicating with said another or still another apparatus when said apparatus is not connected to said external device.

161. An external device connectable to an apparatus equipped with means for transmitting or receiving data, said external device comprising:
means for performing a power supply function for supplying power to said apparatus;

communicating means for communicating with another apparatus; and connecting means for connecting said apparatus, wherein the data to be transmitted or received by said apparatus passes through said communicating means of said external device to and from said another apparatus.

162. A device according to claim 161, wherein said apparatus further comprises a battery, said battery being charged by power supplied from said external device.

163. A device according to claim 161, wherein said apparatus further comprises another communicating means for communicating with said another or still another apparatus when said is not connected to said external device.

164. In combination, an apparatus connectable to a detachable external device having a power supply function of providing power to said apparatus and communication function for communicating with another apparatus, said apparatus comprising:
communicating means for transmitting or receiving data; and
a connecting means for connecting said external device without a radio interface so that said external device conducts the power supply function of said apparatus;

wherein the data to be transmitted or received by said communicating means passes thorough said external device to and from said another apparatus; and said external device connectable to said apparatus equipped with means for transmitting or receiving data;

said external device comprising:
means for performing a power supply function for supplying power to said apparatus;
communicating means for communicating with another apparatus; and
connecting means for connecting said apparatus,
wherein the data to be transmitted or received by said apparatus passes through said communicating means of said external device to and from said another apparatus.

165. In the combination according to claim 164, said apparatus further comprises a battery, said battery being charged by power supplied from said external device.

166. In the combination according to claim 164, said apparatus further comprises another communicating means for communicating with said another or still another apparatus when said apparatus is not connected to said external device.

\* \* \* \* \*

UNITED STATES PATENT AND TRADEMARK OFFICE
CERTIFICATE OF CORRECTION

PATENT NO. : 5,825,505
DATED : October 20, 1998
INVENTOR(S) : HISASHI TOYODA, ET AL.

It is certified that error appears in the above-identified patent and that said Letters Patent is hereby corrected as shown below:

Title page:

AT [56], REFERENCES CITED

Under FOREIGN PATENT DOCUMENTS,

"2036971
3218163" should read
--2-036971
3-218163--.

IN THE DRAWINGS

Figure 24:
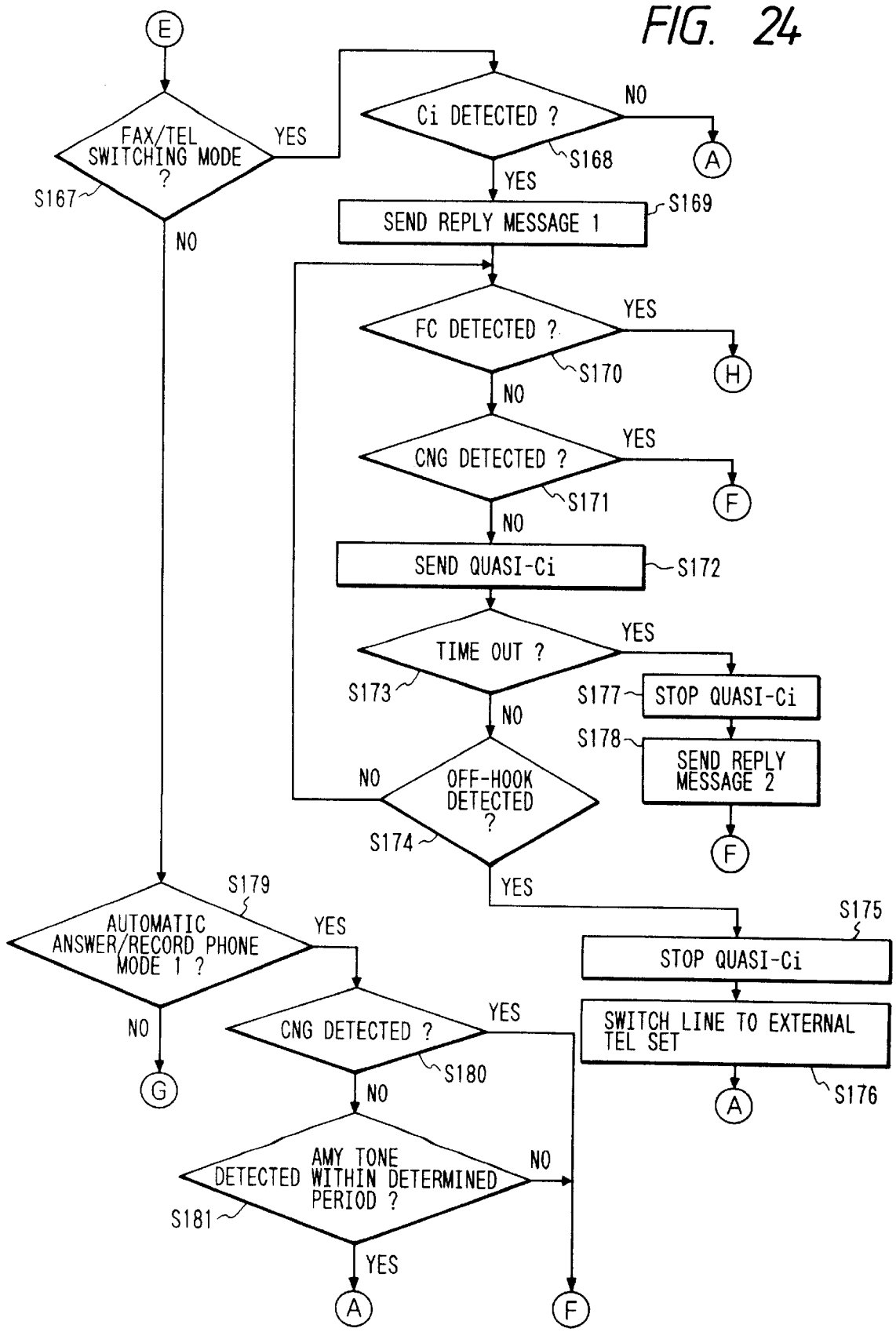
FIG. 24 is a flow chart showing the stand-by operation of the external device of the embodiment.
Figure 38A:
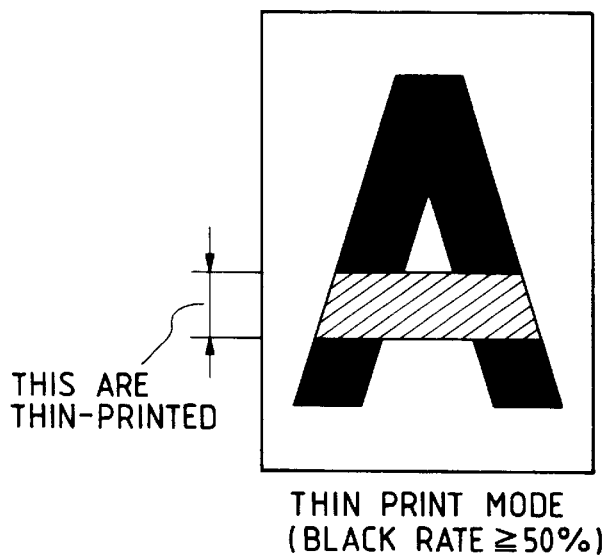
FIGS. 38A and 38B are views illustrating an image obtained in a normal print mode and an image obtained in a thin print mode.
Figure 38B:
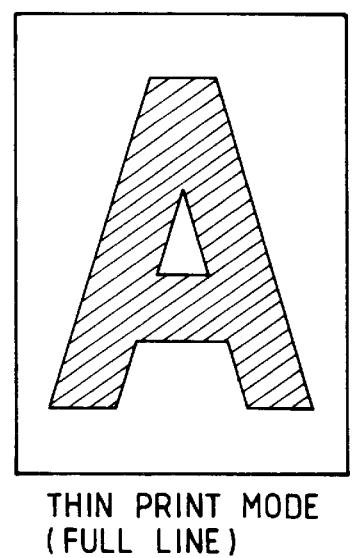

Sheet 21 - Figure 24, "amy" should read --any--.
Sheet 35 - Figure 38A, "are" should read --is--.

COLUMN 1

Line 22, "except" should read --other than--.
Line 23, "for" (first occurrence) should be deleted.

COLUMN 4

Line 54, "a DC/DC converter" should read --and a DC/DC converter, which--.

COLUMN 5

Line 35, "28" should read --218--.

COLUMN 7

Line 47, "fed" should read --feed--.

UNITED STATES PATENT AND TRADEMARK OFFICE
CERTIFICATE OF CORRECTION

PATENT NO. : 5,825,505

DATED : October 20, 1998

INVENTOR(S) : HISASHI TOYODA, ET AL.

It is certified that error appears in the above-identified patent and that said Letters Patent is hereby corrected as shown below:

COLUMN 10

Line 47, "the any" should read --any--.

COLUMN 13

Line 57, "any" should read --no--.
    Line 58, "is not" should read --is--.

COLUMN 15

Line 46, "waiting" should read --awaiting--.
    Line 56, "0" in" should read --"0", it--.
    Line 57, "that," should read --that--.

COLUMN 23

Line 67, "at" should read --at a--.

COLUMN 24

Line 5, "function" should be deleted.
    Line 54, "at" should read --at a--.

COLUMN 27

Line 28, "communication" should read --device--.

UNITED STATES PATENT AND TRADEMARK OFFICE
CERTIFICATE OF CORRECTION

PATENT NO. : 5,825,505

DATED : October 20, 1998

INVENTOR(S) : HISASHI TOYODA, ET AL.

It is certified that error appears in the above-identified patent and that said Letters Patent is hereby corrected as shown below:

COLUMN 28

Line 15, "at" should read --at a--.
Line 52, "as" should read --to function as--.

COLUMN 29

Line 67, "at" should read --at a--.

COLUMN 30

Line 52, "at" should read --at a--.

COLUMN 31

Line 59, "further" should read --further comprises--.

COLUMN 33

Line 62, "at" should read --at a--.

COLUMN 34

Line 27, "as" should read --to function as--.

COLUMN 37

Line 58, "comprising" should read --comprises--.

UNITED STATES PATENT AND TRADEMARK OFFICE
CERTIFICATE OF CORRECTION

PATENT NO. : 5,825,505

DATED : October 20, 1998

INVENTOR(S) : HISASHI TOYODA, ET AL.

It is certified that error appears in the above-identified patent and that said Letters Patent is hereby corrected as shown below:

COLUMN 38

Line 58, "an" should read --a--.

COLUMN 39

Line 29, "an" should read --a--.

COLUMN 40

Line 9, "an" should read --a--.
    Line 12, "contracts" should read --contacts--.

COLUMN 41

Line 46, "where" should read --wherein--.
    Line 65, "an" should read --a--.

COLUMN 42

Line 1, "contracts," should read --contacts,--.
    Line 22, "form" should read --from--.

UNITED STATES PATENT AND TRADEMARK OFFICE
CERTIFICATE OF CORRECTION

PATENT NO. : 5,825,505
DATED : October 20, 1998
INVENTOR(S) : HISASHI TOYODA, ET AL.

It is certified that error appears in the above-identified patent and that said Letters Patent is hereby corrected as shown below:

<u>COLUMN 43</u>

Line 13, "said" should read --said apparatus--.

Signed and Sealed this

Thirty-first Day of August, 1999

Attest:

Q. TODD DICKINSON

*Attesting Officer*   Acting Commissioner of Patents and Trademarks